US009073439B2

(12) United States Patent
Brown et al.

(10) Patent No.: US 9,073,439 B2
(45) Date of Patent: *Jul. 7, 2015

(54) ELECTRIC VEHICLE SUPPLY EQUIPMENT

(71) Applicant: Leviton Manufacturing Co., Inc., Melville, NY (US)

(72) Inventors: Kenneth J. Brown, Chula Vista, CA (US); Carlos E. Ramirez, San Diego, CA (US); Victor Soto, Escondido, CA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/025,140

(22) Filed: Sep. 12, 2013

(65) Prior Publication Data

US 2014/0015487 A1 Jan. 16, 2014

Related U.S. Application Data

(63) Continuation of application No. 12/822,100, filed on Jun. 23, 2010, now Pat. No. 8,558,504, which is a continuation-in-part of application No. 12/685,609, filed on Jan. 11, 2010.

(51) Int. Cl.
 *H02J 7/00* (2006.01)
 *B60L 11/18* (2006.01)
 *B60L 3/00* (2006.01)
 *B65H 75/44* (2006.01)

(52) U.S. Cl.
 CPC .......... *B60L 11/1809* (2013.01); *B60L 3/0069* (2013.01); *B60L 3/0092* (2013.01);
 (Continued)

(58) Field of Classification Search
 USPC ........................................................ 320/109
 See application file for complete search history.

(56) References Cited

U.S. PATENT DOCUMENTS 4,581,705 A  4/1986 Gilker et al.
4,739,351 A  4/1988 Feldman
(Continued)

FOREIGN PATENT DOCUMENTS

EP  22114287 A2  8/2010
GB  2438979 A  12/2007
(Continued)

OTHER PUBLICATIONS

International Search Report and Written Opinion for PCT/US2011/020694, dated Sep. 22, 2011, 11 pages.
(Continued)

*Primary Examiner* — Yalkew Fantu
(74) *Attorney, Agent, or Firm* — Marger Johnson & McCollom PC

(57) ABSTRACT

Electric vehicle supply equipment includes an enclosure, an electric vehicle supply circuit for providing a flow of current to an electric vehicle, a charge circuit interrupting device, the charge circuit interrupting device arranged to interrupt the flow of current to the electric vehicle, a grounding monitor circuit, the grounding monitor circuit coupled to grounding conductors, the grounding monitor circuit having a grounding output signal, a ground default detection circuit, the ground fault detection circuit coupled to current carrying conductors, the ground fault detection circuit having a fault detection output signal, a controller, the controller coupled to the grounding monitor circuit, the ground fault detection circuit and the charge circuit interrupting device, the controller arranged to control the charge circuit interrupting device, and logic arranged to receive the grounding and fault detection signals and the control signal, and assert a close signal based upon the grounding and fault detection signals.

22 Claims, 44 Drawing Sheets

(52) U.S. Cl.
CPC ......... *B60L11/1818* (2013.01); *B60L 11/1824* (2013.01); *B60L 11/1825* (2013.01); *B60L 11/1838* (2013.01); *B60L 2230/12* (2013.01); *B60L 2230/16* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *B65H 75/4473* (2013.01); *B65H 2701/34* (2013.01)

(56) References Cited

U.S. PATENT DOCUMENTS

| | | | |
|---|---|---|---|
| 5,258,889 | A | 11/1993 | Belanger, Jr. |
| 5,341,083 | A * | 8/1994 | Klontz et al. ............... 320/109 |
| 5,563,491 | A * | 10/1996 | Tseng ........................ 320/109 |
| 5,784,285 | A | 7/1998 | Tamaki et al. |
| 5,971,597 | A | 10/1999 | Baldwin et al. |
| 6,232,743 | B1 * | 5/2001 | Nakanishi ................... 320/104 |
| 6,497,656 | B1 | 12/2002 | Evans et al. |
| 6,512,682 | B2 | 1/2003 | Cohen et al. |
| 6,633,823 | B2 | 10/2003 | Bartone et al. |
| 6,741,442 | B1 | 5/2004 | McNally et al. |
| 6,769,521 | B2 * | 8/2004 | Saito et al. ..................... 191/2 |
| 6,963,186 | B2 | 11/2005 | Hobbs |
| 6,993,417 | B2 | 1/2006 | Osann, Jr. |
| 7,046,716 | B1 | 5/2006 | Miao |
| 7,141,891 | B2 | 11/2006 | McNally et al. |
| 7,171,461 | B2 | 1/2007 | Ewing et al. |
| 7,196,900 | B2 | 3/2007 | Ewing et al. |
| 7,368,830 | B2 | 5/2008 | Cleveland et al. |
| 7,450,362 | B2 | 11/2008 | Muller et al. |
| 7,956,570 | B2 | 6/2011 | Lowenthal et al. |
| 8,138,715 | B2 | 3/2012 | Lowenthal et al. |
| 8,188,708 | B2 | 5/2012 | Altekruse et al. |
| 8,450,966 | B2 | 5/2013 | Krauer et al. |
| 2001/0039626 | A1 | 11/2001 | Jauert |
| 2003/0062990 | A1 | 4/2003 | Schaeffer, Jr. et al. |
| 2003/0120442 | A1 | 6/2003 | Pellegrino et al. |
| 2003/0161279 | A1 | 8/2003 | Sherman |
| 2004/0034484 | A1 | 2/2004 | Solomita et al. |
| 2004/0054905 | A1 | 3/2004 | Reader |
| 2004/0155722 | A1 | 8/2004 | Pruchniak |
| 2005/0147071 | A1 | 7/2005 | Karaoguz et al. |
| 2005/0185669 | A1 | 8/2005 | Welborn et al. |
| 2005/0203987 | A1 | 9/2005 | Ewing et al. |
| 2005/0243787 | A1 | 11/2005 | Hong et al. |
| 2006/0094461 | A1 | 5/2006 | Hameed et al. |
| 2006/0259538 | A1 | 11/2006 | Ewing et al. |
| 2007/0076340 | A1 | 4/2007 | Ewing et al. |
| 2007/0081505 | A1 | 4/2007 | Roberts |
| 2007/0112939 | A1 | 5/2007 | Wilson et al. |
| 2007/0130243 | A1 | 6/2007 | Ewing et al. |
| 2007/0136453 | A1 | 6/2007 | Ewing et al. |
| 2007/0140238 | A1 | 6/2007 | Ewing et al. |
| 2007/0198748 | A1 | 8/2007 | Ametsitsi |
| 2008/0019063 | A1 | 1/2008 | Muller et al. |
| 2008/0019068 | A1 | 1/2008 | Reynolds et al. |
| 2008/0088180 | A1 | 4/2008 | Cash et al. |
| 2008/0136261 | A1 | 6/2008 | Mierta |
| 2009/0021213 | A1 | 1/2009 | Johnson |
| 2009/0259603 | A1 | 10/2009 | Housh et al. |
| 2009/0285189 | A1 | 11/2009 | Kim et al. |
| 2010/0045232 | A1 | 2/2010 | Chen et al. |
| 2010/0174667 | A1 | 7/2010 | Vitale et al. |
| 2010/0225475 | A1 | 9/2010 | Karch et al. |
| 2010/0268411 | A1 | 10/2010 | Taguchi |
| 2011/0016063 | A1 | 1/2011 | Pollack et al. |
| 2011/0029144 | A1 | 2/2011 | Muller et al. |
| 2011/0029146 | A1 | 2/2011 | Muller et al. |
| 2011/0037429 | A1 | 2/2011 | DeBoer |
| 2011/0144823 | A1 | 6/2011 | Muller et al. |
| 2011/0169447 | A1 | 7/2011 | Brown et al. |
| 2011/0172839 | A1 | 7/2011 | Brown et al. |
| 2011/0175569 | A1 | 7/2011 | Austin |
| 2011/0258112 | A1 | 10/2011 | Eder et al. |
| 2012/0123710 | A1 | 5/2012 | Gaul et al. |

FOREIGN PATENT DOCUMENTS

| | | |
|---|---|---|
| JP | 09-1076505 A | 4/1997 |
| JP | 10-155245 A | 6/1998 |
| JP | 11-122714 A | 4/1999 |
| JP | 3074208 U | 10/2000 |
| JP | 3093370 U | 2/2003 |
| JP | 2008-302771 | 12/2010 |
| WO | 2006091565 A2 | 8/2006 |
| WO | 2008073453 A1 | 6/2008 |
| WO | 2009091745 | 7/2009 |

OTHER PUBLICATIONS

International Preliminary Report on Patentability for PCT/US2011/020694, dated Jul. 17, 2012, 8 pages.
International Preliminary Report on Patentability for PCT/US2009/062825, dated May 3, 2011, 9 pages.
Nissan North America Selects Aerovironment to Install Home-Charging Stations for Nissan Leaf, Detroit, MI, Nov. 1.
Yokohama, Nissan Unveils "Leaf"—The World's First Electric Car Designed for Affordability and Real-World Requirements, Nissan Motor Co., Ltd. Feb. 8, 2009.
Earley et al., NEC 2008 Handbook, NFPA 70:National Elec. Code, Intl. Elec Code Series.
The Next Big Thing: Why Electric Vehicles are Here to Stay, AeroVironment, Inc., 2009.
Wikipedia, Magne Charge, en.wikipedia.org/w/index.php?title=Magne_Charge&printable=yes, printed Jan. 21, 2010.
GM Electric Power/Advanced Systems, "Plug-In Electric Vehicles—Standards," Ontario Smart Grid Forum, Oct. 14, 2008.
Society of Automotive Engineers, Inc., Surface Vehicle Recommended Practice, 2001, 32 pages.
www.unplugged.com, "How to Conserve Energy, Starting at the Plug," Sep. 28, 2010, 4 pages.
ADMMicro EMS, "Controllers," 2006, 1 page.
ADMMicro, "What We Do," Controllers, 2006, 3 pages.
AeroVironment, Inc., "Electric Vehicle Charging Infrastructure for the EV Superhighway," 1998, 4 pages.
Architectural Lighting Magazine, "Load Shedding and Lighting: The New Frontier," printed Mar. 20, 2009, 2 pages.
E-Mon, Energy Monitoring Products, E-Mon D-Mon Metering Products, printed Jul. 7, 2009, 1 page.
Wattsupmeters, "Smart Circuit—The Intelligent Electricity Monitor that Can Measure and Switch Loads via the Internet, Sep. 2005," 6 pages.
I.M.S. Industrial Measurement Systems Ltd., "General Information," 2006, 2 pages.
Written Opinion and International Search Report for PCT/US2010/044022, dated Feb. 24, 2011, 10 pages.
Leviton,"Architectural Lighting Controls," 2007, 39 pages.
Lutron, "Quantum—Whole-Building Light Management Solution," Apr. 30, 2009, 28 pages.
Lutron, "Quantum Total Light Management, Operation and Maintenance Manual," Apr. 2009, 212 pages.
Quad Logic: Power Line Communications Technology, "Where There is Power . . . Quadlogic Brings You Knowledge," 2008, 2 pages.
RS485 Serial Information, http://www.lammertbies.nl/comm/info/RS-485.html.
Shadowmetering, "About Shadow Metering Inc. Jacksonville, Florida," 2009, 1 page.
Site Controls: Products and Services, "The Site-Command Platform," 2009. 1 page.
International Search Report and Written Opinion, PCT/US2010/044022, dated Feb. 24, 2011, 10 pages.
International Search Report and Written Opinion, PCT/US2009/062825, dated May 3, 2011, 14 pages.

* cited by examiner

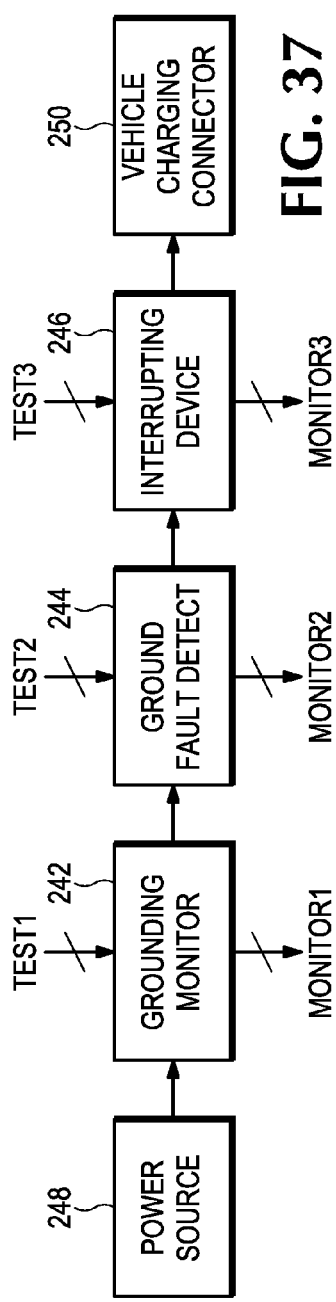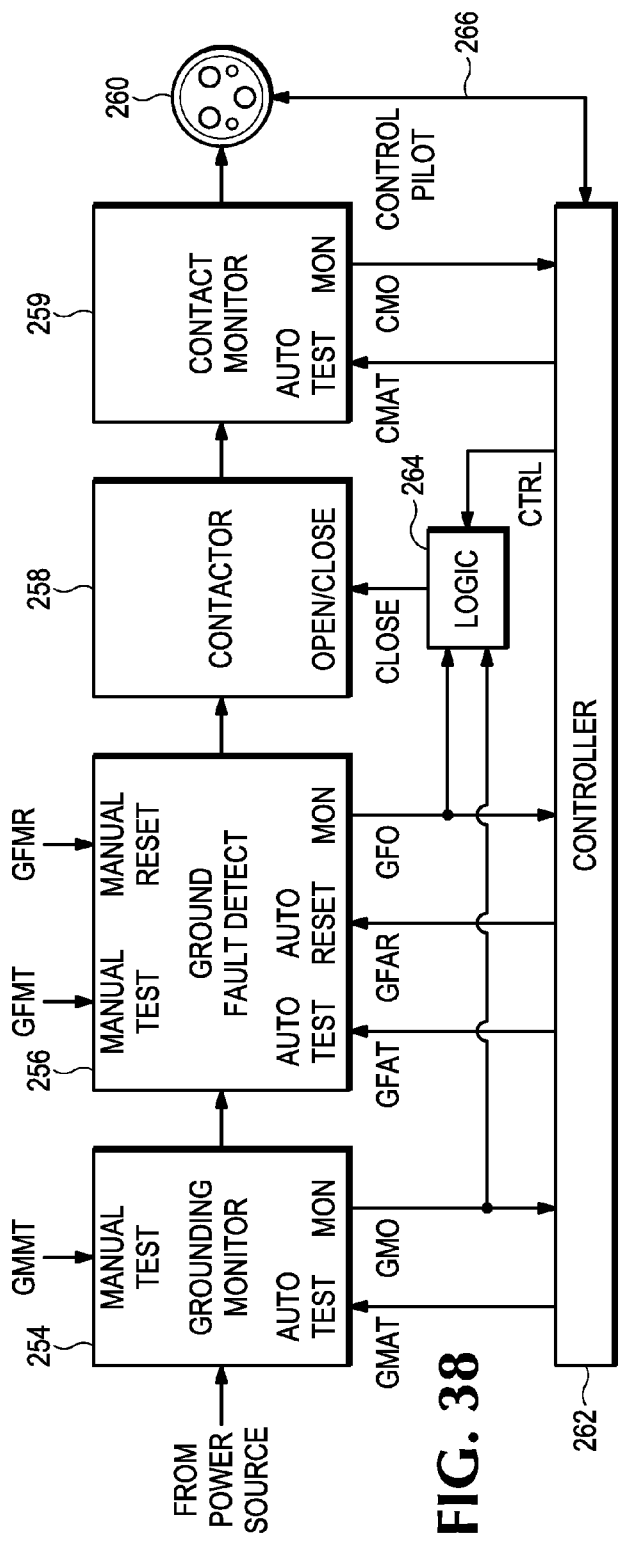

ELECTRIC VEHICLE SUPPLY EQUIPMENT

CROSS-REFERENCE TO RELATED APPLICATIONS

This application is a continuation of U.S. patent application Ser. No. 12/822,100 filed Jun. 23, 2010, which is a continuation-in-part of U.S. patent application Ser. No. 12/685,609 filed Jan. 11, 2010 and titled Electric Vehicle Supply Equipment which are incorporated by reference.

BACKGROUND

FIG. 1 illustrates a typical arrangement for charging an electric vehicle (EV) or plug-in hybrid electric vehicle (PHEV). Electric vehicle supply equipment (EVSE) 10 receives electric power from a utility grid or other source and transfers it to the vehicle 12 through a cord 14 and connector 16 that plugs into a mating inlet 18 on the vehicle. In this example, the AC power from the grid is converted to DC power by an on-board charger 20 in the vehicle to charge the battery 22. In an alternative arrangement, the charger may be located in the EVSE instead of the vehicle.

The EVSE, which is also referred to as supply equipment, a vehicle charger, a charging station, a charger, etc., may be realized in several different mechanical configurations. EVSE are frequently installed as wall-mounted units in garages and on buildings where vehicles can be parked inside or close to the building. In outdoor locations, especially parking lots and curbsides, EVSE are commonly installed on pedestals. EVSE may also take the form of a cord set which is sometimes referred to as a travel charger, portable charger, handheld charger, etc.

The connector 16 and inlet 18 typically utilize a conductive connection in which the electrical conductors in one connector make physical contact with the electrical conductors in the other connector. Other systems utilize inductive coupling in which energy is transferred through magnetic coils that are electrically insulated from each other.

To promote interoperability of vehicles and supply equipment, the Society of Automotive Engineers (SAE) has developed various standards that define mechanical configurations of connectors for charging vehicles, as well as the arrangement and function of electrical contacts within the connectors. One standard known as SAE J1772 is of particular interest because virtually every automaker in the U.S., Japan and Europe has announced plans to use J1772 compatible connectors for models sold in the U.S. This standard relates to conductive charging systems and covers both AC and DC connections.

FIG. 2 illustrates a reference design for a conductive vehicle charging system under the J1772 standard. A vehicle 30 is coupled to EVSE 28 through a coupling inlet 26 on the vehicle and coupling connector 24, which is typically connected to the EVSE through a flexible cord. AC power is transferred to the vehicle through terminals 1 and 2 of the coupling. A charging circuit interrupting device (CCID) 44 interrupts the flow of AC power if the difference between the current flowing in the two AC conductors exceeds a predetermined threshold, which typically indicates a potential ground fault condition. An on-board charger 32 in the vehicle converts the AC power to DC current for charging the battery 34.

Terminal 5 of the coupling connects safety grounding conductors in the EVSE and the vehicle. A control pilot signal is connected through terminal 6 and enables basic two-way communications between the EVSE and the vehicle. For example, the control pilot enables a charge controller 36 in the vehicle to determine the maximum amount of AC current available from the EVSE, while it enables the EVSE to determine if the vehicle requires ventilation for charging and if the vehicle is ready to receive power. The return path for the control pilot signal is through the grounding path which enables it to serve a safety function: if the safety pilot signal is not present, control electronics 42 in the EVSE assumes the ground path has been compromised and causes the CCID to interrupt the flow of AC power to the vehicle.

A proximity device 40 enables the vehicle to verify that it is mechanically connected to an EVSE system. The implementation details of proximity detection are left to the discretion of the manufacturer, but the J1772 standard identifies the use of magnetic proximity detectors as an acceptable technique. For AC charging, only terminals 1, 2, 5, and 6 are required. DC charging requires the use of optional terminals 3 and 4, as well as the establishment of a more sophisticated communication link through optional terminals 7-9 which are not illustrated.

The J1772 standard defines different types of charging including AC Level 1, which utilizes the most common 120 Volt, 15 Amp grounded receptacle, and AC Level 2, which utilizes a dedicated AC power connection at 208-240 Volts nominal and 32 Amps maximum. DC charging is defined as a method that utilized dedicated direct current (DC) supply equipment.

BRIEF DESCRIPTION OF THE DRAWINGS

FIG. 37 illustrates an embodiment of an electric vehicle supply circuit according to some inventive principles of this patent disclosure.

FIG. 38 illustrates another embodiment of an electric vehicle supply circuit according to some inventive principles of this patent disclosure.

DETAILED DESCRIPTION

Factors such as convenience, availability, reliability, effectiveness and the like of vehicle charging systems are important considerations for the design, functionality and ease of use/installation of EVSE. It is believed that such considerations will affect the widespread consumer adoption and acceptance of electric vehicles. Currently available charging systems are typically provided by systems integrators, network operators, utilities, and other organizations that are focused on high-level deployment issues, while possibly neglecting these considerations which will affect the end-user/installer experience.

Vehicle charging systems may seem conceptually simple, but numerous factors add layers of complexity that make it difficult to provide a satisfying user experience. For example, electric vehicle charging systems employ various safety features, but they tend to be inconvenient or plagued by nuisance tripping (e.g., charging circuit interruption as a result of a perceived fault condition). EVSE which has been shutdown/turned off as a result of a nuisance trip could result in a connected electric vehicle not receiving its user-anticipated charge overnight, and the user would be deeply disappointed to discover in the morning that the charging system turned itself off because of an incorrect fault determination.

For convenience, the term electric vehicle will be used to refer to pure electric vehicles (EVs), plug-in hybrid electric vehicles (PHEVs), and any other type of vehicle that utilizes electric charging unless otherwise apparent from context.

Figure 1:
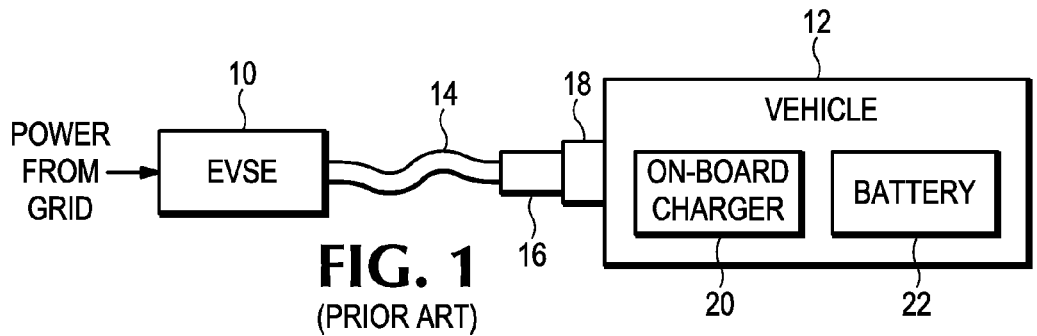
FIG. 1 illustrates a typical arrangement for charging an electric vehicle.
Figure 2:
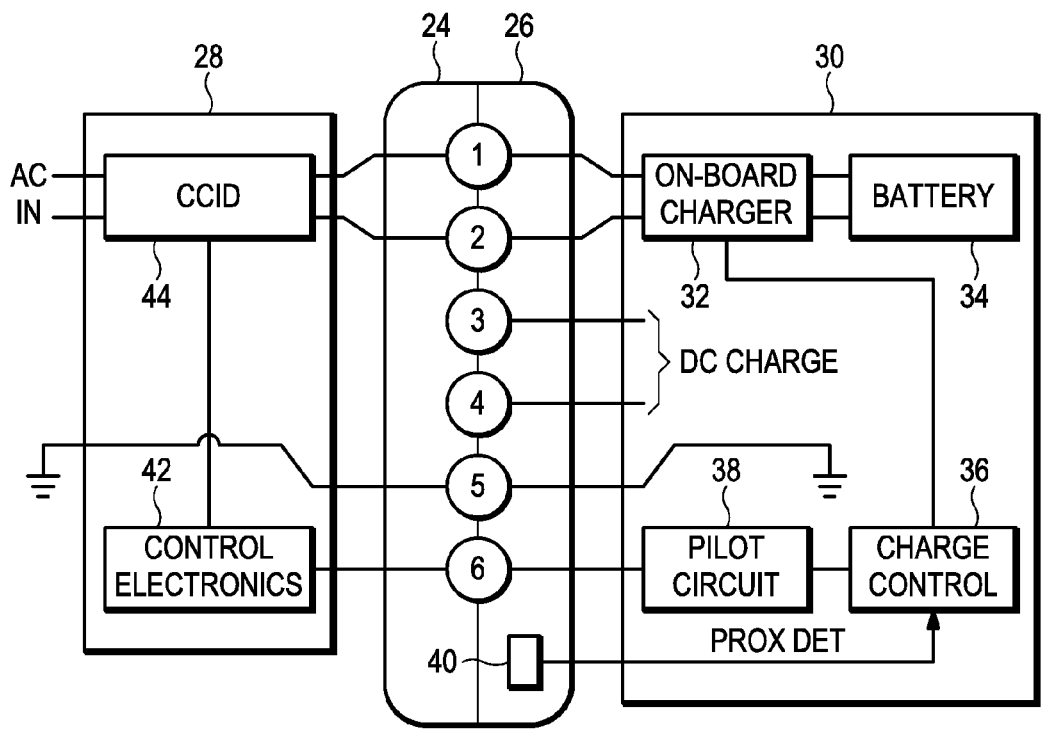
FIG. 2 illustrates a reference design for a conductive vehicle charging system.
Figure 3:
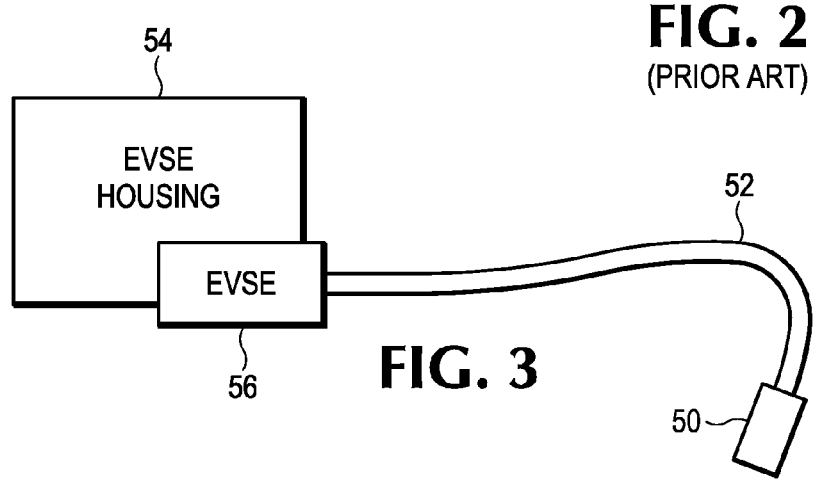
FIG. 3 illustrates an embodiment of a cord set for supplying electric power to a vehicle according to some of the inventive principles of this patent disclosure.

FIG. 3 illustrates an embodiment of a cord set for supplying electric power to a vehicle according to some of the inventive principles of this patent disclosure. The embodiment of FIG. 3 includes vehicle charging connector 50 connected to a housing 54 by a cord 52. A holder 56 for the connector is located in, on, or otherwise associated with, the housing 54. The holder may be used, for example, to store the connector while not in use and may be implemented in any suitable configuration. Some examples include a recess or opening in the housing, clips, hooks, latches, straps, a mating interface to simulate a vehicle inlet, etc. The holder may be integral with the housing, or it may be separate from, and designed to interact with, the housing in a manner to hold the vehicle charging connector. The holder may be fixed or articulated such as by sliding, swinging or rotating, etc. The holder may have an open structure such as a cage, or it may have a fully or partially enclosed structure. Moreover, the holder may have hybrid combinations of any of these characteristics. The housing 54 may include relays, contactors, circuit boards, transformers, modules, lights, displays, charging circuits and/or any other components to implement an electric vehicle supply circuit such as a circuit for charging a vehicle with the cord set.

Figure 4:
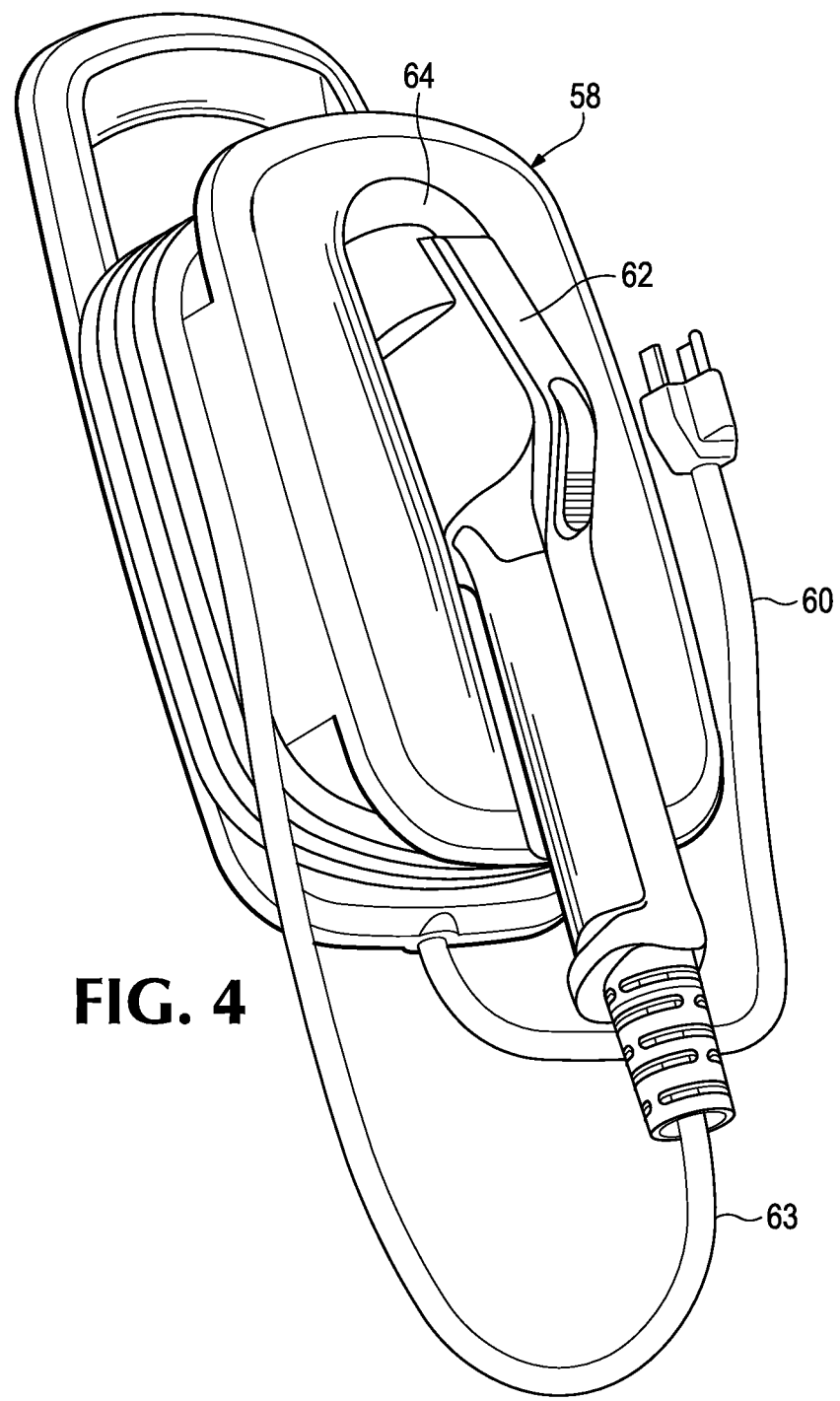
FIGS. 4 and 5 illustrate another embodiment of a cord set for charging a vehicle according to some inventive principles of this patent disclosure.
Figure 5:
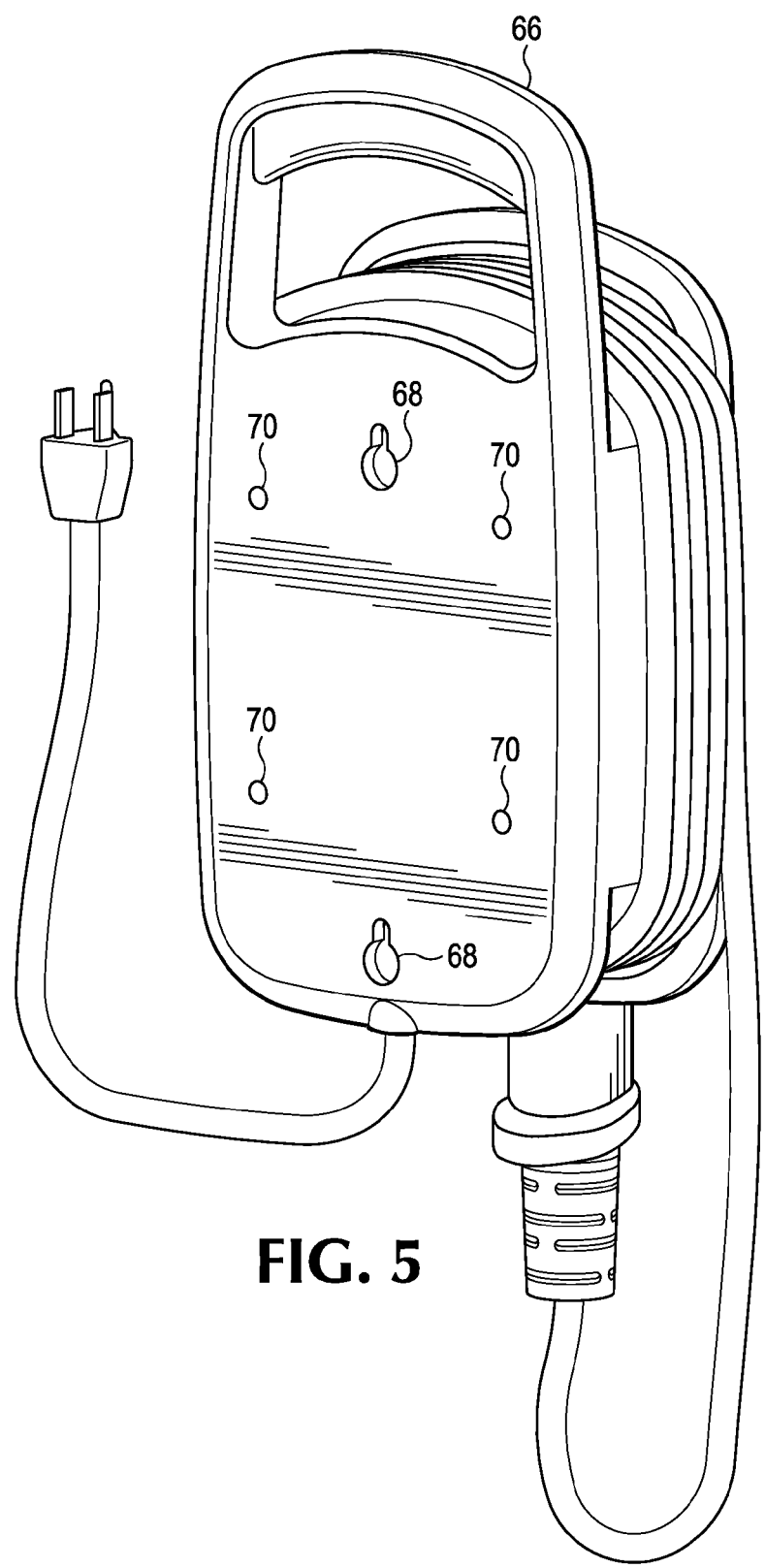

FIGS. 4 and 5 illustrate another embodiment of a cord set for charging a vehicle according to some inventive principles of this patent disclosure. Referring to the front view of FIG. 4, this embodiment includes a portable housing 58, a plug and cord assembly 60 to connect the housing to a source of charging power, a vehicle charging connector 62, and a charging cord 63 which can be wrapped around the housing for storage. In this example, the housing includes a recess 64 to receive the vehicle charging connector 62 when not in use. The connector may be fully or partially inserted into the recess and held in place in any suitable manner including gravity, clips, magnets, straps with hook-and-loop fasteners, flexible protrusions in the housing that enable the connector to snap into place, etc.

Referring to the rear view of FIG. 5, the housing includes a handle 66 which may be used for carrying or holding the housing, as well as for hanging the housing on a hook or bracket and/or to facilitate placement of the housing in a vehicle or other storage space as described below. Keyhole slots 68 may be included to enable the housing to be permanently or temporarily mounted on a wall, utility pole, pedestal, or other convenient place. Mounting holes 70 may be included to facilitate mounting the housing to a custom or standardized support system. For example, the mounting holes may be positioned according to standards from the Video Electronics Standards Association (VESA) for mounting flat panel and other displays to stands or wall mounts.

Figure 6:
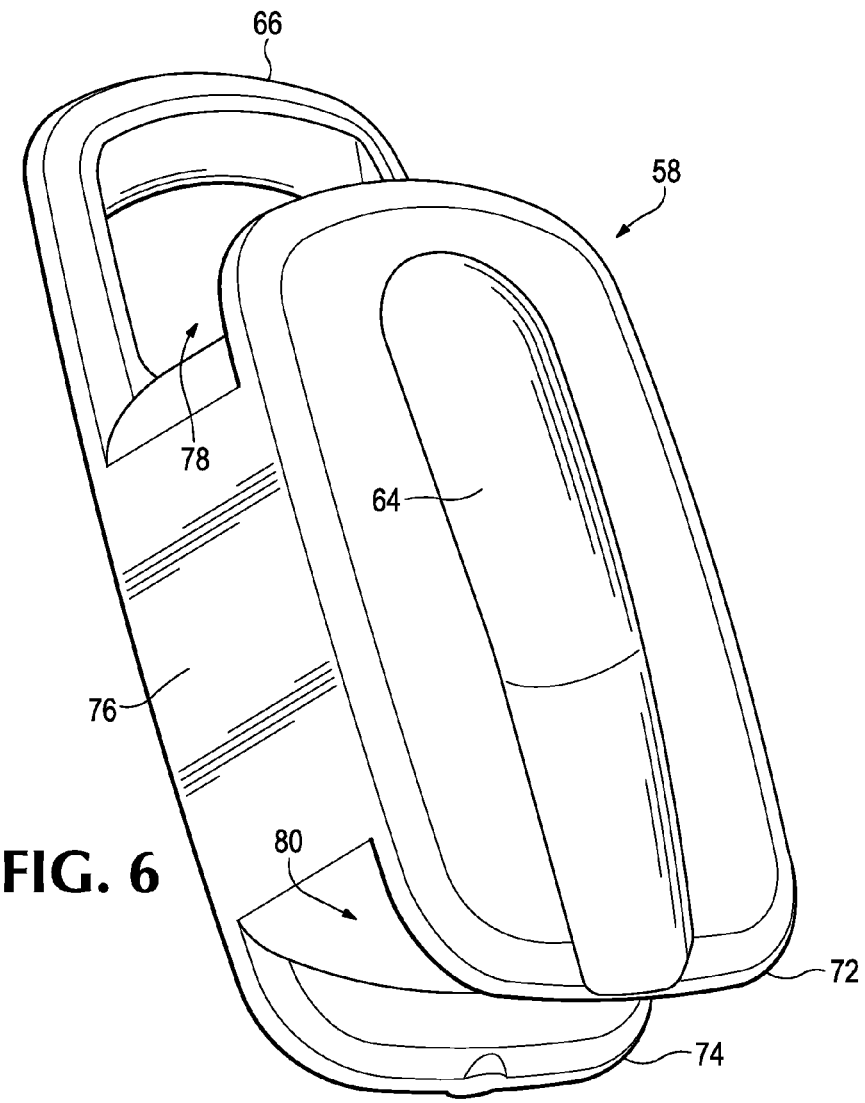
FIGS. 6 and 7 illustrate more details of the housing of FIGS. 4 and 5.
Figure 7:
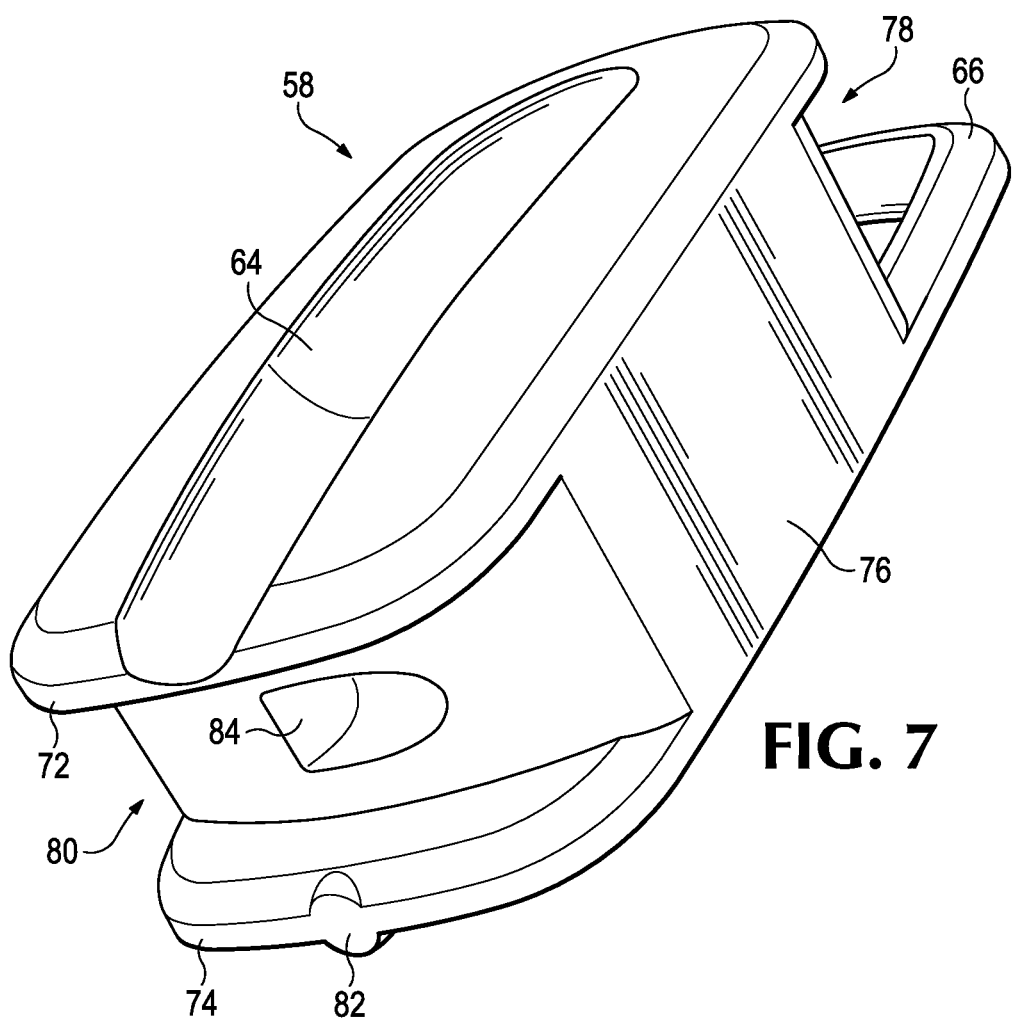

FIGS. 6 and 7 illustrate more details of the housing 58. Referring to FIG. 6, the housing includes a front plate or flange 72 and a rear plate or flange 74 connected by a midsection 76. The plates and midsection form channels 78 and 80 which enable the housing to function as a cleat or spool for wrapping the charging cord and/or power cord. The recess 64 is contoured to generally match the shape of the vehicle charge connector when the connector is inserted as shown in FIG. 4.

Referring to FIG. 7, the rear plate includes an enlarged flat space 82 on its bottom edge to provide a location for an entry opening, grommet and/or strain relief for the power cord 60. A pocket 84 in the housing midsection includes another flat space to provide an entry point for the charging cord which may also include a grommet and/or strain relief. The contours of the pocket are angled so that the charging cord emerges from the pocket at an angle to facilitate wrapping the cord around the housing. Because the entry point is recessed below the surface of the midsection, subsequent turns of the charging cord may pass smoothly over the first turn where it emerges from the entry point.

The handle 66, front and rear plates 72 and 74, and any other portions of the housing may be provided with rounded corners and radiused edges as shown in the drawings, and other refinements for aesthetic and/or functional purposes.

The housing 58 may include relays, contactors, circuit boards, transformers, modules, lights, displays, charging circuits and/or any other components to implement an electric vehicle supply circuit such as a circuit for charging a vehicle with the cord set. For example, one embodiment may include circuitry to implement an AC Level 1 EVSE that operates from 120 VAC power and includes one or more indicator lights on the front plate to indicate the status of the power source, vehicle charge state, fault conditions, etc. As another example, a different embodiment may include circuitry to implement an AC Level 2 EVSE that operates from a dedicated source of 240 VAC power and includes an alphanumeric display with keypad and/or network capabilities. As a further example, another embodiment may include a charging circuit with an AC/DC converter to implement a DC charging EVSE.

The embodiments described above with respect to FIGS. 3-7 include numerous features that may provide individual and collective benefits. For example, one potential problem with conventional EVSE cord sets is a lack of effective cord and connector management. By providing a holder for the vehicle charging connector and/or other connectors, some of the inventive principles of this patent disclosure may provide an improved user experience. Having a charging or power connector docked neatly in a recess may not only present a more orderly appearance, but it may also prevent the cord from unwinding.

The use of a recess in the housing to hold a connector may provide additional benefits. For example, it may be molded directly into the housing and, therefore, require few if any additional parts. Depending the shape and depth of the recess, it may protect the connector from moisture, dirt, sand and/or other foreign matter. It may also protect the connector from damage due to dropping, static electricity, and/or inadvertent contact with other electrical systems or devices, etc.

The mounting holes and slots may also provide additional benefits. The keyhole slots enable the housing to be easily mounted to a wall or other surface, or inside a vehicle. Combined with the overall shape and arrangement of the housing, this may provide a tidy and professional appearance. Using mounting holes with a standardized pattern enables existing mounting hardware to be repurposed for EVSE. It may be especially beneficial to use VESA standard hole patterns because an extensive range VESA mounting hardware is available. This hardware was designed for supporting monitors and televisions, but when combined with EVSE according to some of the inventive principles of this patent disclosure, it may provide unique arrangements that facilitate positioning of the EVSE to improve visibility, reduce glare, facilitate wrapping of cords, etc.

By designing the handle to accommodate hanging the housing on a hook or bracket, a manufacturer or supplier may provide a wall or pedestal mounted hook or bracket with a relatively large area to display any suitable indicia such as a trademark, instructions, or the like.

Each of the features described above may have independent utility and provide individual benefits. Moreover, when some or all of these features are integrated together, they may provide a superior overall user experience.

Some additional inventive principles of this patent disclosure relate to deployment systems for positioning a cord set or other portable EVSE in a vehicle and/or the marketplace. In one embodiment of a deployment system, a manufacturer or supplier of a portable EVSE may cooperate with a vehicle manufacturer to coordinate the interoperability of the EVSE and a vehicle. For example, the vehicle and EVSE designers may cooperate to provide a storage space in the vehicle that is custom designed to accommodate the portable EVSE. The storage space may be located in a trunk, under a seat, behind an interior or exterior panel, etc. One or more aspects of the portable EVSE such as a handle, flange, mounting holes, etc., may enable the EVSE to slide, snap or otherwise be secured in the custom storage space. This may prevent the EVSE from moving while the vehicle is in motion and/or taking up valuable interior space, and may present a well-organized and professional image to an end user.

Through a cooperative effort, the coordination of a portable EVSE and a vehicle may provide benefits for all of the stakeholders. It may, for example, establish a continuing market for the manufacturer or supplier of the portable EVSE and provide an opportunity to develop brand recognition. The manufacturer or supplier of the vehicle, as well as the end users, may also benefit from the improved functionality and closer integration of the EVSE into the vehicle.

The embodiments illustrated above with respect to FIGS. 3-7, as well as others below, are described in the context of some specific implementation details, but the inventive principles are not limited to these details, and many variations are possible within the scope of the inventive principles. Some example variations are as follows.

In some of the embodiments, the power cord is illustrated as being shorter than the charging cord, but the power cord may be of equal or shorter length (or any suitable length). In some embodiments, a power cord may be omitted entirely and replaced with another mechanism for providing input power to the cord set. For example, connector blades may be provided on the back of the housing to enable the cord set to be plugged directly into a wall outlet or extension cord. In this case, a hook or bracket may be mounted to a wall the correct distance from the receptacle to enable the handle to engage the hook and allow the housing to pivot into place and accurately position the blades for insertion into the receptacle. As another example, connector blades may be located in a recessed spot on the housing to accept the receptacle end of an extension cord, with or without strain relief.

In some of the embodiments, a power cord is illustrated as a 120 VAC plug for use with a National Electrical Manufacturers Association (NEMA) 5-15R receptacle, but other types of plugs and/or connectors may be used. Likewise, some of the embodiments are illustrated with a multi-prong shrouded connector such as a J1772 compatible vehicle charging connector, but other connectors, both conductive and inductive may be used.

For convenience, some embodiments are described using orientations such as front, rear, top, bottom, left, right, etc., but these are generally not intended to be limitations. For example, when placed on a horizontal surface, a rear surface may become the bottom and the front may become the top, etc.

In some embodiments, a vehicle charging connector is shown placed in a recess in the housing with the connection interface oriented in an inward direction; that is, the connector contacts generally face the housing. The connector, however, may be oriented in any suitable manner when docked. For example, the connector may be placed in the recess with the contacts facing away from the housing. This configuration may be useful for holding the connector when not in use, or even when it is in use. As a further example, the connector is shown held in a position where the connection interface is inside the perimeter of the housing, while a portion of the connector handle protrudes from the perimeter of the housing. In other embodiments, however, both the interface and the handle may fall within the perimeter of the housing. In still other embodiments, the entire handle of the connector may be located within the perimeter of the housing while the connector interface protrudes.

Figure 8:
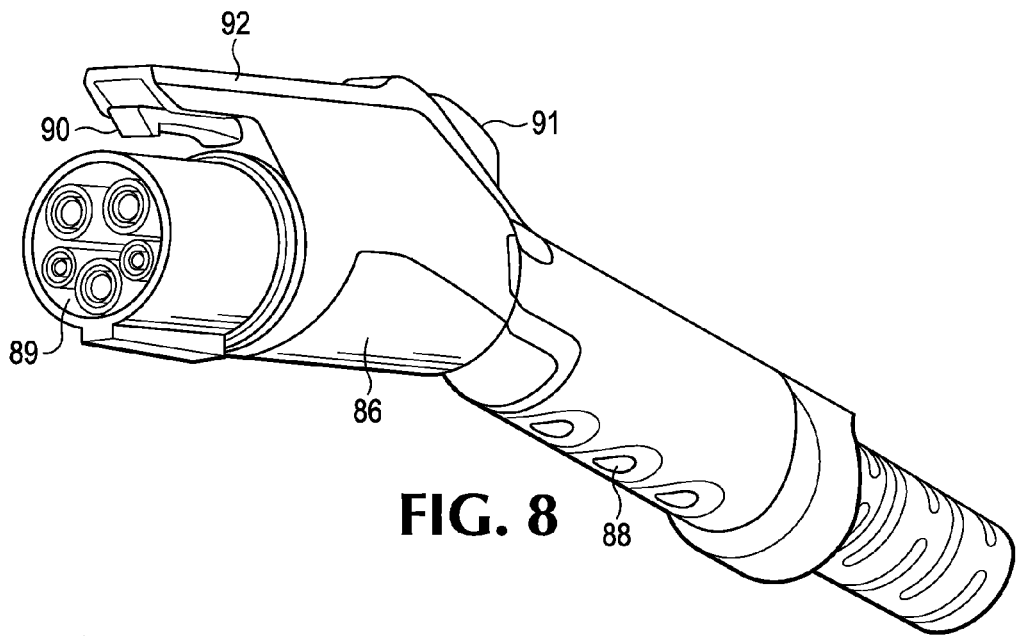
FIGS. 8-10 illustrate an embodiment of a vehicle charging connector according to some inventive principles of this patent disclosure.
Figure 9:
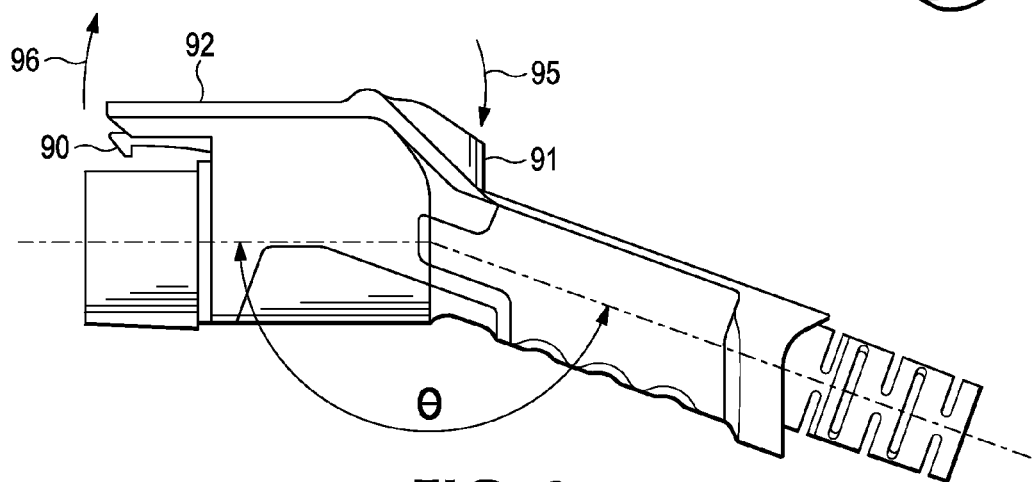
Figure 10:
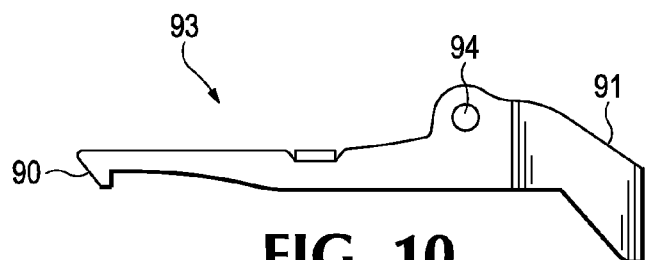

The size, shape and/or configuration, etc., of the vehicle charging connector may also be coordinated with the holder according to some inventive principles of this patent disclosure. For example, FIGS. 8-10 illustrate an embodiment of a vehicle charging connector according to some inventive principles of this patent disclosure. Referring to FIGS. 8 and 9, the connector includes a body 86, a handle 88, a connection interface 89, a latch 90 to secure the charging connector to a mating connector on a vehicle, a button 91 to actuate the latch, and a housing 92 to protect the latch. The body and handle are oriented at an angle Θ, which in this example is about 160 degrees. This angle may affect the feel and operation of the connector when it is connected to and removed from the vehicle charging inlet, as well as when it is placed in the holder on the cord set housing. If the angle Θ is too small, it may not be ergonomic. It may also necessitate a deeper recess on the cord set housing which may reduce the amount of usable space inside the cord set housing 58. If the angle is too large, however, it may feel awkward to the user or take up extra space in the cord set housing.

Referring to FIG. 10, the latch 90 and button 91 are located at opposite ends of a lever 94 which pivots inside the body at a pivot point 96. The lever may be spring loaded within the body to bias it in the latched position shown in FIG. 9. When a user presses the button 91 as shown by arrow 95, the lever 93 pivots, thereby causing the latch to pivot in the direction of arrow 96 to enable the user to disengage the charging connector from the vehicle connector.

In some embodiments, a cord set is illustrated with a single connector holder, but any number of holders may be provided for vehicle charging connectors, power connectors, etc., for cord sets and/or other portable EVSE.

Figure 11:
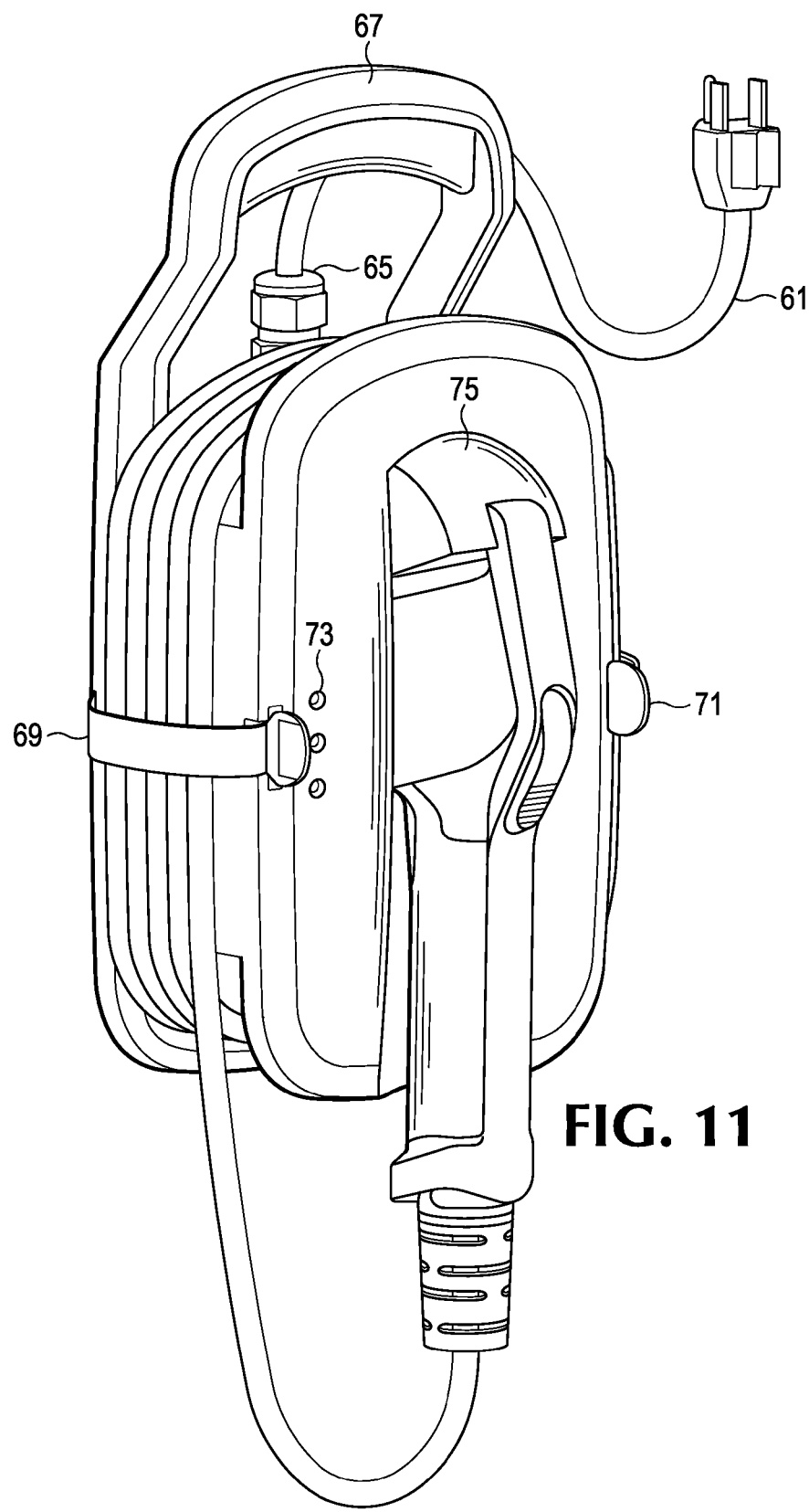
FIGS. 11-13 illustrate another embodiment of a cord set for charging a vehicle according to some inventive principles of this patent disclosure.
Figure 12:
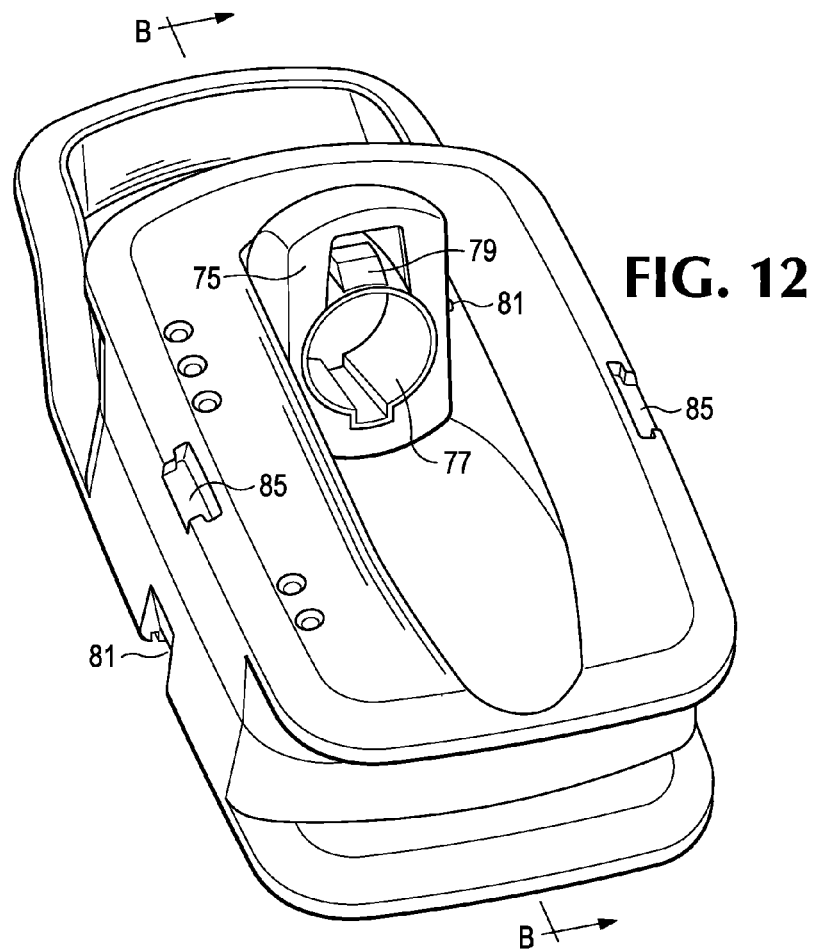
Figure 13:
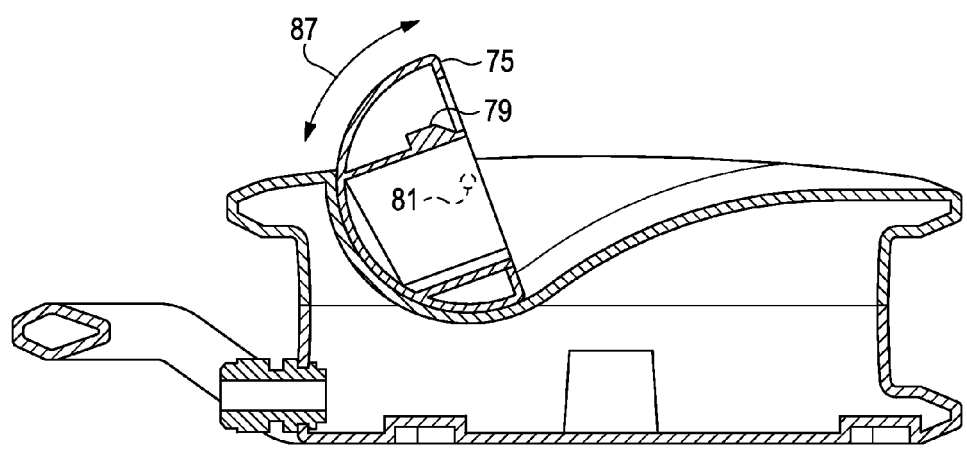

FIGS. 11-13 illustrate another embodiment of a cord set for charging a vehicle according to some inventive principles of this patent disclosure. The embodiment of FIGS. 11-13 is similar to the embodiment of FIGS. 4-7 but with the following differences.

Referring to FIG. 11, the plug and cord assembly 61 enters the housing through a strain-relief 65 at the top rather than the bottom of the housing. The handle 67 is offset from the back plane of the housing to provide better balance and to accommodate the power cord and strain relief. The handle may be positioned, for example, near a plane running through the center of gravity of the cord set when the charging cord is wrapped around the housing and/or when the charging connector is stored in the recess of the housing.

The embodiment of FIGS. 11-13 also includes a docking storage connector 75 to receive and hold the charging connector to the housing when not in use. Straps 69 and 71, which may be made from elastic or other flexible and/or stretchable material, secure the charging cord when it is wrapped around the housing. In the view of FIG. 11, three indicator lights 73 are shown. The lights may indicate various states of the cord set, e.g., power on/off, vehicle charging, EVSE fault, etc.

Referring to FIG. 12, the cord set is shown without the cords and charging connector to better illustrate the docking storage connector 75. The storage connector includes a receptacle 77 to receive the plug portion of the charging connector. A protrusion 79 has a ramped face and is arranged to engage the latch on the charging connector to hold the charging connector securely to the storage connector when the charging connector is docked in the storage position. The storage connector 75 is arranged to pivot about an axis through two pivot points 81 (one of which is visible in the view of FIG. 12) in the recess of the housing.

The housing also includes two pivoting attachment points 81 (one of which is visible in the view of FIG. 12) for one end of each of the straps, and recesses 85 for clipping the other ends of the straps to the housing.

FIG. 13 illustrates a cross-sectional view of the housing taken through the plane shown by arrows B-B in FIG. 12. The view of FIG. 13 illustrates how the docking storage connector 75 can rotate about pivot point 81 is shown by arrow 87. This enables the storage connector to rotate between the position shown in FIG. 13 which would hold the charging connector in the recess, and any other positions that a user may prefer for easier insertion/removal of the charging connector. Also visible in FIG. 13 is the protrusion 79 for engaging the latch on the charging connector.

Figure 14:
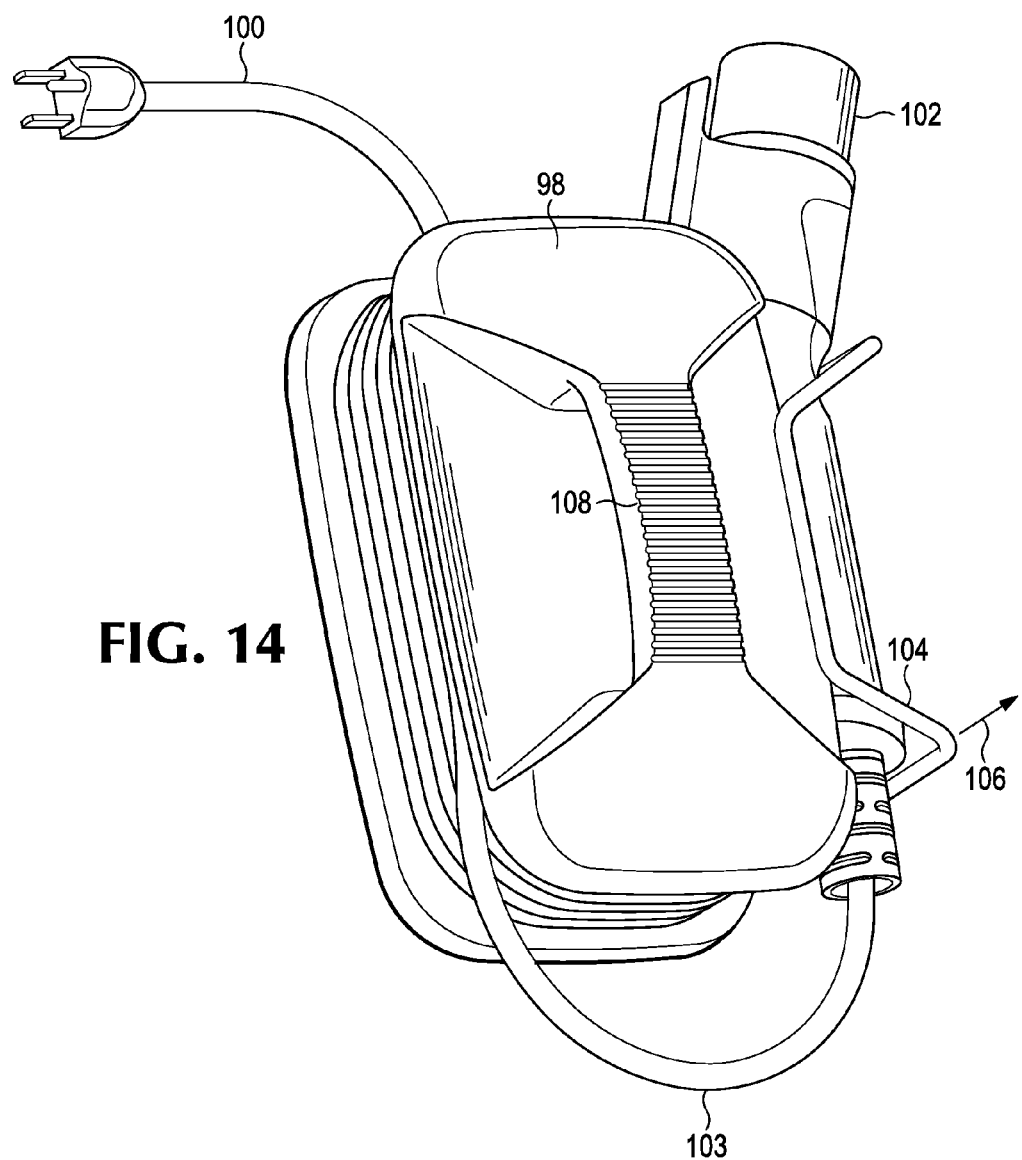
FIGS. 14-20 illustrate another embodiment of a cord set for charging a vehicle according to some inventive principles of this patent disclosure.
Figure 15:
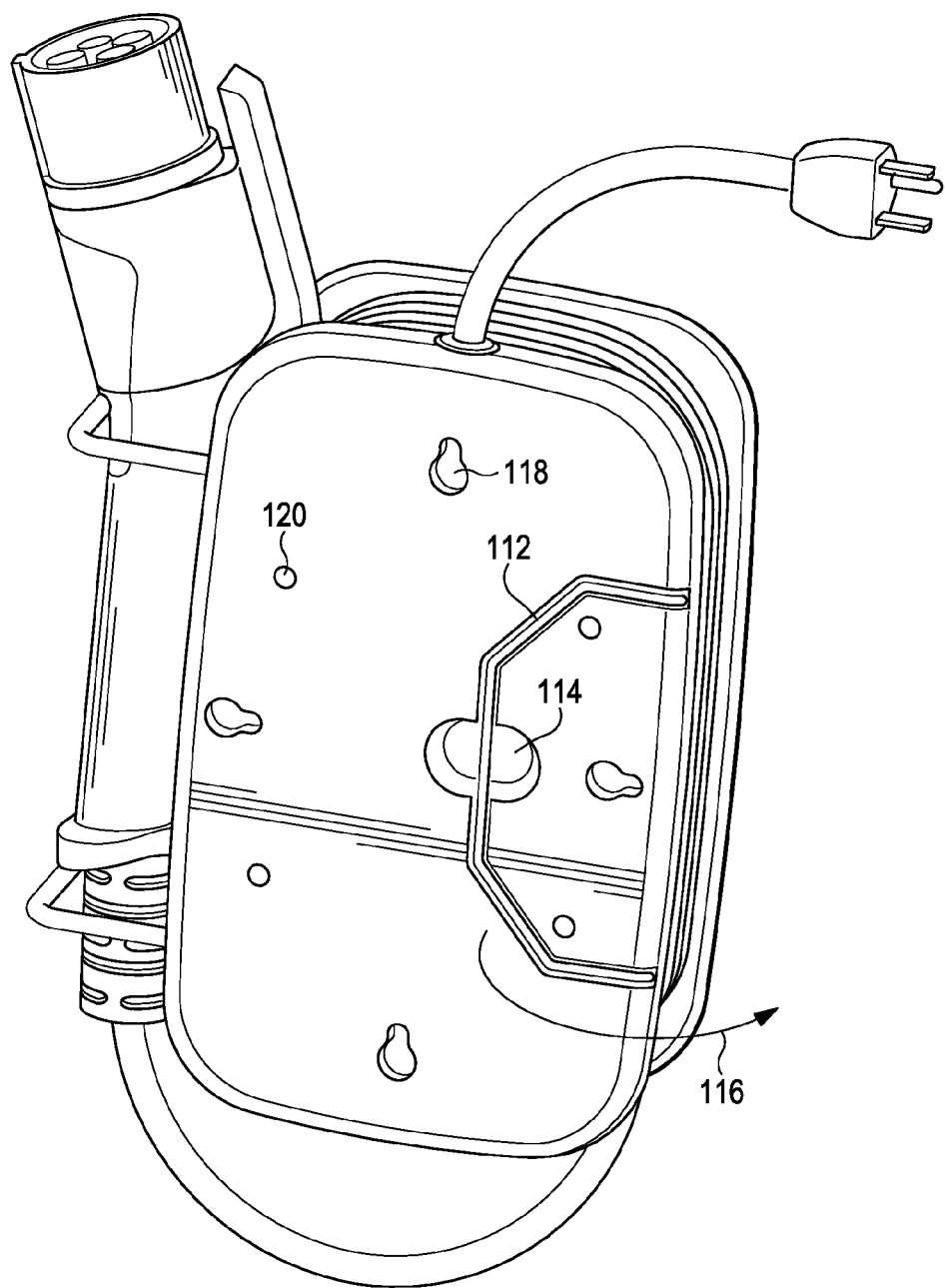

FIGS. 14 and 15 illustrate another embodiment of a cord set for charging a vehicle according to some inventive principles of this patent disclosure. Referring to the front view of FIG. 14, this embodiment includes a portable housing 98, a plug and cord assembly 100 to connect the housing to a source of charging power, a vehicle charging connector 102, and a charging cord 103 which can be wrapped around the housing for storage. In this example, a holder 104 is implemented as a wire frame cradle that can slide away from the housing in the direction of arrow 106 to receive the connector, then slide back against the housing to hold the connector in place against the housing and/or charging cord. The sliding motion of the wire frame enables it to stop at any position relative to the housing to accommodate any number of turns of the charging cord that may be wrapped around the housing. The connector may be held with the interface pointing generally outward as shown in FIG. 14, or it may be held facing inward, or in any other suitable orientation. When oriented outward, the charging connector may be held in the holder even while in use. A handle 108 formed in the housing may impart a pleasing and convenient "toolbox" feel to the housing and/or cord set.

Referring to the rear view of FIG. 15, the housing includes a second handle 110 which may is also be implemented as a wire frame and may be used for carrying or holding the housing, as well as for hanging the housing on a hook or bracket and/or to facilitate placement of the housing in a vehicle or other storage space. In the view of FIG. 15, the handle is shown stored in a closed position in a recess 112 which has an enlarged portion 114 to enable a user to grasp the handle and swing it out of the recess to an open position in the direction of arrow 116. The recess may include flexible protrusions to enable the handle 110 to snap into the recess or any other suitable mechanism to secure the handle in the closed position. Keyhole slots exemplified by slot 118 may be included to enable the housing to be permanently or temporarily mounted on a wall, utility pole, pedestal, or other convenient place in a vertical, horizontal or any other suitable orientation. Mounting holes exemplified by hole 120 may be included to facilitate mounting the housing to a custom or standardized support system such as the VESA mounts discussed above.

Figure 16:
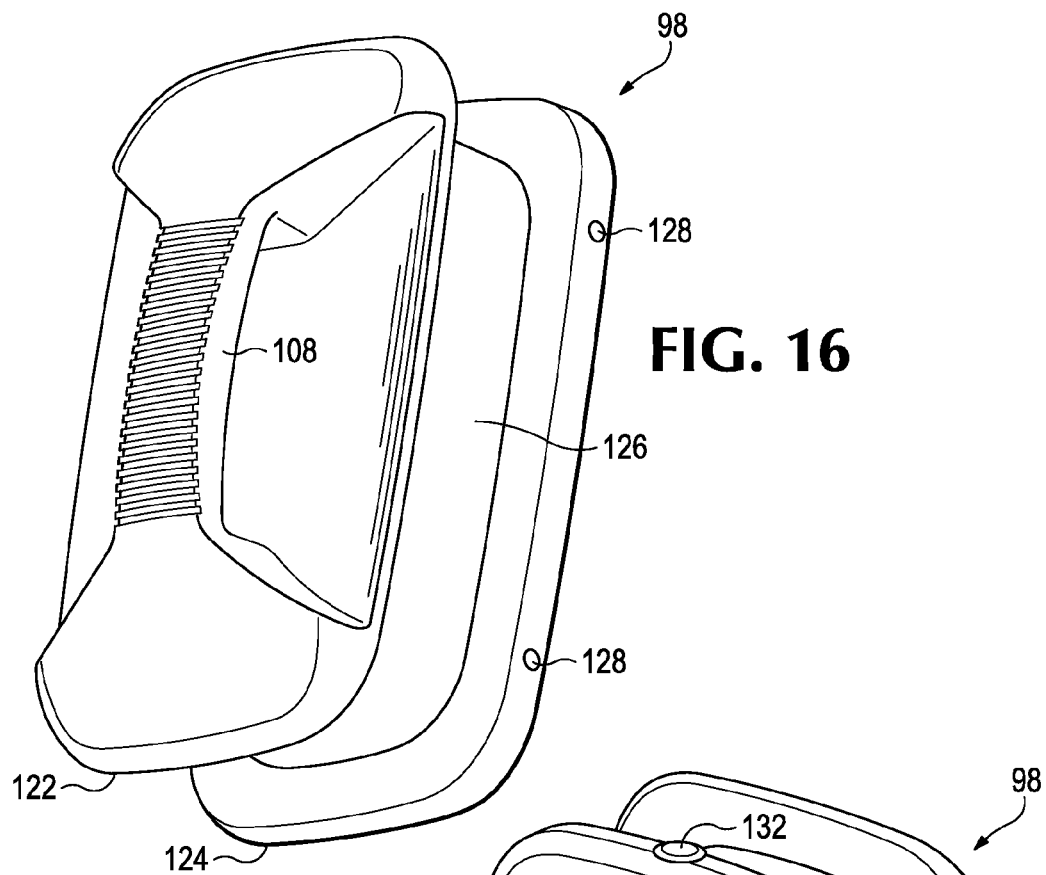
Figure 17:
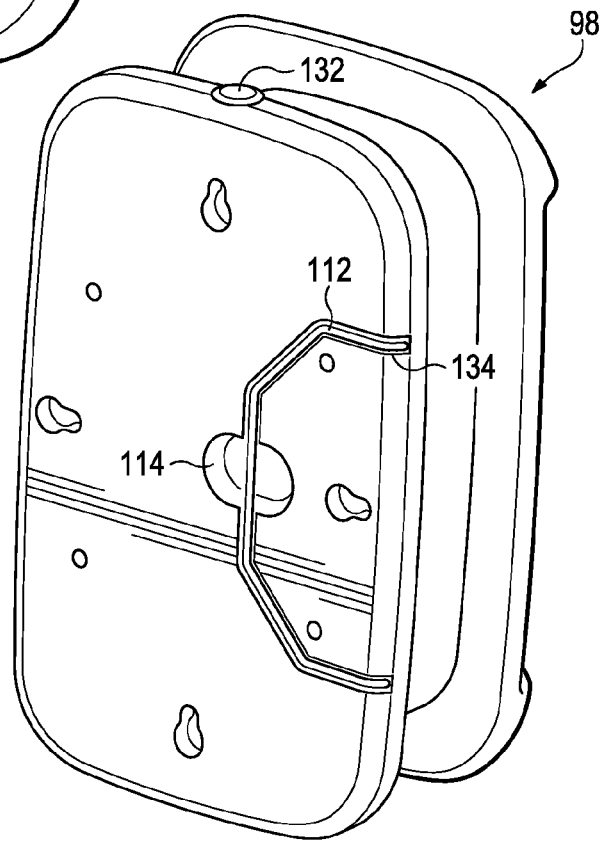
Figure 18:
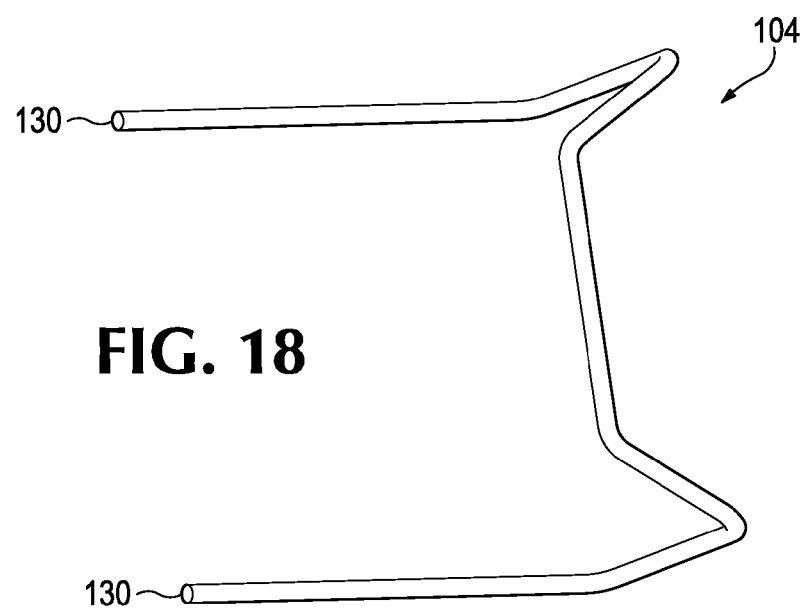

FIGS. 16 and 17 illustrate more details of the housing 98. Referring to FIG. 16, the housing includes a front plate or flange 122 and a rear plate or flange 124 connected by a midsection 126. The plates and midsection form a channel around the housing which enables the housing to function as a spool or reel for wrapping the charging cord and/or power cord. The channel may be deep enough to fully or partially receive the vehicle charging connector either by itself or with any number of turns of a cord wrapped around the housing. Holes 128 along the edge of the rear flange receive ends 130 of the wire frame connector holder 104 as shown in FIG. 18. Stops may be attached to the ends of the wire frame to prevent the holder from falling out of the housing.

Figure 19:
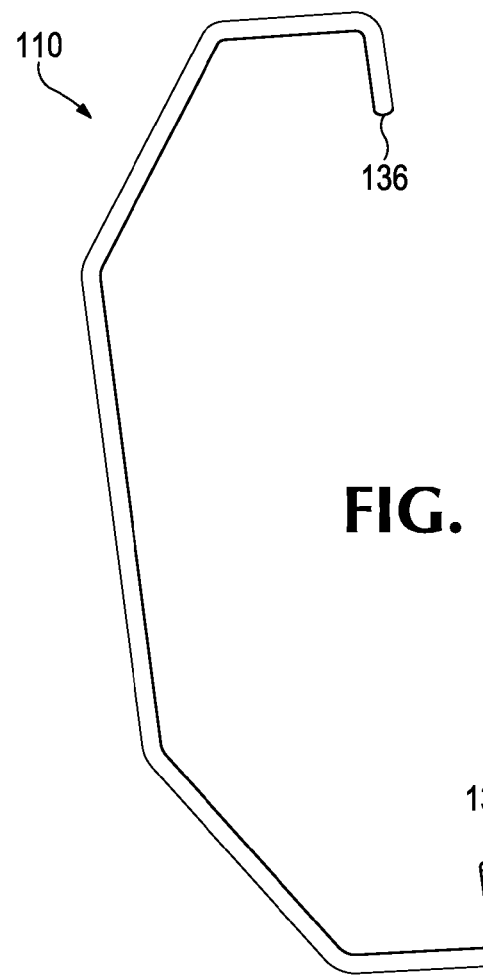

Referring to FIG. 17, the rear flange includes an enlarged flat space 132 on its top edge to provide a location for an entry hole, grommet and/or strain relief for the power cord 100. The rear flange may also include one or more holes 134 in or near the channel 112 to receive ends 136 of the wire frame handle 110 as shown in FIG. 19.

Figure 20:
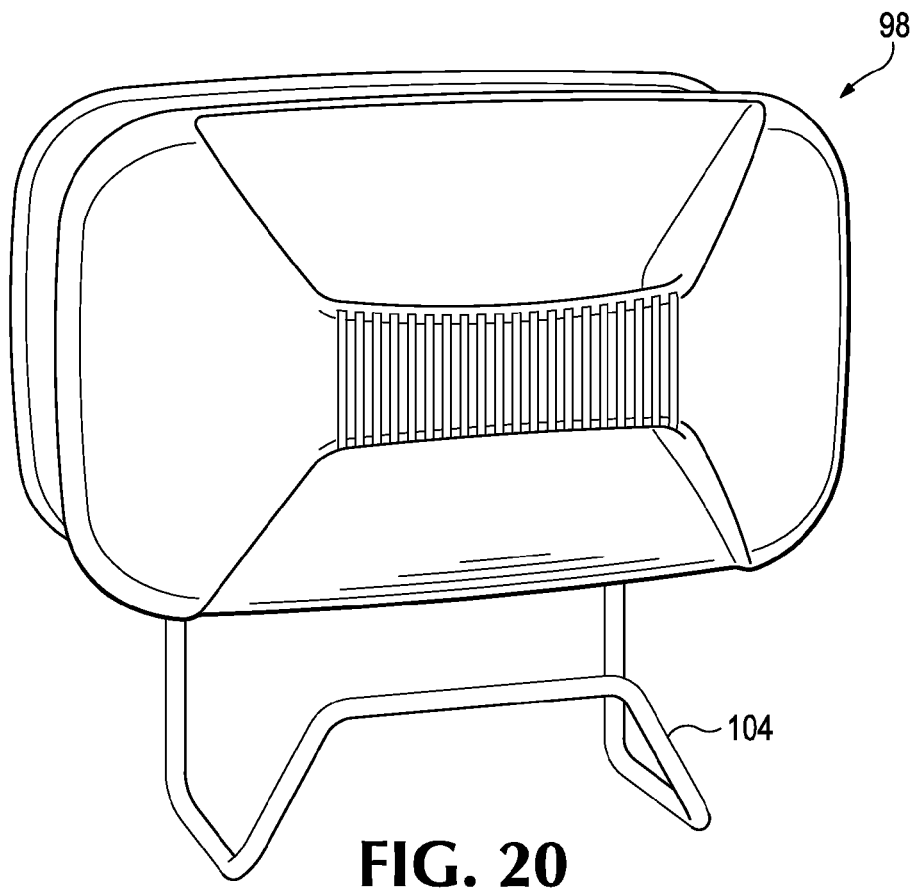

Referring to FIG. 20, the sliding holder 104 may be fully extended from the housing 98 to enable the holder to function as a cord hanger when the housing is oriented horizontally as shown in FIG. 20, especially if mounted on a wall or other structure. The charging or power cord may be draped over the hanger to allow the user to wrap the cord more quickly using larger loops than could be wrapped around the housing. The charging or power connector may also be placed on the holder in this configuration.

Though not visible, the housing may also include a pocket to provide an entry point for the charging cord which may also include a grommet and/or strain relief. The contours of the pocket may be angled so that the charging cord emerges from the pocket at an angle to facilitate wrapping the cord around the housing. Alternatively, another flat spot may be provided on the bottom edge of the rear flange or at any other suitable location to provide a point of entry for the charging cord. The handle 108, front and rear flanges 122 and 124, and any other portions of the housing may be provided with rounded corners and radiused edges as shown in the drawings, and other refinements for aesthetic and/or functional purposes.

As with the embodiments of FIGS. 4-7, the housing 98 shown in FIGS. 14-17 and 20 may include relays, contactors, circuit boards, transformers, modules, lights, displays, charging circuits and/or any other components to implement an electric vehicle supply circuit such as a circuit for charging a vehicle with the cord set.

The inventive principles illustrated with respect to the embodiments of FIGS. 14-20 may provide some or all of the benefits described above with respect to the embodiments of FIGS. 4-7. Additionally, specific features described and illustrated with respect to the embodiments of FIGS. 14-20 may provide additional benefits. For example, in addition to holding the charging or other connector, the sliding holder may provide additional support to prevent the cord from unwinding. As another example, in the extended configuration of FIG. 20, the cord holder may be used to hold an extension cord which the user may need to plug the cord set into a wall outlet.

The embodiments illustrated above with respect to FIGS. 14-20, as well as others above and below, are described in the context of some specific implementation details, but the inventive principles are not limited to these details, and many variations are possible within the scope of the inventive principles. For example, the holder 104 is shown as a sliding wire-frame structure, but the holder may also be realized with some other type of open structure, or a partially or fully enclosed structure. Rather than a sliding motion, the holder may be articulated with swinging or rotating motion, or it may be held in a fixed position.

Some of the inventive principles of this patent disclosure relate to the use of a cord-and-plug power connection for EVSE systems that utilize dedicated power sources. An example of an EVSE system that utilizes a dedicated power source is an AC Level 2 charging system according to the SAE J1772 standard. This standard defines AC Level 2 charging as utilizing dedicated AC at a nominal voltage of 208-240 VAC and a maximum continuous current of 32 A. Prior art Level 2 EVSE enclosures are hard-wired to premises wiring.

According to some inventive principles of this patent disclosure, an EVSE system may include an electrical enclosure, an electric vehicle supply circuit disposed within the electrical enclosure and constructed and arranged to provide power to an electric vehicle from a dedicated power source, a power connector adapted to connect to a receptacle to receive power from the dedicated power source, and a power cord having a first end coupled to the power connector and a second end coupled to the electric vehicle supply circuit. In some embodiments, the electric vehicle supply circuit and the power connector may be adapted for AC Level 2 vehicle charging. The power connector may be, for example a NEMA 6-50 plug.

Figure 21:
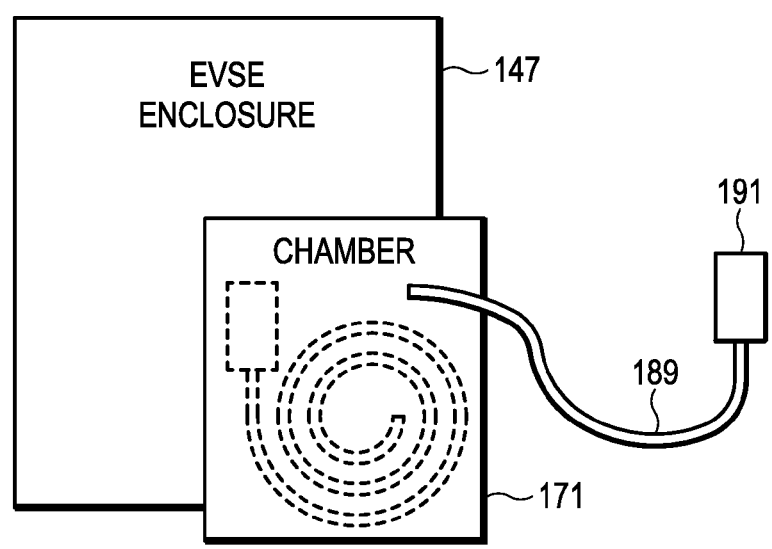
FIG. 21 illustrates an embodiment of an EVSE enclosure according to some inventive principles of this patent disclosure.

FIG. 21 illustrates an embodiment of an EVSE enclosure according to some inventive principles of this patent disclosure. The enclosure 147 includes a chamber 171 that may enclose all or a portion of a cord 189 and/or a plug or connector 191 while in use and/or while not in use. The chamber 171 may be completely or partially contained within the enclosure, located outside of the enclosure, integral with or separate from the enclosure, etc. The cord 189 may extend partially or completely out of the chamber to the plug or connector as shown in solid lines in FIG. 21, or may be contained within the chamber as shown in broken lines. The chamber may include multiple cords of any type such as power cords, charging cords, etc. The enclosure may also include multiple chambers, each of which accommodates one or more cords, plugs, connectors, etc. The enclosure 147 may include relays, contactors, circuit boards, transformers, modules, lights, displays, charging circuits and/or any other components to implement an electric vehicle supply circuit such as a circuit for charging a vehicle.

Figure 22:
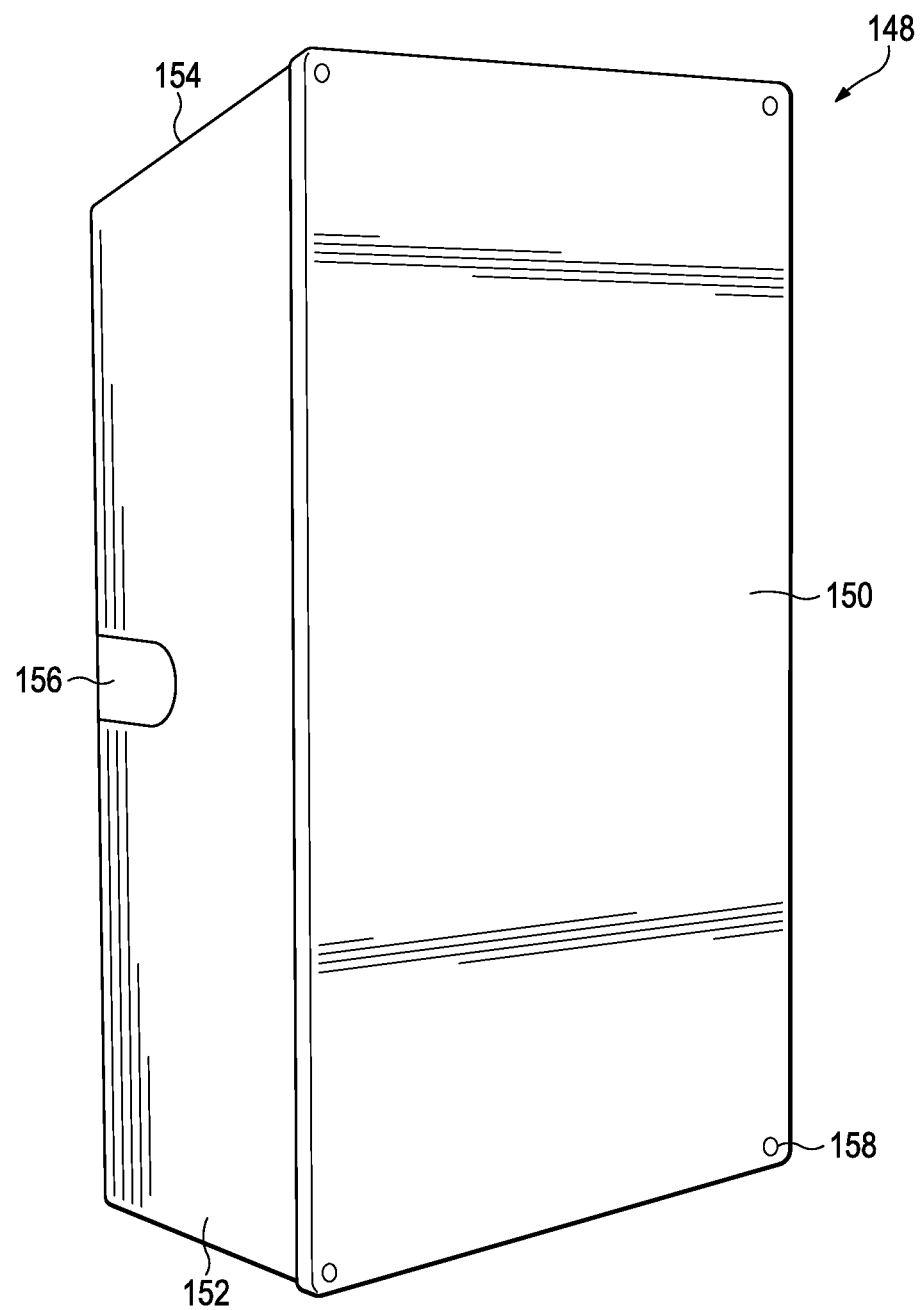
FIGS. 22-25 illustrate an embodiment of an EVSE enclosure according to some inventive principles of this patent disclosure.

FIGS. 22-25 illustrate an embodiment of an EVSE enclosure 148 according to some inventive principles of this patent disclosure. In the view of FIG. 22, a front panel 150 and a first side panel 152 are visible. The side panel has a sloping top edge 154 to match the downward slope of a top panel which is obscured in this view. The side panel also includes a U-shaped knockout 156 which may be removed for use as an entry point for a power cord, or for any other suitable purpose. The front panel may be formed integrally with the enclosure or made removable. In the example of FIG. 22, the front panel may be secured to the rest of the enclosure using screws that pass through holes exemplified by hole 158 at each corner, but any other suitable fastening technique may be used.

Figure 23:
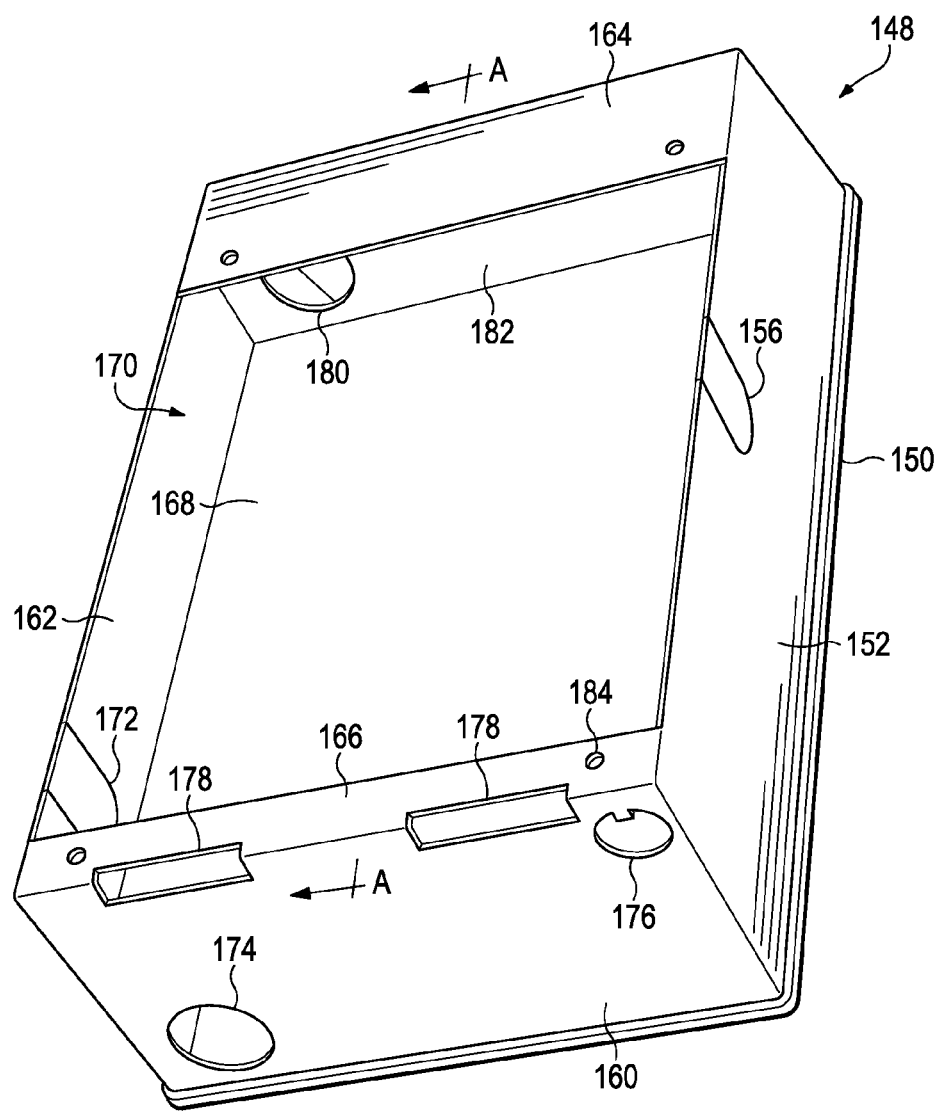

Referring to FIG. 23, the enclosure also includes a bottom panel 160 and a second side panel 162, as well as upper and lower back panels 164 and 166 which leave a portion of the back open. An inner panel 168 has an L-shaped cross section and is arranged to form an open chamber 170 with portions of the first and second side panels, the bottom panel, the lower back panel, and a portion of the upper back panel. The second side panel includes another U-shaped knockout 172. The bottom panel includes an opening 174 for a charging cord and a spare knockout 176. Mounting slots 178 are formed at the juncture of the bottom and lower back panels. An opening 180 for a power cord is formed in an upper portion 182 of the inner panel. The upper and lower back panels include mounting holes exemplified by hole 184.

Figure 24:
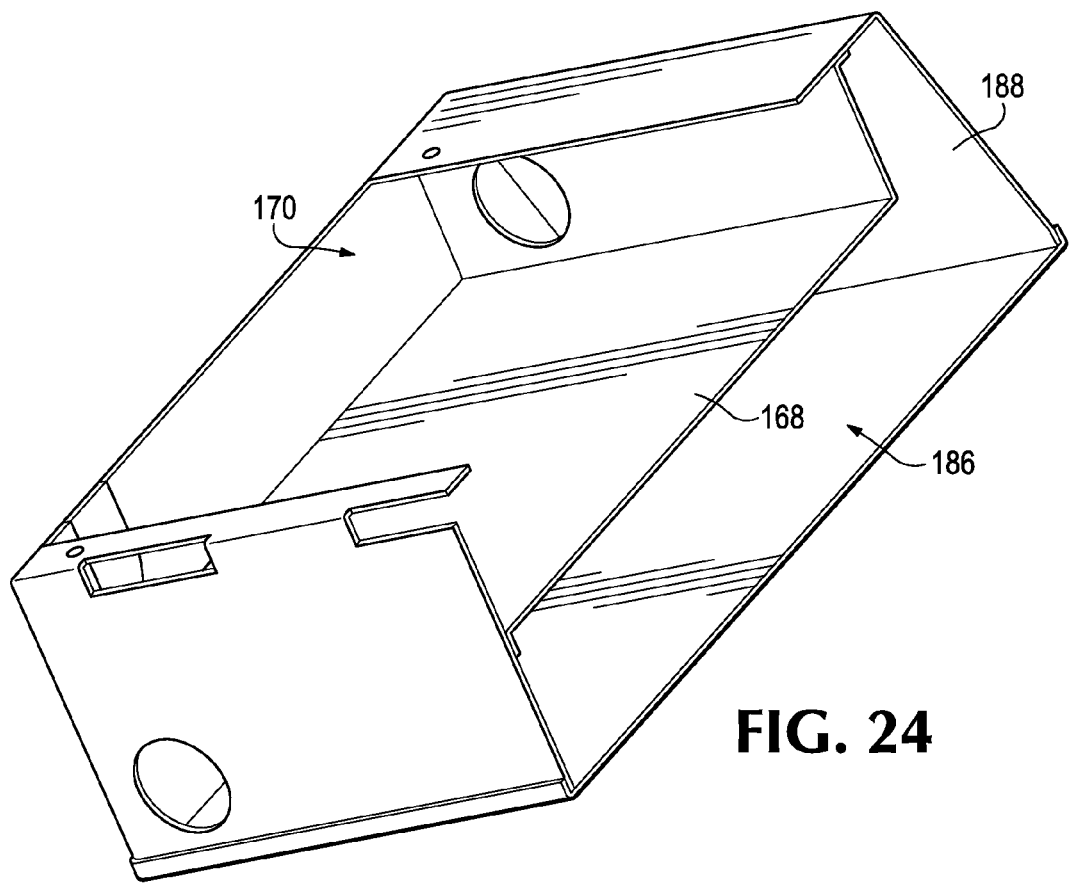

FIG. 24 is a partial cutaway perspective view of the enclosure 148 with a cross-section taken through the plane shown by arrows A-A in FIG. 23. FIG. 24 illustrates how the inner panel 168 divides the open chamber 170 from an inner chamber 186 of the enclosure. In this view, the downward and backward sloping top panel 188 is visible.

Figure 25:
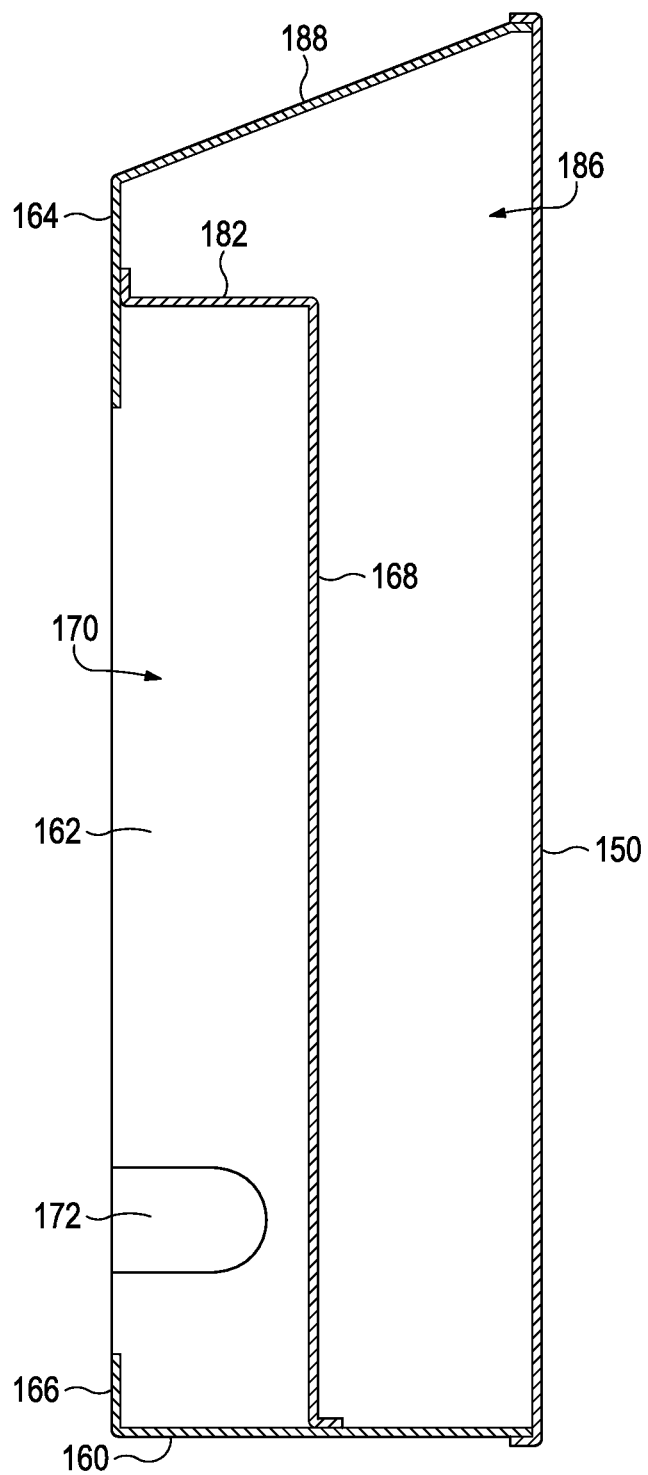

FIG. 25 is a perpendicular cross-section taken through the plane shown by arrows A-A in FIG. 23. This view includes cross-sections of the front panel 150, bottom panel 160, top panel 188, upper and lower back panels 164 and 166, and the inner panel 168 including the top portion 182. The side panel 162 and knockout 172 are also visible in this view.

The enclosure 148, especially the inner chamber 186, may include one or more relays, contactors, circuit boards, transformers, modules, lights, displays, charging circuits and/or any other components to implement an electric vehicle supply circuit such as a circuit for charging a vehicle. The panels of the enclosure, especially the front panel 150 may provide accessible locations for user interface devices such as displays, lights, switches, keypads, etc., as well as aesthetic design elements such as face plates, bezels, and the like.

FIGS. 26-29 illustrate embodiments of systems for providing power to EVSE apparatus according to some inventive principles of this patent disclosure. The embodiments of FIGS. 26-29 are illustrated in the context of an enclosure such as the one described above with respect to FIGS. 22-25, but the inventive principles are not limited to the particular details of that embodiment.

Figure 26:
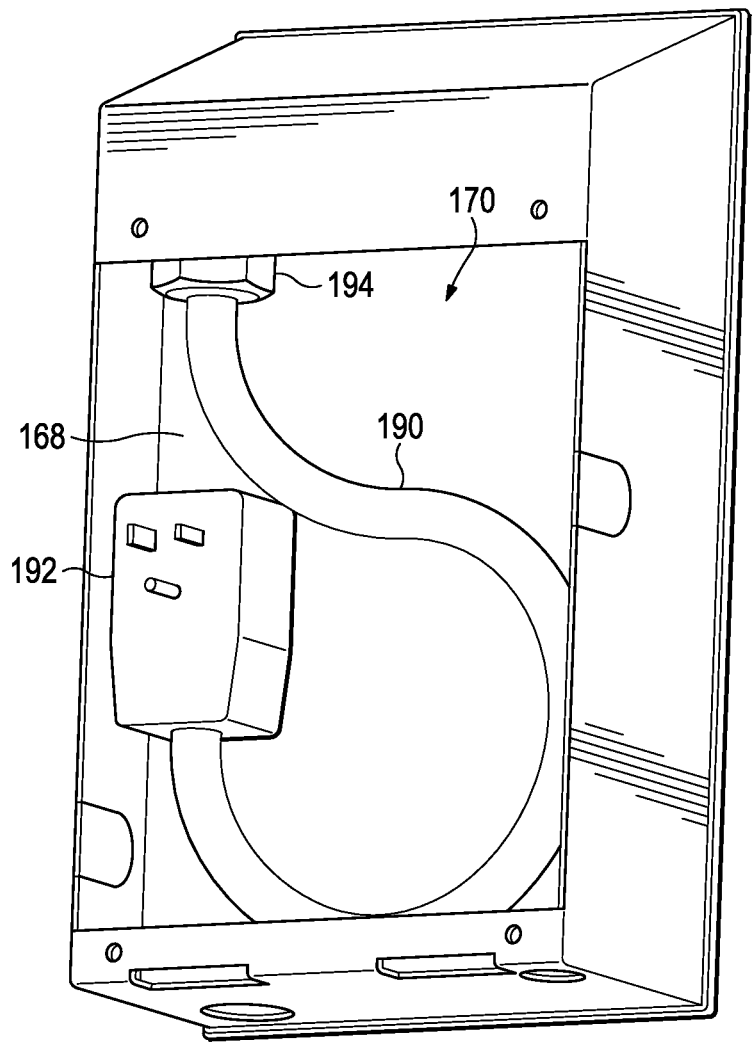
FIGS. 26-29 illustrate embodiments of systems for providing power to EVSE apparatus according to some inventive principles of this patent disclosure.

FIG. 26 illustrates an embodiment in which a power cord 190 and plug 192 are connected to the enclosure with a fitting 194 which allows conductors in the power cord to pass through the opening in the top portion of the inner panel 168 and into the inner chamber of the enclosure. The power cord 190 may have excess length that is wrapped or otherwise contained within the open chamber 170. The power cord and/or plug may be contained within the open chamber for storage and/or shipping, as well as during use.

Figure 27:
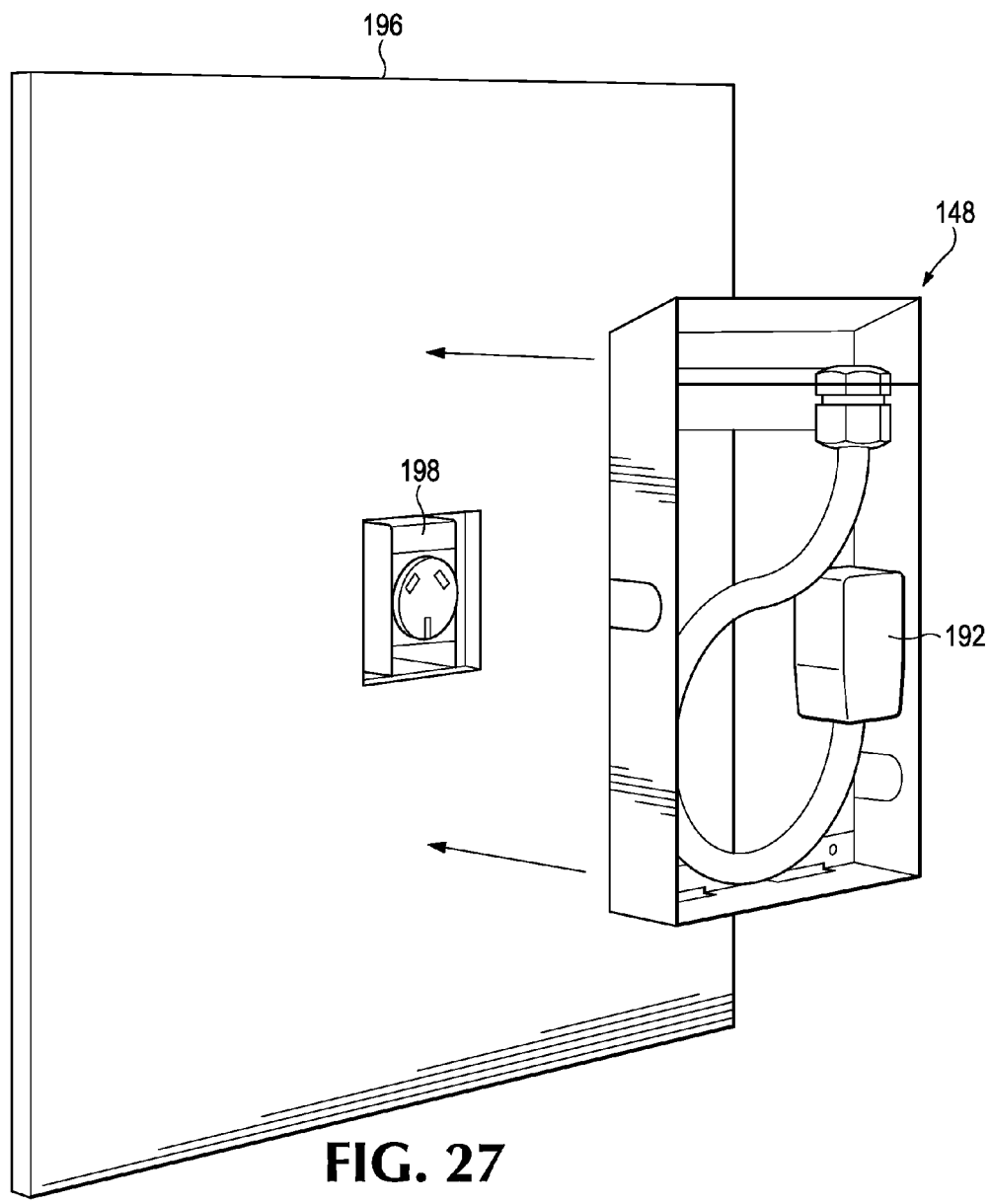

In this configuration, the enclosure 148 may be mounted to a wall 196 or other surface directly over a receptacle 198 for the plug 192 as shown in FIG. 27. Thus, the cord and plug may be completely enclosed within the chamber even while the power cord is plugged into the receptacle. For purposes of illustration, the enclosure 148 in FIG. 27 is shown partially cut away through a plane parallel to the front panel.

In some other embodiments, the plug 192 may be held rigidly in place with respect to the enclosure so that the prongs of the plug may be inserted into a receptacle as the enclosure is mounted on the wall or other structure. In yet other embodiments, the power cord 190 and plug 192 may be replaced or supplemented with a separate set of prongs which are rigidly attached to the enclosure so the separate set of prongs may be inserted into a receptacle as the enclosure is mounted on the wall or other structure.

Figure 28:
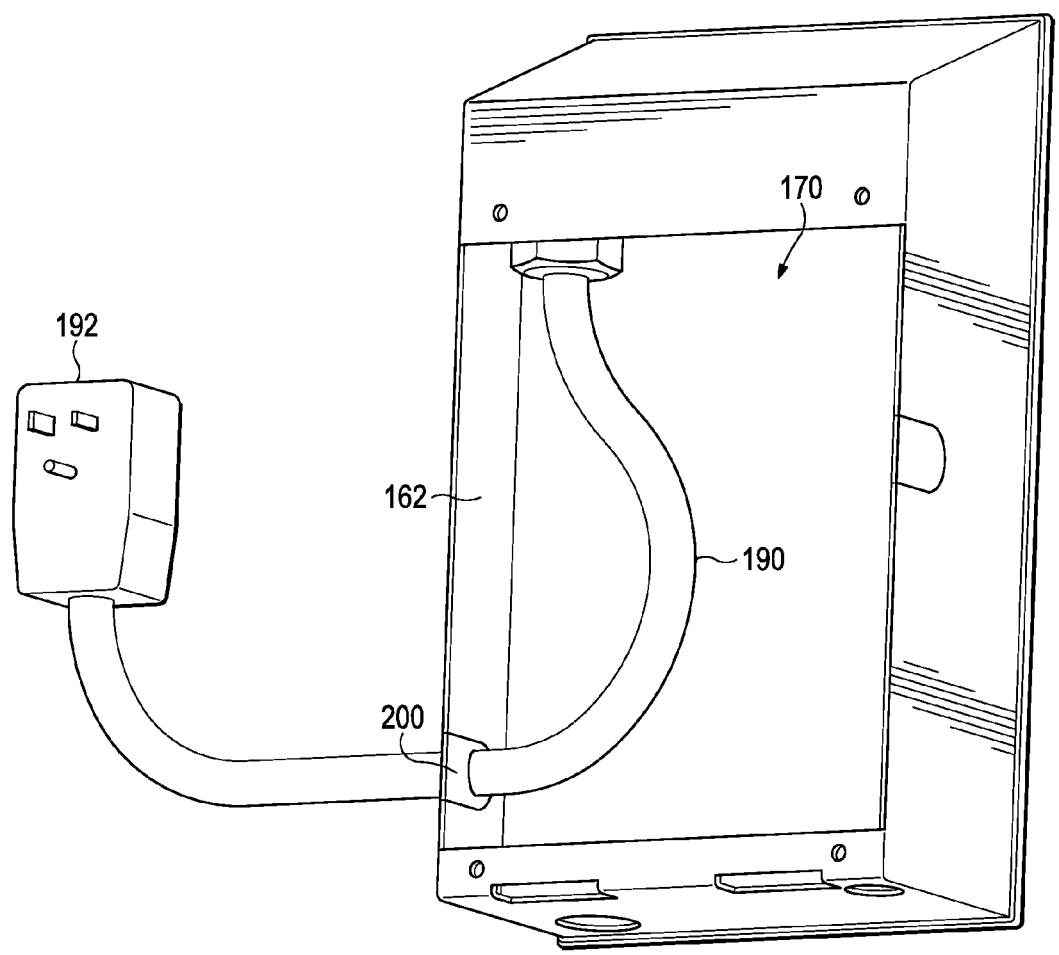

FIG. 28 illustrates an embodiment in which the knockout in the second side panel 162 is removed to allow the power cord 190 to pass through the second side panel so the plug 192 can be plugged into a receptacle that is not located directly behind the enclosure. Excess power cord may be stored within the chamber 170 so that only the minimum length of cord required for the plug to reach the receptacle if visible when the enclosure is mounted to a wall or other surface. A grommet 200 may be placed in the knockout to protect the cord from possible sharp edges on the side panel.

Figure 29:
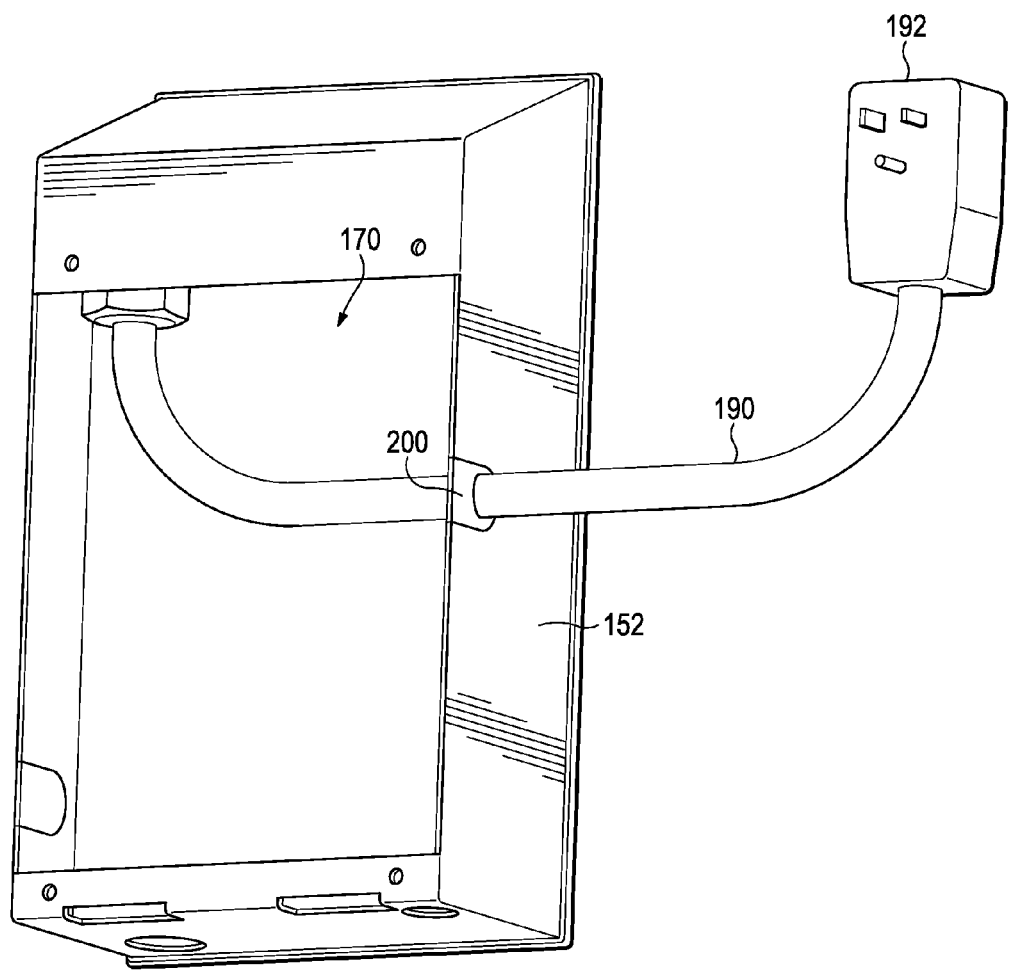

FIG. 29 illustrates an embodiment in which the knockout in the first side panel 152 is removed to allow the power cord 190 to pass through the first side panel. As with the embodiment of FIG. 28, excess power cord may be stored within the chamber 170, and a grommet 200 may be placed in the knockout to protect the cord.

FIGS. 30-35 illustrate embodiments of systems for mounting and cord management for EVSE apparatus according to some inventive principles of this patent disclosure. The embodiments of FIGS. 30-35 are illustrated in the context of an enclosure such as the one described above with respect to FIGS. 22-25, but the inventive principles are not limited to the particular details of that embodiment.

Figure 30:
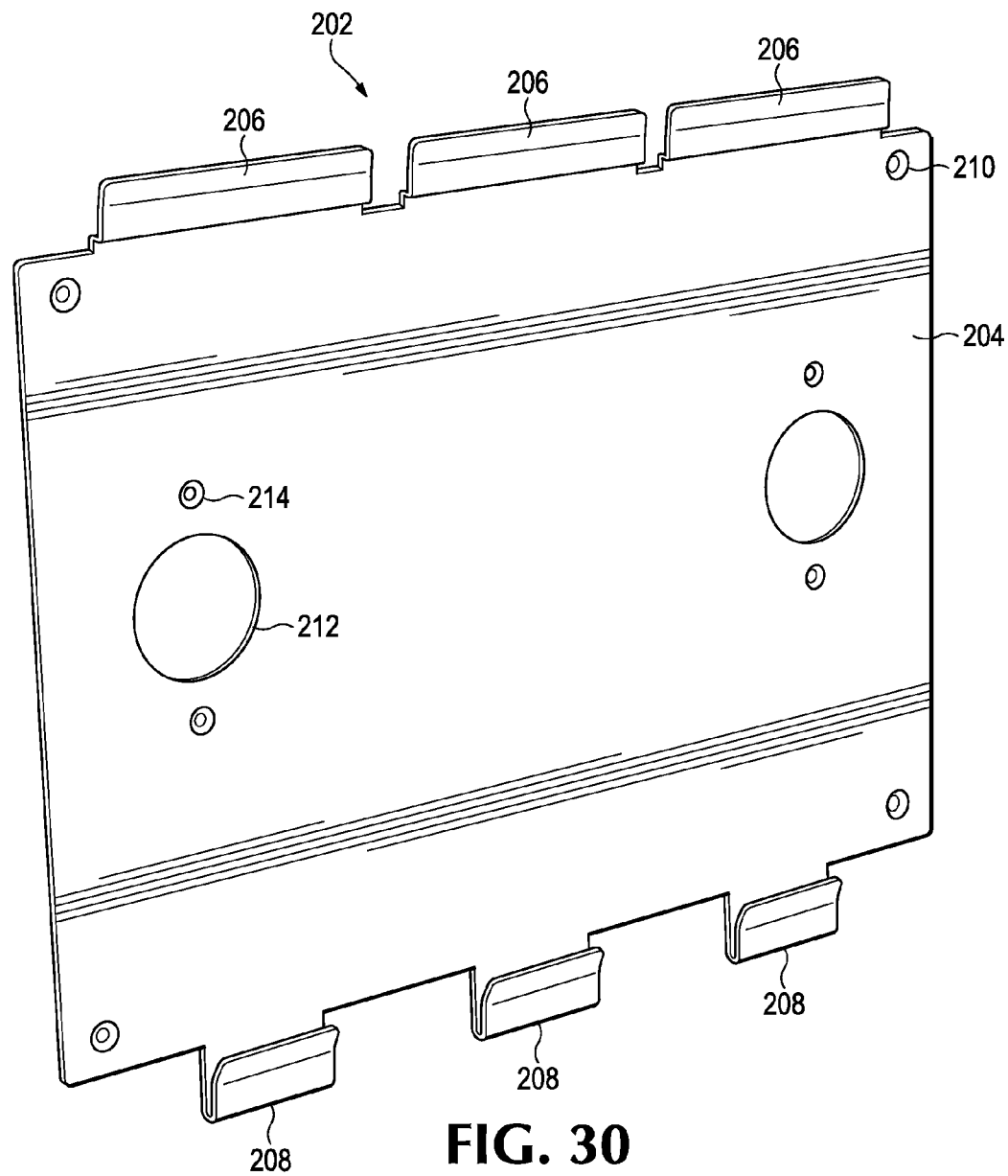
FIGS. 30-35 illustrate embodiments of systems for mounting and cord management for EVSE apparatus according to some inventive principles of this patent disclosure.
Figure 32:
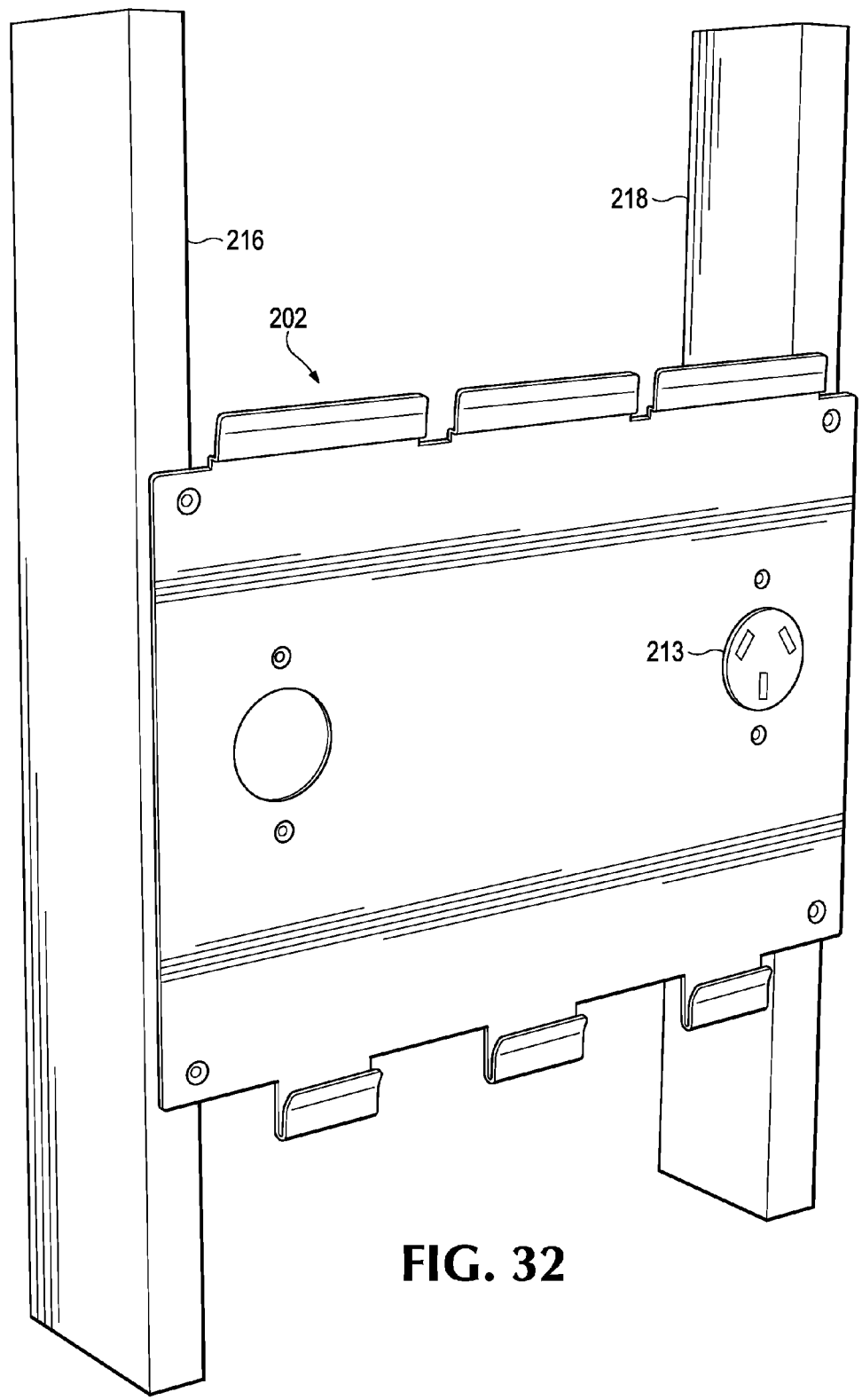

FIG. 30 illustrates a mounting bracket 202 that is formed from a generally flat panel 204 having tabs 206 along a top edge and hooks 208 along a bottom edge. Mounting holes 210 may be included at any suitable location on the panel. In some embodiments, the holes may be placed strategically on 16 or 24-inch centers or other standard spacing to align with wall studs or other suitable structure. One or more apertures 212 may be included to allow access to a receptacle 213 through the panel as shown in FIG. 32. Holes 214 may be included to attach a receptacle to the panel and/or provide a ground connection.

Figure 31:
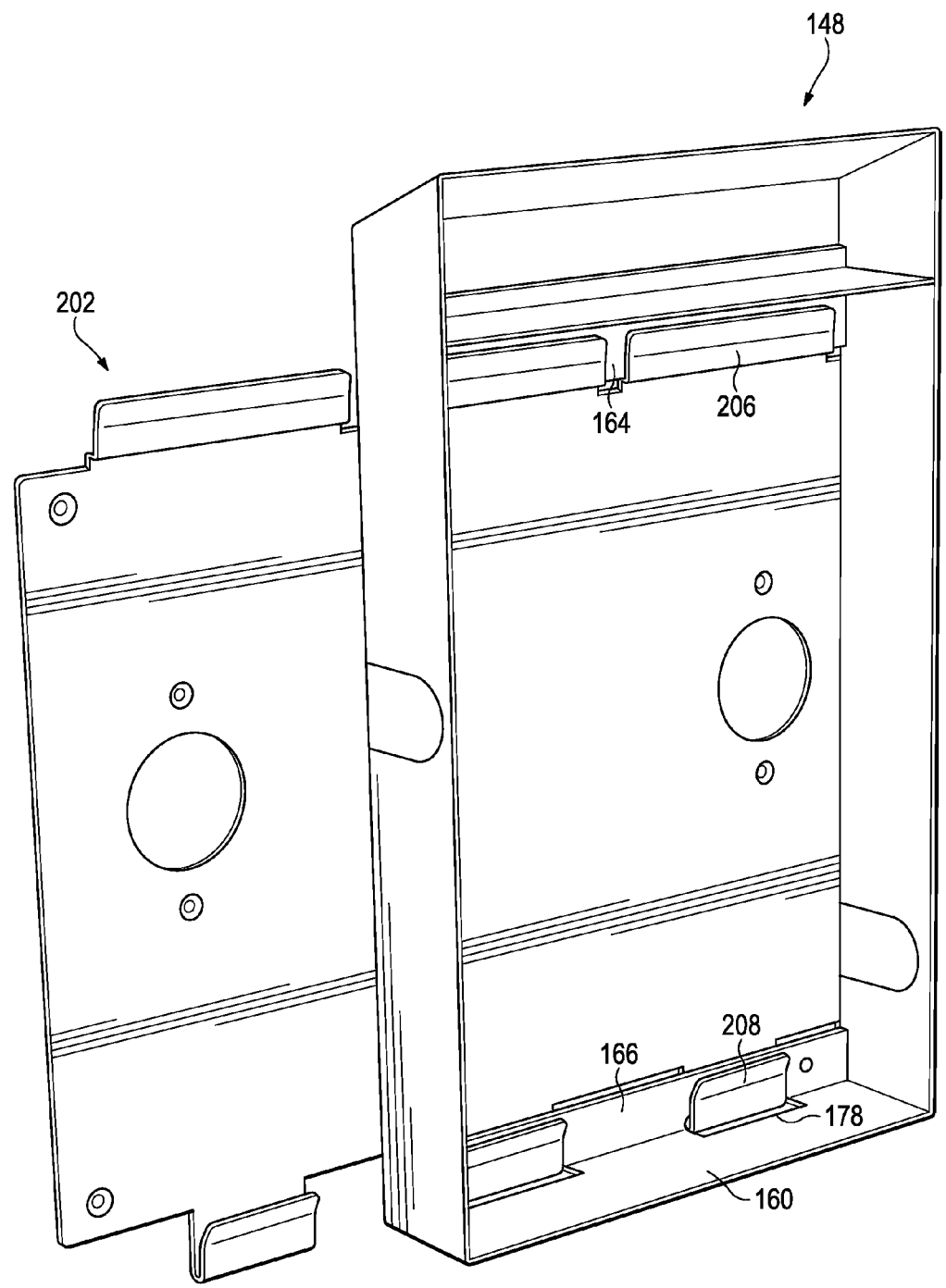

Referring to FIG. 31, the mounting bracket 202 may be attached to a wall or other suitable structure using screws, nails or other fasteners. Enclosure 148 may then be hung on the mounting bracket by engaging the hooks 208 in slots 178 and engaging tabs 206 with the upper back panel 164. The enclosure may be further secured to the mounting bracket with screws, clips or any other suitable fasteners.

The mounting bracket and/or enclosure may be any suitable size and shape. In the examples illustrated in FIGS. 30-32, the mounting bracket 202 is wider than the enclosure 148 so that the bracket can span the standard distance between wall studs 216 and 218 as shown in FIG. 32 where wall cladding is omitted to prevent obscuring the studs. In other embodiments, however, the mounting bracket may be the same width as, or narrower then, the enclosure.

Figure 33:
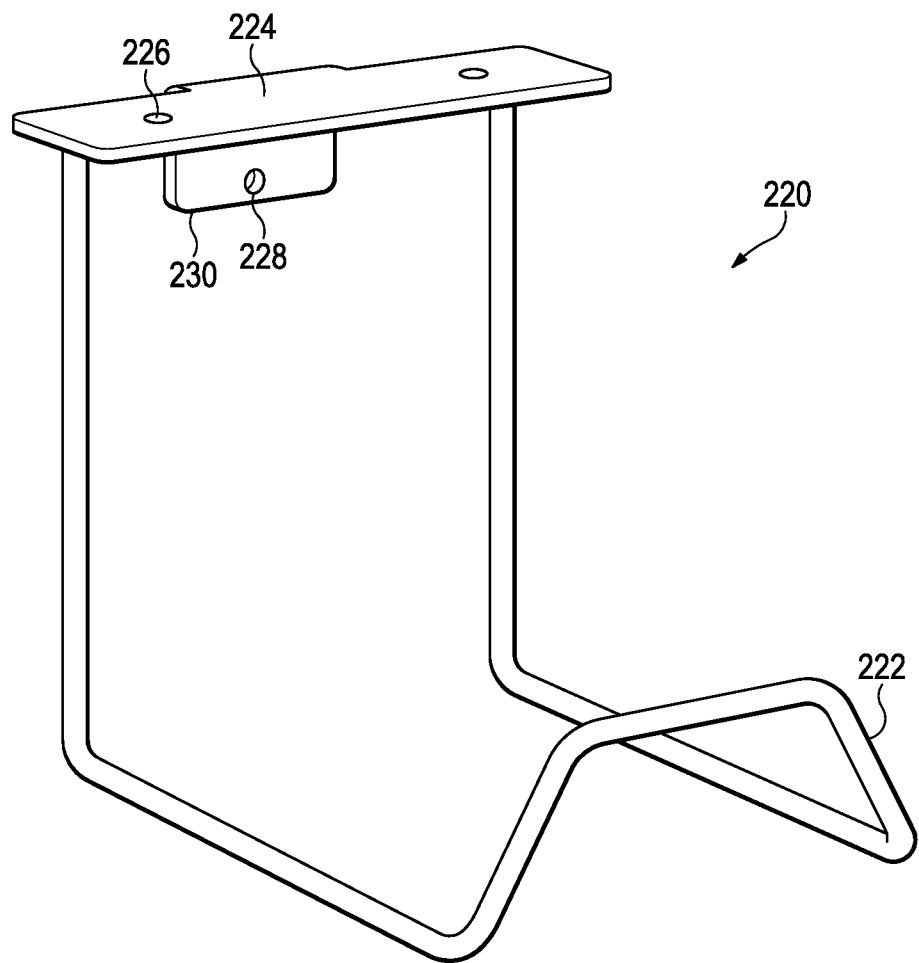
Figure 34:
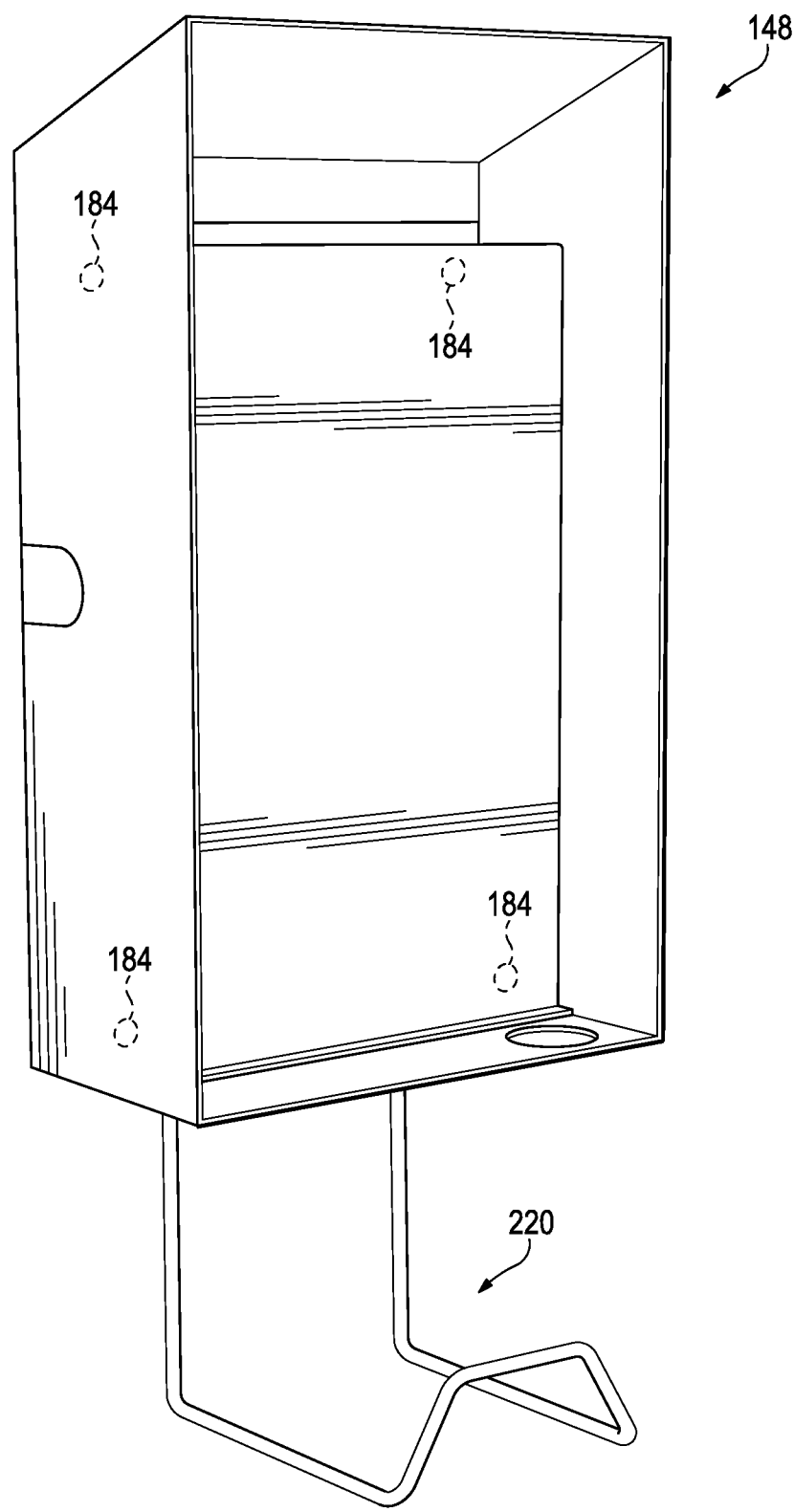

FIG. 33 illustrates a multi-purpose bracket 220 that may be used as both a cord hanger and a mounting aid for mounting an enclosure. The bracket includes a wire frame 222 shaped to hold one or more turns of a charging cord, power cord, etc. The bracket includes a plate 224 that may be attached to the bottom of an EVSE or other enclosure using screws or other fasteners through holes 226. The bracket also includes a tab 230 with a mounting hole 228 that can be used to attach the bracket 220 to a wall or other structure with a screw, nail or other fastener. Once the bracket 220 is in place, the enclosure may be rested on the bracket to relieve the installer of its weight while holding the enclosure in position for fastening to the wall or other structure. For example, the enclosure 148 may be rested on the bracket 220 while the installer drives screws or nails through mounting holes 184 as shown in FIG. 34.

Figure 35:
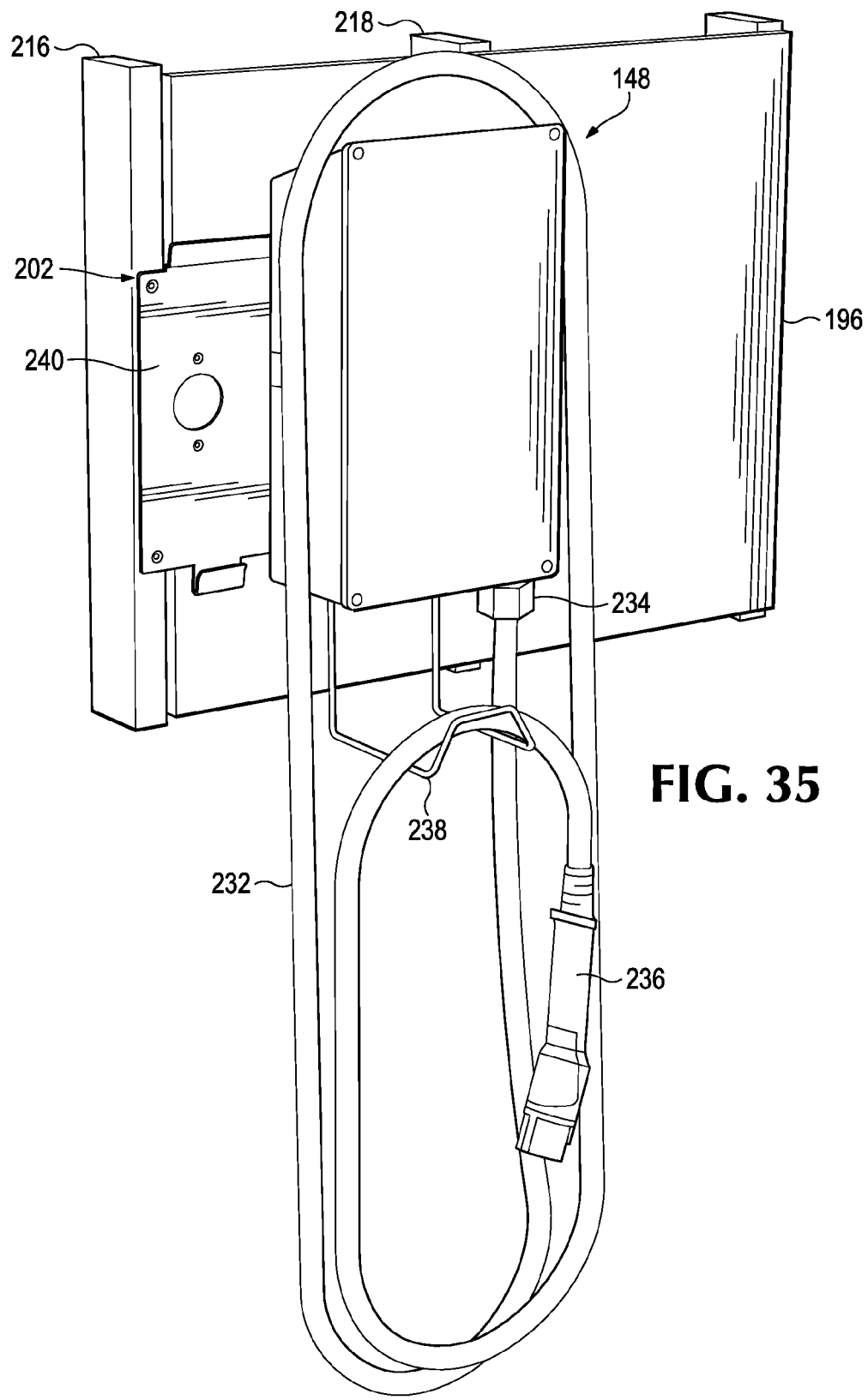

FIG. 35 illustrates an embodiment that combines several of the inventive principles to create a versatile solution for vehicle charging. EVSE enclosure 148 is attached to mounting bracket 202 which is anchored to wall studs 216 and 218 behind cladding 196. Power is provided to the EVSE through a plug and cord assembly which is concealed within the enclosure as shown in FIGS. 26 and 27 and plugged into a receptacle that is mounted in a wall box and is accessible through the mounting bracket as shown in FIG. 32. A charging cord 232 is connected to the enclosure at one end through a fitting 234 and has a vehicle charging connector 236 at the other end. A cord hanger 238 is attached to the bottom of the enclosure and/or the wall under the enclosure. The cord may be wrapped on the hanger 238 and/or over the enclosure 148. In some embodiments, a holder for the connector and/or cord may be mounted to the exposed portion 240 of the mounting plate to conceal the exposed portion and/or provide a storage space for the connector and/or cord.

Some additional inventive principles of this patent disclosure relate to providing a combination of connection methods for charging vehicles. For example, the enclosure illustrated in FIG. 35 may be configured to provide Level 2 charging through the charging cord 232, while also including another receptacle on the front panel or other panel for providing Level 1 charging simultaneously with the Level 2 charging. Such a configuration may be beneficial, for example, in a household with two electric vehicles, when both need charging at the same time. The vehicle needing the deeper charge cycle may be connected for Level 2 charging, while the other vehicle may be charged using the Level 1 receptacle.

The embodiments and inventive principles described and illustrated with respect to FIGS. 22-35 are not limited to any specific vehicle charging techniques. For example, the illustrated enclosure may be used for AC and/or DC charging at any voltage and current levels, and using any suitable source of power, any power or vehicle charging connectors, etc. These embodiments and inventive principles may, however, be especially well suited for use with Level 2 charging systems under SAE J1772 and/or similar proprietary or standardized systems.

The inventive principles relating to plug-and-cord connected EVSE described above may provide one or more advantages. For example, the best location for mounting a vehicle charger may not be known in advance of receiving the EVSE, which may not be provided to the user until taking delivery of a vehicle. Level 2 charging involves the use of dedicated power circuits at relatively high voltage and/or current levels. If the user waits until receiving the EVSE and/or vehicle, there may be an additional wait to have the EVSE installed.

The use of a plug-and-cord connected EVSE according to the inventive principles of this patent disclosure may enable the user to have a suitable receptacle installed in a best-guess location well in advance of receiving the EVSE and/or vehicle, thereby eliminating potential scheduling delays. Upon taking delivery, the EVSE may then be mounted immediately. If the best-guess location turns out to be ideal or acceptable, the EVSE may be plugged in and mounted directly over the receptacle with the cord and plug concealed entirely within the chamber and/or enclosure. Even if the location of the receptacle turns out to be unacceptable for the EVSE itself, the receptacle can still be used immediately by mounting the EVSE in an acceptable location, then extending the power cord from the EVSE to the receptacle through one of the knockouts. Any excess cord may be concealed within the chamber and/or enclosure with only the minimum amount of cored exposed to reach the receptacle.

Moreover, the use of plug-and-cord connected EVSE according to the inventive principles of this patent disclosure may facilitate future relocation, upgrade, etc. of the EVSE. If the user decides to relocate the EVSE, it may be accomplished without having to move any hard wiring. Likewise, if a failed unit must be replaced, or the user decides to upgrade to EVSE having a higher charging capacity, more features, etc., it may be replaced without removing or changing any hard wiring.

Some additional inventive principles of this patent disclosure involve methods and apparatus relating to prewiring for EVSE. For example, a vehicle manufacturer or supplier, an electric utility, or other facilitator may provide a user with a prewire kit as part of a sales transaction, electric vehicle promotion, etc. A prewire kit may include various combinations of components and/or other elements according to some of the inventive principles of this patent disclosure. For example, in one embodiment, a prewire kit may include a standard power receptacle and instructions, recommendations, or the like in paper, electronic, online, etc. form. Alternatively, the device may be supplied with built-in memory which may automatically supply any suitable information upon power up in a pop-up fashion (i.e.—similar to the pop-up notification when a CD is inserted into a computer. In another embodiment, a prewire kit may include a receptacle, a wall box, and a mounting bracket for the EVSE. Since some power receptacles may be unsightly and/or make some people feel uneasy, especially with higher power receptacles and/or households with children, an outlet cover may be included in a prewiring kit to cover and protect the receptacle while not in use. In yet other embodiments, a prewire kit may include a plug-in EVSE unit or an EVSE wiring device as described above and/or below.

An embodiment of a method according to some inventive principles of this patent disclosure may include providing an electric vehicle to an electric vehicle user, and providing a prewiring kit to the electric vehicle user. The prewiring kit may include one or more components adapted to facilitate connection of electric vehicle supply equipment to premises wiring at the electric vehicle user's premises.

The inventive principles described above with respect to the embodiments of FIGS. 22-35 may provide additional individual and collective benefits. For example, by making the top of the enclosure slope downward to the back, it may enable a user to wrap the cord over the enclosure as shown in FIG. 35. This may allow the cord to be stored using fewer, larger turns that take less time to wrap. The angled top may also discourage the placement of beverage containers or other objects on top of the enclosure.

As explained above, the use of a chamber or other cord management according to the inventive principles may provide a more professional looking installation because it may conceal excess cord. Moreover, this may enable the manufacturer to provide all models with the same cord length, there by reducing the costs and logistics associated with fabricating and stocking multiple models with different cord lengths.

As a further potential benefit, a mounting bracket for an EVSE enclosure may be used as an enclosure panel, even if it is not used as a mounting bracket. For example, in the embodiment of FIG. 31, the mounting bracket 202 may be attached to the enclosure 148 as a back panel using screws or other fastening techniques.

Although the embodiments of FIGS. 22-35 may be especially beneficial as plug-and-cord connected equipment, they may still be hard wired using any suitable opening such as the knockout 176 shown in FIG. 23, for example, in locations where codes or standards may not allow plug-and-cord connected equipment.

As with all of the embodiments described in this patent disclosure, the embodiments described and illustrated with respect to FIGS. 22-35 are not limited to the details used to illustrate the inventive principles. For example, the cord management chamber is not limited to the specific arrangement of panels illustrated above, or to any particular shape or size. Moreover, the chamber need not be an open chamber; for example, an additional back panel may be placed over the chamber in the embodiments illustrated in FIGS. 28 and 29, and even the embodiment of FIG. 26 if an opening is provided for the plug. The purpose and locations of the openings for the charging and power cords may be reversed or changed. The inventive principles are also not limited to any particular materials. In some embodiments, an enclosure or housing may be made of folded sheet metal, but in other embodiments, molded plastic may be utilized.

Figure 36:
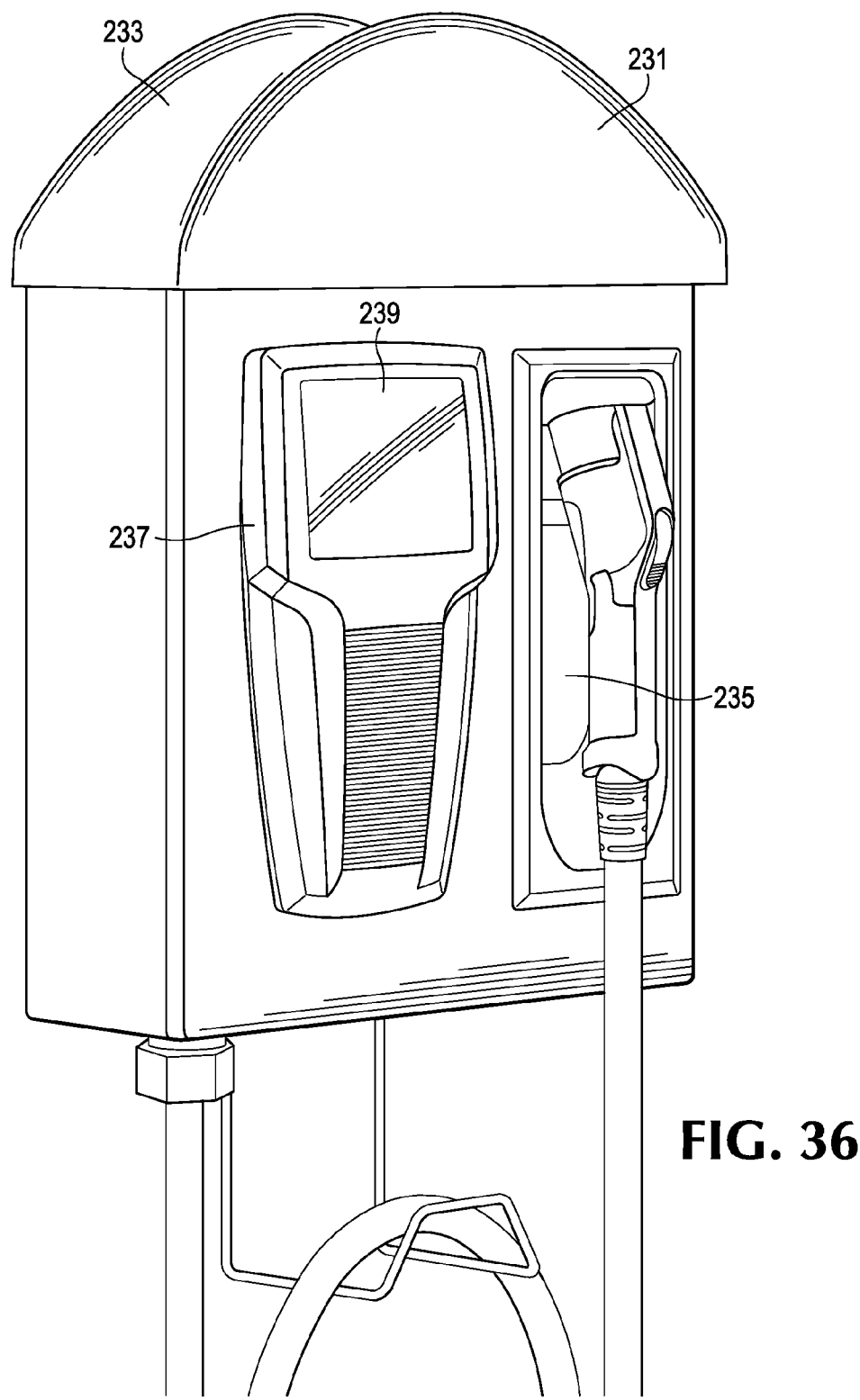
FIG. 36 illustrates another embodiment of an EVSE enclosure according to some inventive principles of this patent disclosure.

FIG. 36 illustrates another embodiment of an EVSE enclosure according to some inventive principles of this patent disclosure. The embodiment of FIG. 36 is similar to the embodiment of FIG. 35, but with the following differences.

Referring to FIG. 36, the top of the EVSE housing includes a cap 231 having a channel 233 with a rounded cross-section to accommodate looping the charging cord over the top of the housing for storage while not in use, or to take up excess length in the cord. In the embodiment of FIG. 36, the cap is shaped like a portion of a spool. The front panel of the housing also includes a holder 235 to receive the charging connector. The holder may be recessed as shown in FIG. 36, and/or it may utilize any of the techniques disclosed in this patent disclosure for holder the charging connector including straps, a cradle, and/or a docking storage connector as shown in FIGS. 11-13.

The embodiment of FIG. 36 also includes a bezel 237 mounted to the front panel and having a screen 239 or other display for a user interface. The bezel may also be adapted to include buttons, keypads or user inputs.

Some additional inventive principles relate to electric vehicle supply circuits for EVSE. An electric vehicle supply circuit is designed to provide power to an electric vehicle from a power source and includes at least an interrupting device and control circuitry to cause the interrupting device to interrupt the flow of power from the power source to the electric vehicle in response to conditions relevant to electric vehicles. Examples of conditions relevant to electric vehicles include a ground fault condition, an inoperable grounding monitor circuit, the absence of a vehicle connected to the EVSE, absence of a ready signal from the vehicle, etc.

FIG. 37 illustrates an embodiment of an electric vehicle supply circuit according to some inventive principles of this patent disclosure. The embodiment of FIG. 37 includes a ground monitor 242, a ground fault detector 244, and an interrupting device 246 arranged along the power path between a power source 248 and a vehicle charging connector 250. The power path may accommodate AC and/or DC current flow. Any or all of the ground monitor, ground fault detector and/or interrupting device may include one or more test inputs TEST1, TEST2, TEST3, respectively, and one or more monitor outputs MONITOR1, MONITOR2, MONITOR 3, respectively. The test inputs may include any type of analog, digital or hybrid signals for initiating, controlling, resetting, etc., a testing operation. The monitor outputs may include any type of analog, digital or hybrid signals for monitoring, measuring, reporting, etc., a testing operation. Any of the testing and/or monitoring signals may operate manually, automatically, or in any other suitable manner. Not all of the elements are required in every embodiment, and the number, order and arrangement of elements may be changed.

The embodiment illustrated in FIG. 37 may provide a versatile framework for implementing an electric vehicle supply circuit adapted to any vehicle charging situation. For example, it may be used to implement a vehicle charging station under any of the standards currently published or under development such as UL 2231, IEC 61851-22, etc. In the context of UL standards, the ground fault detector 244, and interrupting device 246, taken together, may be used to implement a charging circuit interrupting device (CCID) which is required to disconnect the source of power if the difference between the current flowing in the current-carrying conductors (differential current) exceeds a predetermined threshold. Any differential current is usually assumed to be caused by a ground fault which may present an electrocution hazard. This is essentially the same operating principle as a common ground fault circuit interrupter (GFCI) which is typically designed to interrupt the flow of power (trip) if the differential current exceeds 5 mA.

In the case of electric vehicle charging, however, 5 mA may be an unacceptably low trip point. Natural nonhazardous current paths through the vehicle to ground may routinely exceed 5 mA, thereby causing excessive nuisance tripping that interrupts the charging process. Therefore, UL standards allow a CCID to have a trip point of 20 mA if the system is equipped with a grounding monitor that interrupts the power circuit if it detects an inadequate grounding circuit. UL standards also require a CCID to allow for manual testing or automatic testing before each operation.

FIG. 38 illustrates another embodiment of an electric vehicle supply circuit according to some inventive principles of this patent disclosure. Power is provided by a power source which may include any suitable type of AC and/or DC power source. The power flows through a grounding monitor circuit 254, a ground fault detecting circuit 256, a contactor circuit 258, and a contact monitor circuit 259 on the way to a vehicle charging connector 260. These components may be reordered and/or rearranged in any suitable manner.

The grounding monitor circuit 254 monitors the continuity of a grounding conductor and generates an output signal GMO in response to the state of the grounding conductor. A manual test input GMMT enables the operation of the grounding monitor to be tested manually. An automatic test input GMAT enables the operation of the grounding monitor to be tested in response to an automatic test signal from a controller 262. The output signal GMO is provided to the controller 262 as well as logic 264.

The ground fault detecting circuit 256 monitors the differential current through the current carrying conductors and changes the state of the output signal GFO if the differential current exceeds a threshold. A manual test input GFMT enables the operation of the ground fault detector to be tested manually, while a manual reset input GFMR allows the detector to be reset manually. Automatic test input GFAT and automatic reset input GFAR enable the controller 262 to test and reset the ground fault detector. The output signal GFO is applied to the controller 262 as well as logic 264.

The contactor circuit 258 is arranged to close the circuit between the power source and the vehicle connector 260 in response to a CLOSE input signal from logic 264.

The contact monitor circuit generates an output signal CMO in response to the state of one or more switches in the contactor circuit 258. An automatic test input CMAT enables the controller 262 to test and monitor the contactor circuit.

A control pilot connection 266 enables the controller to determine whether a vehicle is connected to the supply circuit, to determine whether the vehicle is ready to receive power, to communicate the current capacity of the supply circuit to the vehicle, etc.

Logic 264 may be configured for interlocking operation. For example, the logic may be configured to assert the CLOSE signal only if the GMO signal indicates that the grounding monitor circuit is operating properly, the GFO signal indicates that no ground fault is present, and the controller asserts the CTRL signal.

The controller 262 may be configured to operate any or all of the features illustrated in FIG. 38. For example, the controller may be configured to test the grounding monitor 254, the ground fault detector 256 and/or the contactor circuit 258 and contact monitor 259 at power-up, each time power is applied to the vehicle, periodically while power is being supplied to the vehicle, etc. The contact monitor circuit enables the controller to monitor the presence of power to determine that the switch or switches in the contactor circuit 258 have actually closed when the CLOSE signal is activated and have actually opened when the CLOSE signal is deactivated and to provide a warning or take other suitable action if the actual state of the contactor circuit is incorrect or if some other fault causes the output power to be in an incorrect state.

Figure 39:
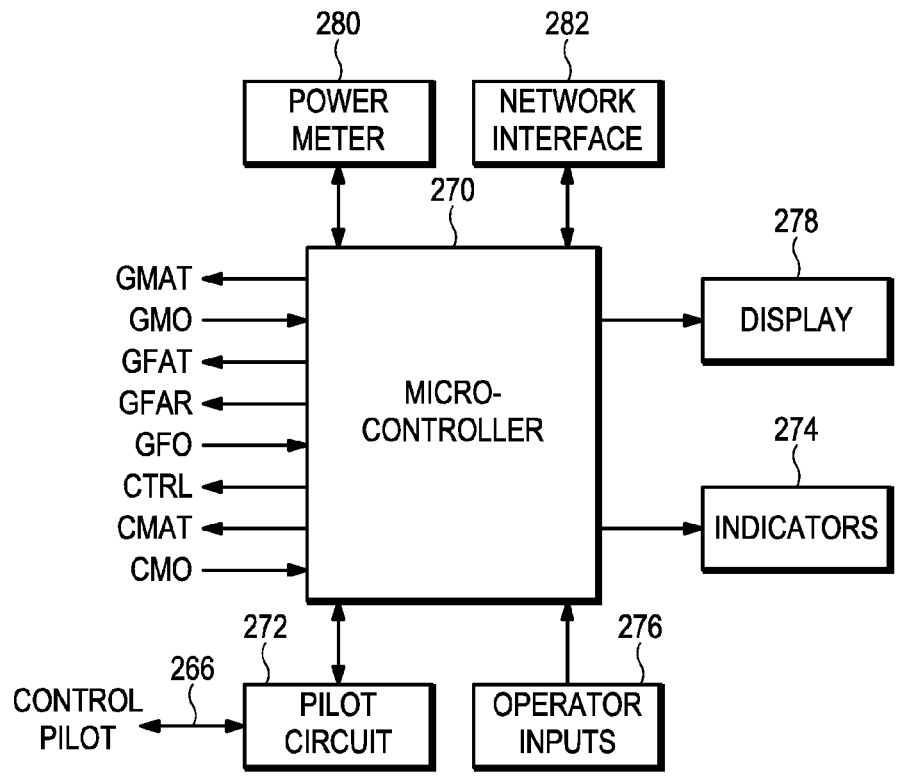
FIG. 39 illustrates an embodiment of a controller according to some inventive principles of this patent disclosure.

FIG. 39 illustrates an embodiment of a controller 262 according to some inventive principles of this patent disclosure. The controller is based on a microcontroller 270, although some or all of the functions of the controller may be implemented with any other suitable analog and/or digital hardware, software, firmware, etc., or any combination thereof. Not all of the elements shown in FIG. 39 are required in every embodiment, and the number, order and arrangement of elements may be changed.

The microcontroller 270 includes digital I/O lines coupled to the test, monitor and reset signals shown in FIG. 38. The controller may include filters, surge suppressors, buffers, amplifiers, comparators, level shifters, level detectors, additional logic, etc., to process these signals on their way to and from the microcontroller. A pilot circuit 272 provides functionality to enable the controller to determine whether a vehicle is connected to the supply circuit, to determine whether the vehicle is ready to receive power, to communicate the current capacity of the supply circuit to the vehicle, to monitor the integrity of the grounding connection, etc., through the control pilot connection 266.

Indicators 274 such as LEDs, lamps, etc. enable the controller to provide a visual indication of the operating condition of the vehicle supply circuit, fault conditions, etc. Some example indicators include a vehicle charging indicator and an EVSE fault indicator.

Operator inputs 276 such as switches, keypads, swipe cards, RFID devices, etc., enable a user to control the operation of the vehicle supply circuit. Some example inputs include switches to start/stop charging, switches to increase/decrease amperage, etc.

A display 278 enables the controller to provide more information to a user than may be conveyed through simple indicators. For example, an alphanumeric display may display vehicle charging current, voltage and/or power, percentage of charging completed, elapsed charging time, cost of power, etc. A display may also provide more detailed information about fault conditions and/or instructions for correcting faults.

A power meter 280 or other device may provide functionality to measure the amount of power transferred through the vehicle supply circuit, obtain authorization for power usage from a utility or other provider, facilitate off-peak rate reductions and/or demand response functions, etc. The power meter may be utility-grade for billing purposes, or it may be a convenience feature. It may be integral with the controller or separate from the controller, for example, in a tamper-proof enclosure. The power meter may be implemented, for example, with a dedicated integrated circuit (IC) such as a Microchip MCP3909 which may be mounted on a main circuit board with the microcontroller 270. Alternatively, the power meter may be arranged on a separate circuit board that may be attached to the main circuit board through a plug-in header to facilitate implementation of the power meter as an optional feature.

A network interface 282 may enable the controller to interface to any suitable network such as a local area network (LAN), wide area network (WAN), home network, the Internet, a control area network (CAN) or other industrial type control network, etc., through any type of network media and using any type of network protocol. Examples include dedicated wires, power line modulation, radio frequency (RF), infrared (IR), and other types of media, Internet Protocol (IP), WiFi, LonWorks, ZigBee, Z Wave, and other types of protocols.

The inventive principles described above respect to the embodiments of FIGS. 37-39 may provide additional individual and collective benefits. For example, by providing automatic testing and/or monitoring of some or all of the vehicle supply circuit functions, the level of safety may be improved because the need for manual testing may be eliminated or reduced, and because it may be possible to implement more rigorous testing procedures. The inventive principles may also enable the implementation of self-diagnostics which may reduce the need for, or cost of, service and/or maintenance, as well as assist a user with troubleshooting the system.

Figure 40:
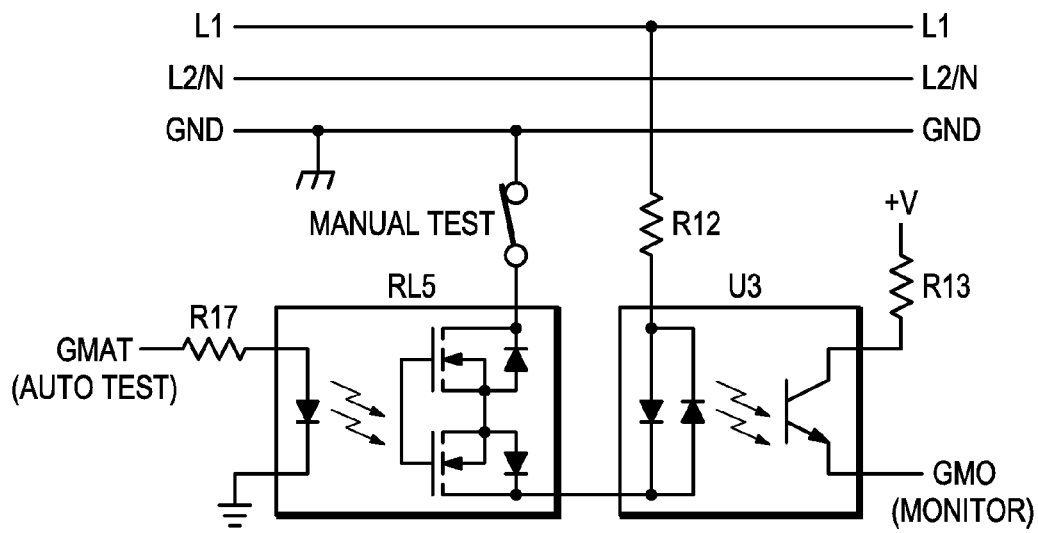
FIG. 40 illustrates an example embodiment of a ground monitor circuit according to some inventive principles of this patent disclosure.

FIG. 40 illustrates an example embodiment of a ground monitor circuit according to some inventive principles of this patent disclosure. In the embodiment of FIG. 40, conductors L1, L2/N and GND are shown passing through the circuit to help visualize the manner in which the circuit of FIG. 40 may be integrated with other circuits to create a complete system such as the ones illustrated in FIGS. 37 and 38. The inventive principles, however, are not limited to these specific details.

In a 120 VAC system, L1, N and GND may designate the hot, neutral and grounding conductors, respectively. In a 240 VAC system, L1, L2 and GND may designate the two hot conductors and the grounding conductor, respectively. Other systems, for example 3-phase power systems, may include different combinations of live and grounding conductors.

In the circuit of FIG. 40, a monitor current path is established beginning with L1 and continuing through resistor R12, optocoupler U3, normally-closed solid state relay RL5, a normally closed manual test switch, and ending at the grounding conductor GND. During normal operation, if the grounding conductor GND remains electrically connected to ground potential, current flowing through the input side of optocoupler U3 turns on a phototransistor which pulls the ground monitor output signal GMO to a high logic level referenced to a logic supply voltage +V and an associated logic ground. This signal may be monitored by a controller to confirm that the grounding conductor GND is properly grounded. The monitor signal GMO may also be used by other logic circuitry to control the state of an interrupter circuit as illustrated in FIG. 38. Additional circuitry may be included between the GMO terminal and the controller such as voltage clamps, filters, resistive dividers, buffers, level detectors, etc.

Actuating the manual test switch interrupts the monitor current path and causes the optocoupler to stop pulling up the monitor signal GMO. The controller or other decision making circuit may respond to the change of state of GMO by interrupting the flow of power to a vehicle and/or any other suitable actions.

The solid state relay RL5 enables the ground monitor circuit to be tested automatically by a controller or any other suitable apparatus. A logic high on the automatic test signal GMAT turns the switch side of RL5 off, thereby interrupting the monitor current path and causing the optocoupler to stop pulling up the monitor signal GMO. This enables the controller to confirm the correct operation of the ground monitor circuit. In this case, rather than actuating a CCID, the controller may drive GMAT low again, and after confirming that GMO goes high again, return to a normal monitoring mode of operation.

Figure 41:
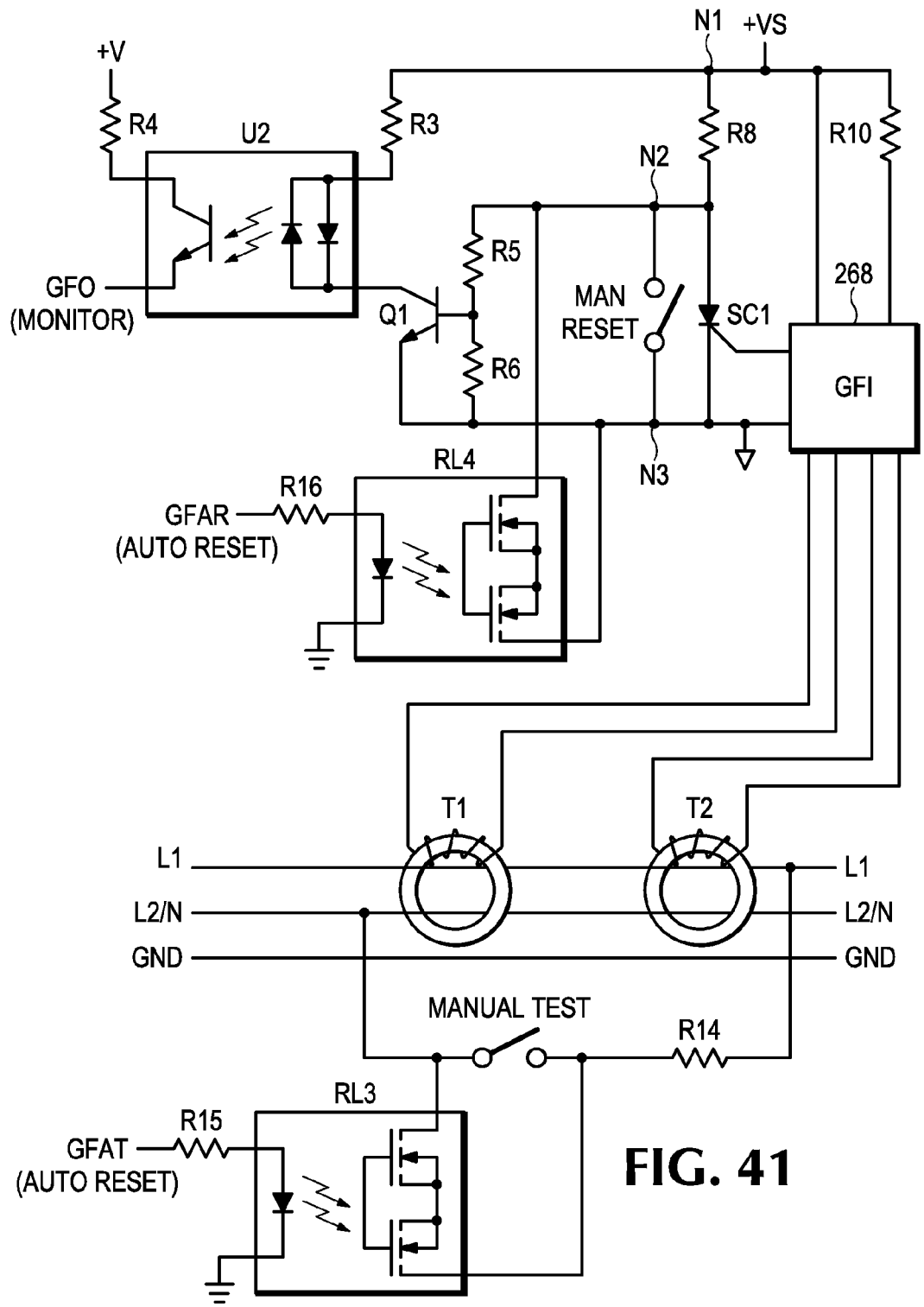
FIG. 41 illustrates an example embodiment of a ground fault detection circuit according to some inventive principles of this patent disclosure.

FIG. 41 illustrates an example embodiment of a ground fault detection circuit according to some inventive principles of this patent disclosure. In the embodiment of FIG. 41, conductors L1, L2/N and GND are again shown passing through the circuit to help visualize the manner in which circuit of FIG. 41 may be integrated with other circuits, but the inventive principles are not limited to these specific details.

The current carrying conductors L1 and L2/N both pass through a differential transformer T1 and neutral-ground (N-G) transformer T2, which are connected to a ground fault interrupter (GFI) circuit 268. The GFI circuit includes circuitry to detect differential currents flowing through L1 and L2/N and trigger the silicon controlled rectifier (SCR) labeled SC1 when the differential current exceeds a threshold determined by resistor R10. The GFI may be based on a commercial or special-purpose GFCI integrated circuit such as the LM1851 chip from National Semiconductor or the FAN1851 chip from Fairchild.

In a conventional ground fault detection circuit, the SCR actuates a latching relay arrangement. In the embodiment of FIG. 41, transistor Q1 is normally driven on by resistors R8, R5 and R6. When Q1 is on, a current set by R3 flows from the GFI supply +VS through the input side of optocoupler U2 which causes the phototransistor on the output of U2 to pull the ground fault monitor output GFO high through R4. The monitor signal GFO may then be used by a controller and/or logic circuitry to control the state of a contactor, relay or other interrupting circuit, and to perform reporting and/or other suitable actions in response to a ground fault detection.

When SC1 is triggered in response to a ground fault detection, it latches in the conductive state and causes Q1 to turn off, thereby causing the ground fault monitor signal GFO to go low. SC1 may be reset by closing the manual reset switch. A normally-open solid state relay RL4 enables the GFI circuit to be reset automatically by a controller and/or other decision making circuit or suitable apparatus in response to a ground fault automatic reset signal GFAR. A logic high on GFAR turns on the LED on the input side of RL4 through a current limiting resistor R16. Light from the LED turns on the FET switches on the output side of RL4, thereby resetting SC1.

The circuit of FIG. 41 may be tested by closing the manual test switch which shunts a current from L1 to L2/N without passing through the transformers T1 and T2, thereby simulating a ground fault condition. The amount of test current is determined by the value of resistor R14.

Another normally-open solid state relay RL3 enables the GFI circuit to be tested automatically by a controller and/or other decision making circuit or suitable apparatus by driving the ground fault automatic test signal GFAT with a logic high. A high signal on GFAT turns on the LED on the input side of RL3 through a current limiting resistor R15. Light from the LED turns on the FET switches on the output side of RL3, thereby causing a test current to flow through R14 without passing through the transformers T1 and T2.

The GFI supply +VS is referenced to a local ground connection at node N3 and may be provided, for example, by a rectifier bridge connected to the current carrying conductors L1 and L2/N. One or more resistors may be connected in series with the bridge to reduce the supply voltage to an acceptable level for the GFI circuit 268. For example, commonly available GFCI chips such as the LM1851 typically include an internal voltage regulator that clamps the supply voltage to about 26 Volts.

Figure 42:
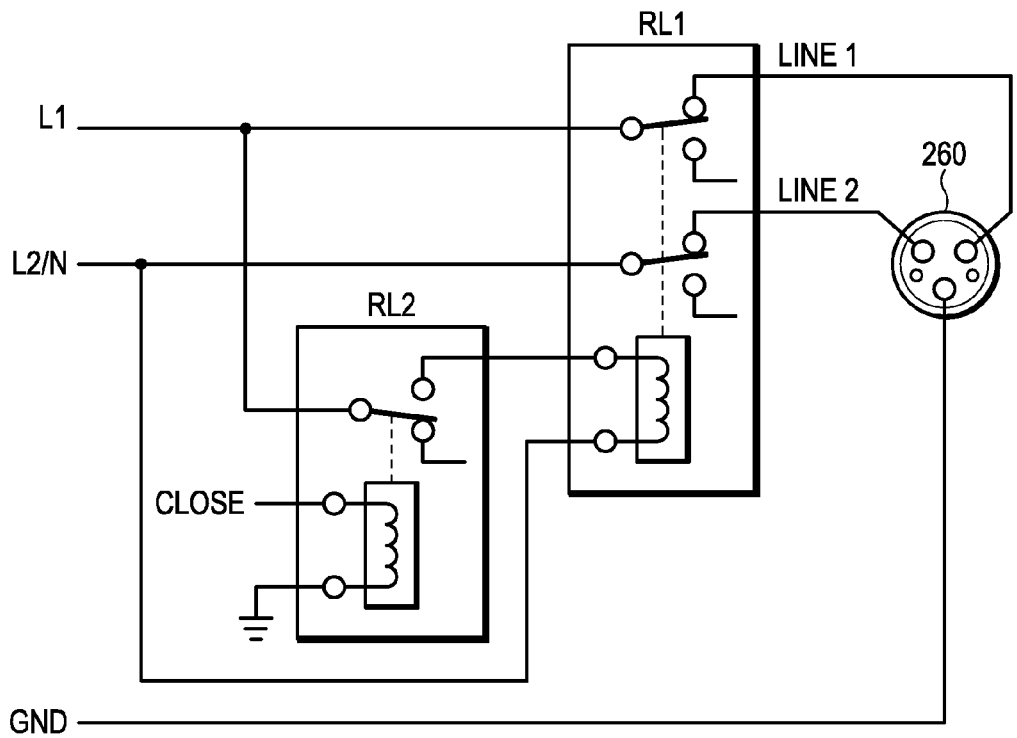
FIG. 42 illustrates an example embodiment of a contactor circuit according to some inventive principles of this patent disclosure.

FIG. 42 illustrates an example embodiment of a contactor circuit according to some inventive principles of this patent disclosure. The embodiment of FIG. 42 includes a pilot relay RL2 to enable a low power logic signal CLOSE to operate a main relay RL1 which carries the fully AC charging current. The normally closed contacts of main relay RL1 are wired between the current carrying supply conductors L1 and L2/N and conductors LINE 1 and LINE 2 which transfer the AC power to a vehicle charging connector 260. The coil of RL1 is wired to the supply conductors through the normally closed contacts of the pilot relay RL2. Thus, when the CLOSE signal is low, current flows through RL2 and energizes the coil of RL1, thereby opening the normally closed contacts of RL1 and de-energizing the vehicle charging connector. When CLOSE goes high, the normally closed contacts of RL2 open and de-energize the coil of RL1, thereby closing the normally closed contacts of RL1 and energizing the vehicle charging connector.

Figure 43:
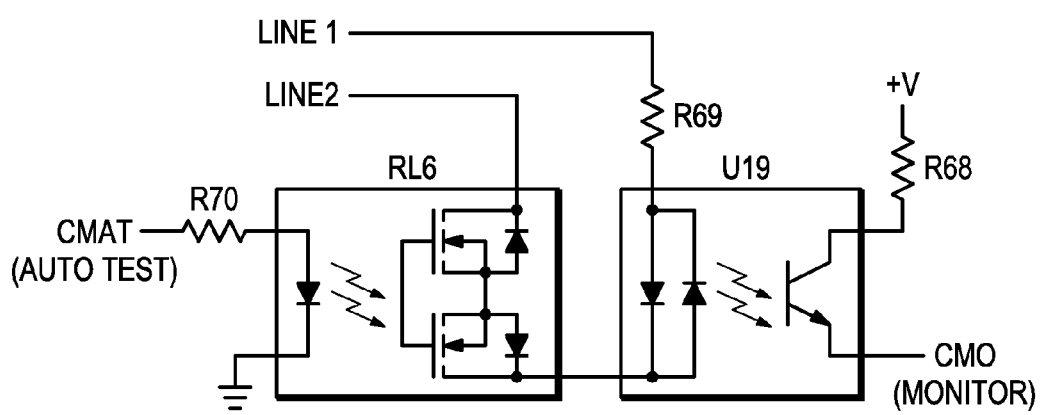
FIG. 43 illustrates an example embodiment of a contact monitor circuit according to some inventive principles of this patent disclosure.

FIG. 43 illustrates an example embodiment of a contact monitor circuit according to some inventive principles of this patent disclosure. In the circuit of FIG. 43, a monitor current path is established beginning at conductor LINE 1 and continuing through resistor R69, optocoupler U19, normally-closed solid state relay RL6, and ending at conductor LINE 2. The monitor circuit of FIG. 43 may be used, for example, to monitor the state of an EVSE main relay or contactor such as that illustrated in FIG. 42.

During normal operation, if the contacts of the monitored relay are closed and AC power is available, current flowing through the input side of optocoupler U19 turns on a phototransistor which pulls the contact monitor output signal CMO to a high logic level through resistor R68 referenced to a logic supply voltage +V and an associated logic ground. If the contacts are open and/or AC power is not available, no current flows through the monitor current path and the optocoupler stops pulling up the monitor signal CMO. The CMO signal may be monitored by a controller or other apparatus to confirm that the contacts are actually open or closed when expected.

The normally-closed solid state relay RL6 provides additional functionality by enabling an automatic test feature. During a time when AC power is expected on LINE 1 and LINE 2, the contact monitor automatic test signal CMAT may be driven high to turn the switch side of RL6 off, thereby interrupting the monitor current path and causing the optocoupler U19 to stop pulling up the monitor signal CMO. This enables a controller or other apparatus to confirm the correct operation of the contact monitor circuit.

In any of the embodiments of FIGS. 40-43, additional circuitry may be included between the monitor and/or test terminals and the controller and/or other apparatus such as voltage clamps, filters, resistive dividers, buffers, level detectors, etc.

Some additional inventive principles of this patent disclosure relate to fault circuit self-testing for EVSE. For purposes of illustration, some of the inventive principles are described in the context of a ground fault detector, but the inventive principles are also applicable to other types of fault circuits that may be used in EVSE such as arc fault detectors, overcurrent detectors, etc.

Figure 44:
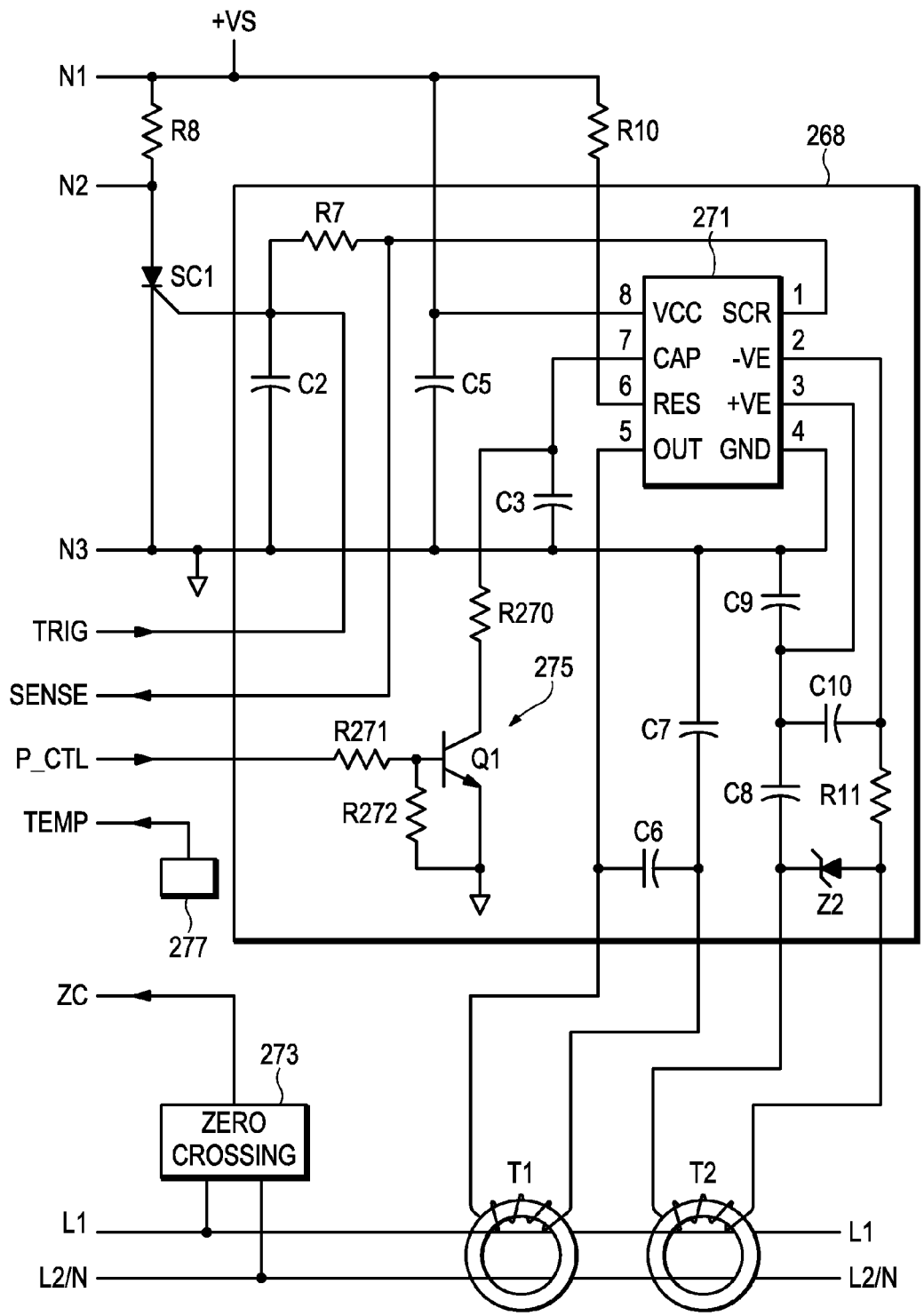
FIG. 44 illustrates an example embodiment of a fault detection circuit according to some inventive principles of this patent disclosure.

FIG. 44 illustrates an example embodiment of a ground fault detection circuit having self-test functionality according to some inventive principles of this patent disclosure. The embodiment of FIG. 44 includes a ground fault interrupter circuit 269 which illustrates some possible implementation details for the ground fault interrupter circuit 268 of FIG. 41, and further includes additional circuitry to enable self-test functionality. A GFCI integrated circuit (IC) 271, which in this example may be an LM1851 or FAN1851, receives the local power supply +VS through a VCC terminal (pin 8). A supply capacitor C5 decouples the IC 271 from noise in the supply and provides energy storage. The IC is referenced to the local ground through the GND terminal (pin 4). Connections N1, N2 and N3, as well as conductors L1 and L2/N and transformers T1 and T2 illustrate how the embodiment of FIG. 44 may be arranged within an EVSE system such as the embodiment of FIG. 41.

Ground/Neutral transformer T1 is connected to the IC through a capacitor network including C6 and C7. The differential sense transformer T2 is connected to the IC through a network including capacitors C8-C10, resistor R11 and voltage regulator diode Z2.

The differential fault current threshold (sensitivity) for the IC is determined by the current flowing into the RES terminal (pin 6) through resistor R10. The timing or integrating capacitor C3 is charged by a fault current when the IC 271 detects a fault condition. When the voltage on C3 reaches a predetermined limit, the SCR output (pin 1) is driven high which triggers the SCR SC1 through resistors R7 and capacitor C2, which provides noise protection from accidental triggering.

To simulate a fault condition during an automatic testing process, a fault simulation circuit such as the auto test circuit including R15, RL3 and R14 shown in FIG. 41 may be included. As another example, a fault may be simulated by using a rectifier bridge connected to L1 and L2/N, a voltage dropping resistor, and a transistor referenced to the local ground and controlled by a microcontroller or other self-test controller as described below.

A trigger connection TRIG may be provided to the gate of SC1 to enable the self-test controller to control SC1. For example, the TRIG connection may have three different states: a high-impedance state that enables the IC 271 to control SC1 as it normally would in a conventional operating mode; a low output or pull-down state that clamps the gate of SC1 to a low level to prevent it from triggering even if the IC 271 tries to trigger it; and a high output or pull-up state that triggers SC1 regardless of the state of the output (pin 1) of the IC 271.

A sense connection SENSE may be provided to enable the self-test controller to read the state of the SCR output (pin 1) of the IC 271.

A timing circuit 275 includes a transistor Q1 which turns on in response to a signal P_CTL and discharges the timing capacitor C3 through a resistor R270. This causes the timing capacitor to discharge more rapidly than it normally would under the control of the IC 271.

A zero crossing detection circuit 273 generates a zero crossing signal ZC which may enable a self-test controller to determine when the AC input voltage on L1 and L2/N crosses zero, as well as other information such as the line voltage, polarity of a half-cycle, etc. The zero crossing detection circuit may be implemented, for example, with a resistive voltage divider connected to the AC input voltage and referenced to the local ground node. If used in combination with a zero crossing detector, the optocoupler RL3 may be used to apply a fault condition to the system during any selected portion of a line cycle or half-cycle.

In some embodiments, the self-test controller may be implemented as a dedicated controller. In other embodiments, the self-test control functionality may be integral with other control functionality such as that provided by the controller 262 illustrated in FIGS. 38 and 39. Any or all of the signals TRIG, SENSE, P_CTL and ZC may be isolated from the self-test controller using optical isolation, magnetic isolation, etc. For example, optical isolators such as U2, U3, U19 and RL3-RL6 may be used to couple the signals TRIG, SENSE, P_CTL and ZC to the microcontroller 270 of FIG. 39 to enable the microcontroller to control a self-test process for the embodiment of FIG. 44.

The apparatus illustrated in FIG. 44 may enable the implementation of various types of self-test functionality according to the inventive principle of this patent disclosure. For example, in some embodiments, the self-test controller may drive the TRIG signal low, thereby preventing the IC 271 from triggering the SCR during a self test. The state of the SENSE signal may then be monitored while a simulated fault is applied to the system. The simulated fault may cause the timing capacitor C3 to charge at a lower rate than an actual external fault. If the SENSE signal is activated within a predicted time window, the controller determines that the IC 271 is operating properly in response to the simulated fault signal. The self-test controller then releases the TRIG signal to enable the IC 271 to operate normally.

If, however, the SENSE signal is activated earlier than expected, this may indicate that an actual external fault condition exists. The self-test controller may then release the TRIG signal immediately to enable IC 271 to trigger the SCR and open the contacts. Alternatively, the self-test controller may activate the TRIG signal to trigger the SCR and open the contacts.

In some embodiments, the self-test controller may activate the P_CTL signal at the end of a self-test process to enable the timing circuit 275 to rapidly discharge the timing capacitor C3. This may reduce the time required to put the fault circuit back online for detecting actual faults once a self test is completed.

In some embodiments, the self-test controller may be programmed to perform a self test across at least two different half cycles of opposite polarity. The determination of the timing of the self test may be based upon timing performed by the self-test controller in combination with the zero crossing detection circuit 273. Both the polarity and timing of a zero crossing are detected with the help of the zero crossing circuit 273. If a self test is conducted during the existence of an external fault that was below a trip limit, then this condition could result in a false failure of a self test. Because the system may be configured to conduct the self test across at least two different half cycles of opposite polarity, this self test may not be affected by the presence of a standing external fault. This is because with at least one of the embodiments described above, the self test simulated fault signal may be a rectified fault signal. If during the self test, the SENSE signal goes high at the half cycle or during a period of time when a test fault is not applied, this means that an external fault caused the tripping and the self-test controller will unblock the SCR to allow the IC chip 271 to trip the solenoid.

During charging, the voltage on timing capacitor C3 grows, and when it reaches its threshold value, pin 1 on the IC 271 goes high, and causes triggering of the SCR SC1. The triggering of the SCR provides current to the pilot solenoid RL2 of FIG. 42, triggering the opening of the contacts in RL1 and removing the external fault from the line. Essentially, anyone of the components including the pilot solenoid RL2, the SCR, and the relay RL1 comprise a line interrupting circuit or disconnect device. Once the contacts have unlatched or opened, the capacitor C3 charging current disappears and it is discharged by a current set by resistor R10. After the voltage on capacitor C3 goes below the predetermined voltage level, pin 1 on fault detector IC 271 returns back to a low level. In at least one embodiment, to shorten the time period required to discharge timing capacitor C3, additional circuitry including timing circuit 275 is coupled to capacitor C3 which reduces this discharge time.

In some embodiments, the SENSE signal from the fault detection IC 271 is coupled to the self-test controller to enable the controller to determine that the fault detector IC 271 has detected a fault. In this case, during a fault, either external or internal, when fault detector IC 271 generates a fault signal, the output from fault detector IC 271 flows not only to the SCR but also to the self-test controller to indicate to the self-test controller that a fault has occurred. The SENSE input to the self-test controller is significant because if during a test cycle, there is no active signal from pin 1 of fault circuit IC 271 into the self-test controller, then this result would provide an initial indication that fault circuit IC 271 has failed or at least that another component monitored by the self test has failed. In this case, self-test controller is programmed to conduct a self test over at least two different half cycles of different polarities. In at least one embodiment, these different half cycles can be consecutive half cycles. The simulated fault signals that are generated are introduced by the self-test controller in combination with the fault simulator such as RL3 in FIG. 41 on at least a portion of a first half cycle and then on a portion of at least a second half cycle. The duration of this self test is sufficient to charge capacitor C3 to then cause the creation of a fault signal. If after a self-test cycle, which occurs across at least two different polarities of the AC line voltage, no SENSE signal is received into the self-test controller, then this would indicate failure of at least one component of fault circuit 269, e.g. fault detector IC 271. Because there is testing of the fault circuit during both polarities, there would be lower likelihood of false failure indications of a self test, because the simulated fault signals occur across both polarities thereby avoiding any result of out of phase simulated fault signals being reduced or canceled out.

In some embodiments, a temperature sensor 277 may be included. The temperature sensor 277 can comprise a circuit utilizing a resistor, a thermistor, or any other known sensor circuitry for determining the ambient temperature of the device. If necessary, the self-test controller can include an additional connection to this temperature sensor to form a closed circuit. The temperature sensor is used to determine the ambient temperature of the device, wherein the self-test controller includes programming to trip the contacts in the event it detects that an operating temperature, or an ambient temperature sensed by temperature sensor 277 is too high or too low.

Figure 45:
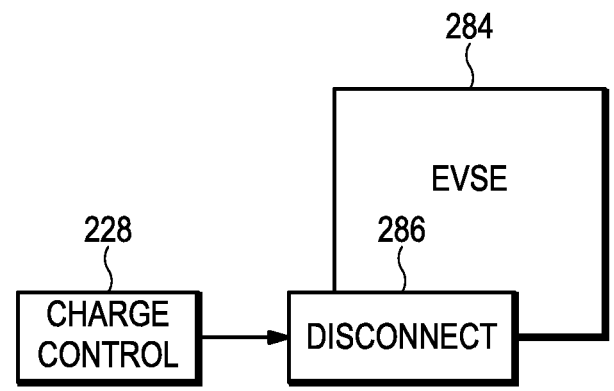
FIG. 45 illustrates an embodiment of a vehicle charging system according to some additional inventive principles of this patent disclosure.

FIG. 45 illustrates an embodiment of a vehicle charging system according to some additional inventive principles of this patent disclosure. Electric vehicle supply equipment (EVSE) 284 includes an integral disconnect switch 286 to disconnect the EVSE from the power source 288. The disconnect switch may be located in the same enclosure as the electric vehicle supply circuit, or a different enclosure. If located in the same enclosure, the disconnect switch may share the same enclosure space as the electric vehicle supply circuit, or it may be separated by a partition. Incoming power connections to the disconnect switch may be made directly to the switch, or they may terminate at a terminal block or other connection device which is then wired to the disconnect switch.

In some embodiments, connections to the disconnect switch may be accessible through a separate opening in the enclosure, for example by removing a dedicated panel. In other embodiments, connections to the disconnect switch may be accessible through one or more shared openings with the electric vehicle supply circuit.

Figure 46:
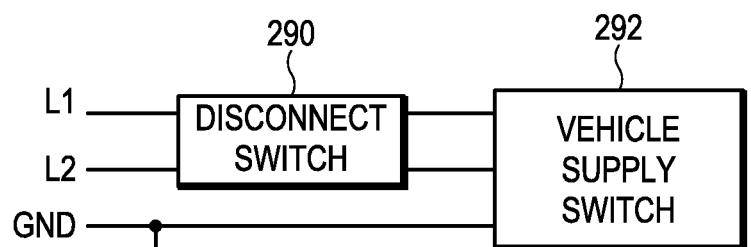
FIG. 46 illustrates an embodiment of an EVSE system having an integral safety disconnect switch according to some of the inventive principles of this patent disclosure.

FIG. 46 illustrates an embodiment of an EVSE system having an integral safety disconnect switch according to some of the inventive principles of this patent disclosure. In this example, an AC power connection having two hot conductors and an equipment grounding conductor are received at terminals L1, L2 and GND. The disconnect switch 290 is arranged to disconnect the hot conductors L1 and L2 from the electric vehicle supply circuit 292. In this example, two hot conductors are switched, as may be necessary for example with 240V single phase power. In a 120V system, only one conductor may be switched, while in a three-phase system, all three hot conductors may be disconnected by the switch.

Figure 47:
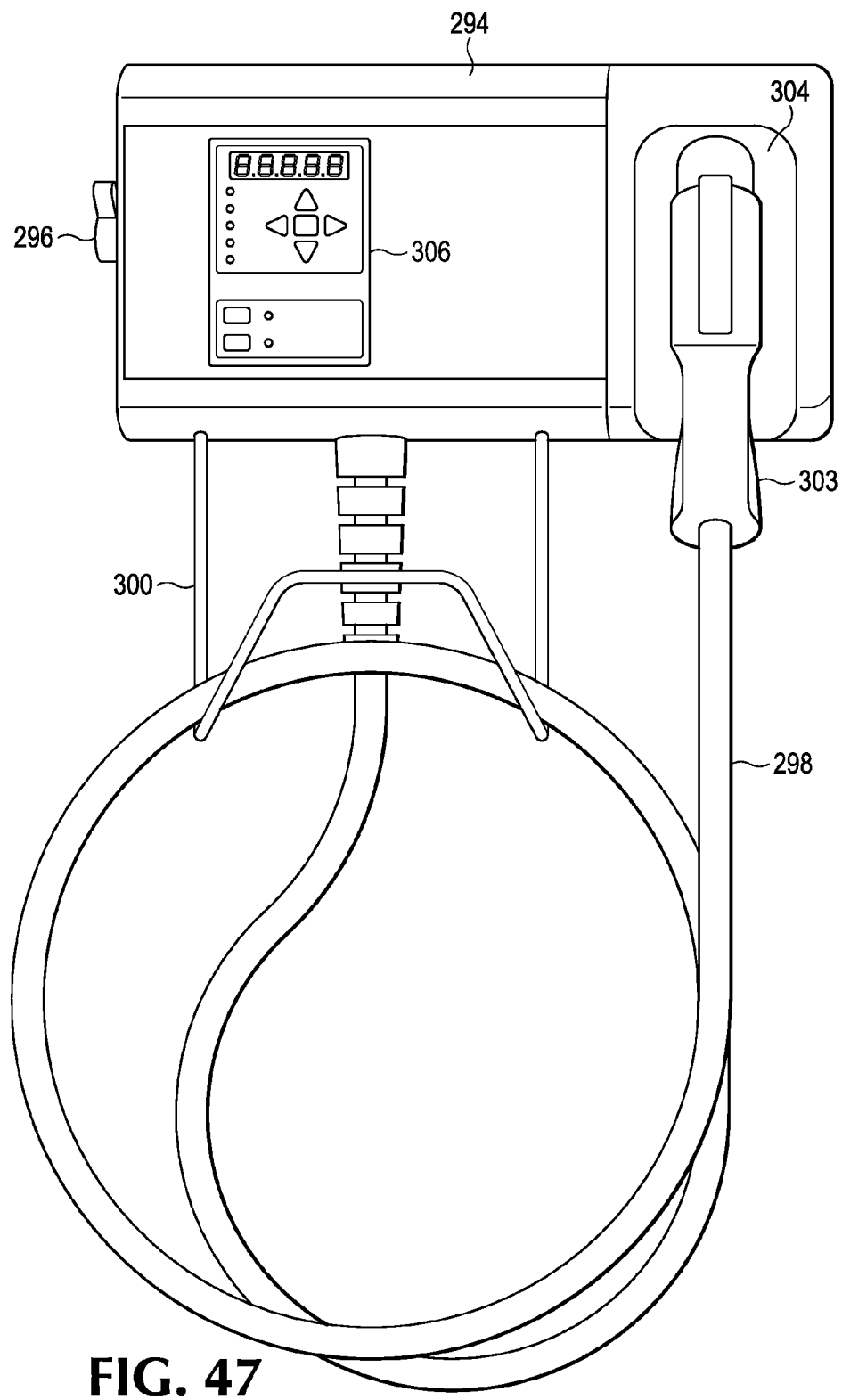
FIG. 47 illustrates another embodiment of an EVSE system having an integral disconnect switch according to some inventive principles of this patent disclosure.

FIG. 47 illustrates another embodiment of an EVSE system having an integral disconnect switch according to some inventive principles of this patent disclosure. The embodiment of FIG. 47 includes an enclosure 294 having an integral disconnect switch 296 located on the side of the enclosure. Power may be brought into the enclosure through a conduit or a plug-and-cord connection on the side, bottom, back or other suitable location on the enclosure, preferably close to the disconnect switch. The disconnect switch 296 has a rotating actuator to disconnect a vehicle supply circuit within the enclosure from the power source. Power is supplied to a vehicle through a charging cord 298, which may be stored on a hanger 300, and a vehicle charging connector 303, which may be stored in a holder 304. A user interface 306 may include indicators, a display, input switches or keypad, etc.

Figure 48:
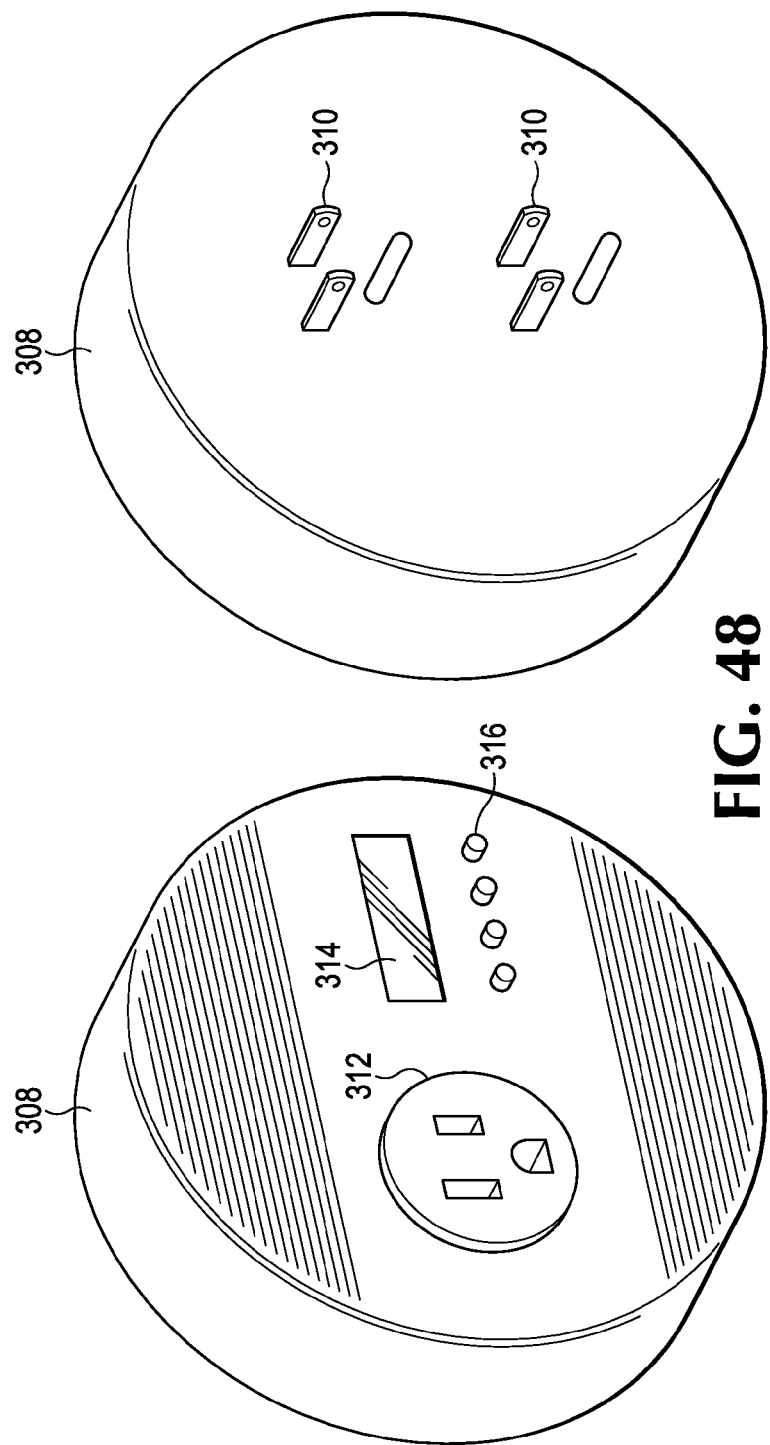
FIG. 48 illustrates an embodiment of a plug-in EVSE device according to some inventive principles of this patent disclosure.

FIG. 48 illustrates an embodiment of a plug-in EVSE device according to some inventive principles of this patent disclosure. The device of FIG. 48 includes a housing 308 having one or more sets of blades 310 or other connections on a back for plugging the device into one or more receptacles. The device also includes a receptacle 312 on the front to provide power to a vehicle through a charging cord. Any type and extent of vehicle supply circuitry may be included within the device.

For example, in one embodiment the device may not be able to disconnect the receptacle 312 from the blades 310. The device may only have monitoring circuitry to display charging voltage, current, power, etc., on a display 314. Buttons 316 may enable a user to select a parameter to view, scroll through various parameters or menu items, etc.

In another embodiment, the plug-in device of FIG. 48 may include a charging circuit interrupting device (CCID) to interrupt power to the receptacle 312 if a ground fault is detected. Another embodiment may include a CCID and a grounding monitor to enable the trip point of the CCID to be set to a relatively high level.

In other embodiments, the device of FIG. 48 may include any or all of the manual and/or automatic testing and/or monitoring features described above with respect to the embodiments of FIGS. 37-43.

Figures 49, 50:
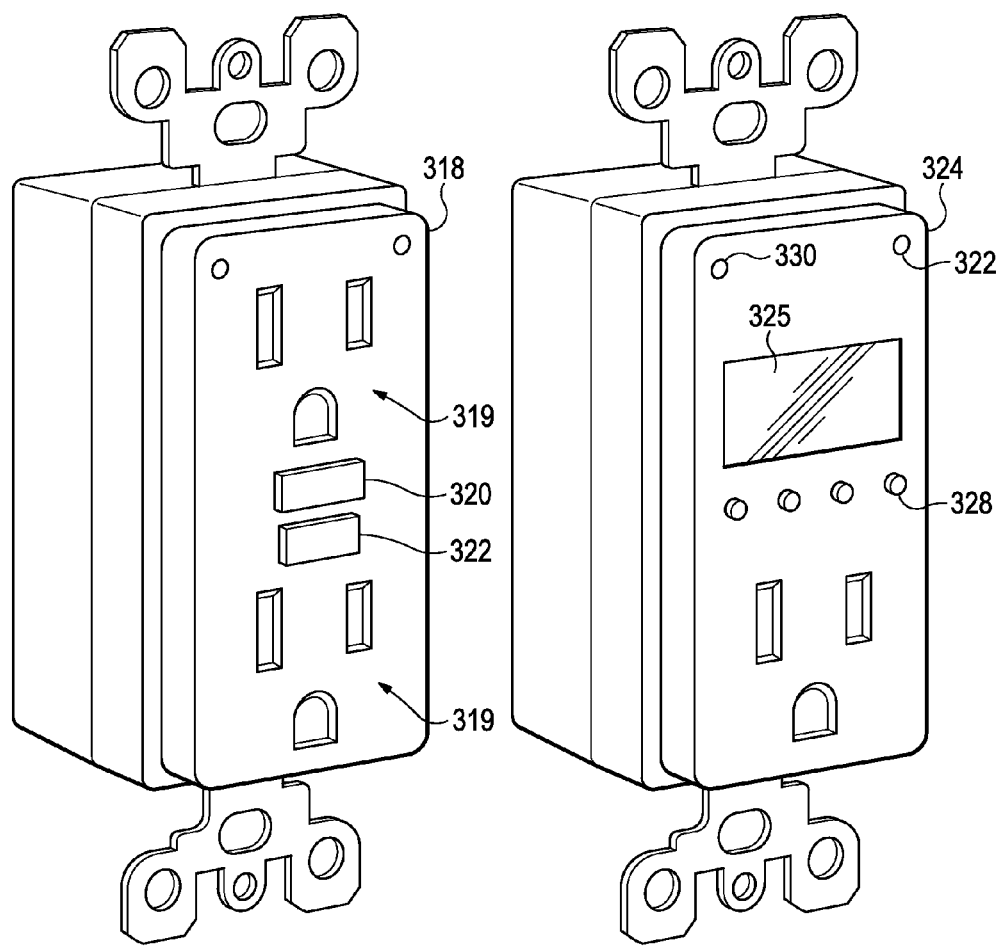
FIG. 49 illustrates an embodiment of an EVSE wiring device according to some inventive principles of this patent disclosure.
FIG. 50 illustrates another embodiment of an EVSE wiring device according to some inventive principles of this patent disclosure.

FIG. 49 illustrates an embodiment of an EVSE wiring device according to some inventive principles of this patent disclosure. The embodiment of FIG. 49 has a housing 318 with a form factor and circuitry that is similar to a standard GFCI wiring device (or arc-fault circuit interrupter (AFCI), equipment leakage circuit interrupter (ELCI), overcurrent, overvoltage, or any other suitable circuit interrupter). However, a grounding monitor circuit is added to enable the ground fault trip point to be set to a relatively high level to accommodate vehicle charging. A vehicle may be plugged into the device with a charging cord having a plug that fits into one of the receptacles 319. Test and reset buttons 320 and 322 are located on the front. In some embodiments, the ground fault detection and grounding monitor functionality may have manual test and reset features. In other embodiments, one or both of the ground fault detection and grounding monitor functionality may include automatic test and/or reset features such as those described above with respect to FIGS. 37-43.

FIG. 50 illustrates another embodiment of an EVSE wiring device according to some inventive principles of this patent disclosure. The embodiment of FIG. 50 has a housing 324 with a form factor similar to the embodiment of FIG. 49. However, one of the front receptacles is replaced with a display 325 and buttons 328 which may have functionality similar to that described above with respect to FIG. 48. Additionally, the embodiment of FIG. 50 may include one or more indicators 330 and 332 such as LEDs, lamps, audio indicators, tactile indicators, etc., to indicate vehicle charging state, fault conditions, etc. As with the embodiments of FIGS. 48 and 49, any type and extent of vehicle supply circuitry may be included within the device.

Figure 51:
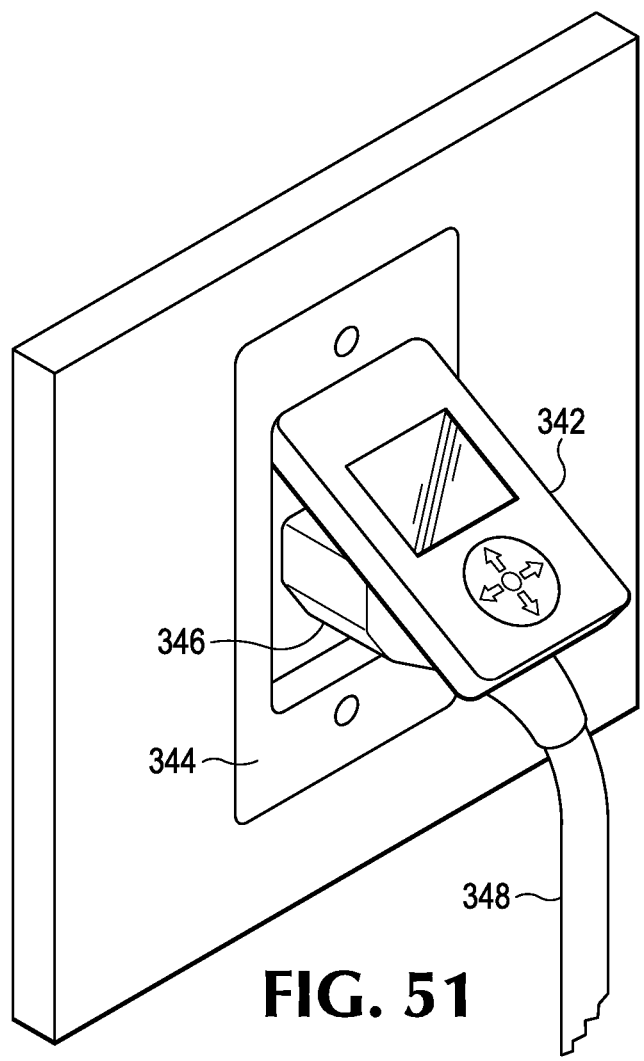
FIGS. 51 and 52 illustrate another embodiment of an EVSE wiring device according to some inventive principles of this patent disclosure.
Figure 52:
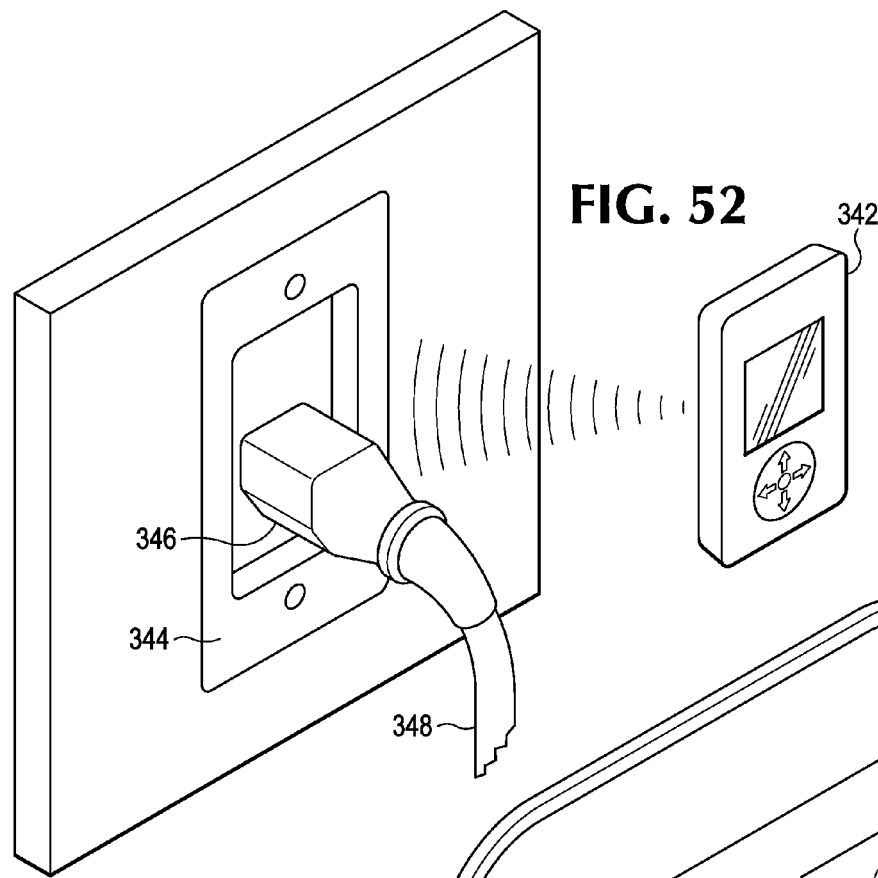

FIG. 51 illustrates another embodiment of an EVSE wiring device according to some inventive principles of this patent disclosure. The embodiment of FIG. 51 includes a detachable interface 342 that can communicate wirelessly with the wiring device 344 as illustrated in FIG. 52. The detachable interface may enable a user to continue to monitor the charging status, charging progress, etc. of the EVSE without having to remain in the vicinity of the vehicle and EVSE. It may also enable the user to adjust charging parameters and/or perform any other functions or operations that may be possible with a user interface. In the embodiment of FIG. 51, the detachable user interface is shown as part of a detachable panel that covers a recessed receptacle 346 for receiving a vehicle charging cord 348. As with the embodiments above, any type and extent of vehicle supply circuitry may be included within the device of FIGS. 51 and 52.

Figure 53:
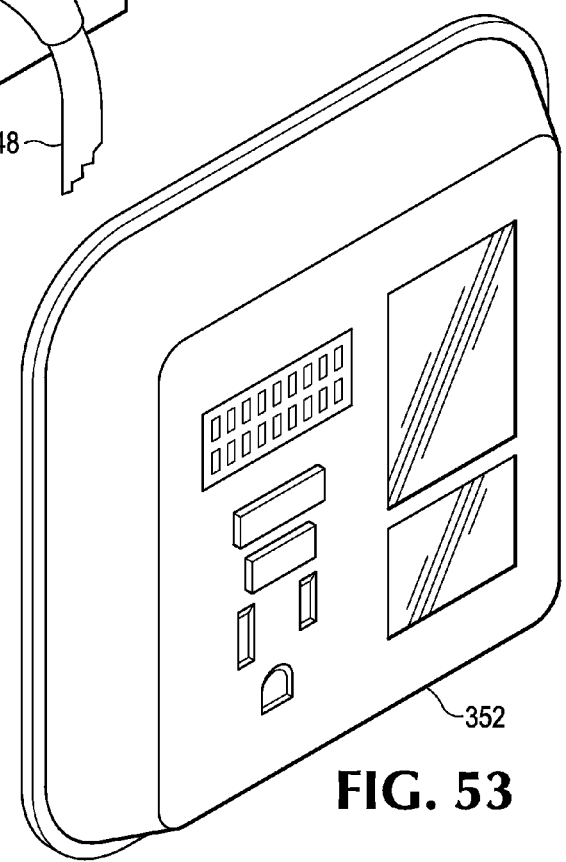
FIG. 53 illustrates another embodiment of an EVSE wiring device according to some inventive principles of this patent disclosure.

FIG. 53 illustrates another embodiment of an EVSE wiring device according to some inventive principles of this patent disclosure. The embodiment of FIG. 53 includes a housing having a first portion 350 (obscured in this view) that is sized to fit within a single gang electrical box (i.e., 3½ by 2 inches), and a second portion 352 that extends from, and covers a substantially larger area than, the front opening of the electrical box. Thus, the embodiment of FIG. 53 may provide a greater volume to enclose additional EVSE apparatus without requiring the installation of a larger electrical box. As with the embodiments above, any type and extent of vehicle supply circuitry may be included within the device of FIG. 53.

The inventive principles described and illustrated above with respect to FIGS. 48-53 are not limited to the details disclosed therein. For example, receptacles have been illustrated as standard 5-15R receptacles, but the inventive principles can be applied to plug-in and/or wiring devices that utilize any types of receptacles and connection techniques. Moreover some of the inventive principles are not limited to plug-in and/or wiring devices. For example, the inventive principles relating to detachable interfaces as described and illustrated with respect to FIGS. 51 and 52 may be applied to any EVSE, not just plug-in devices or wiring devices.

Figure 54:
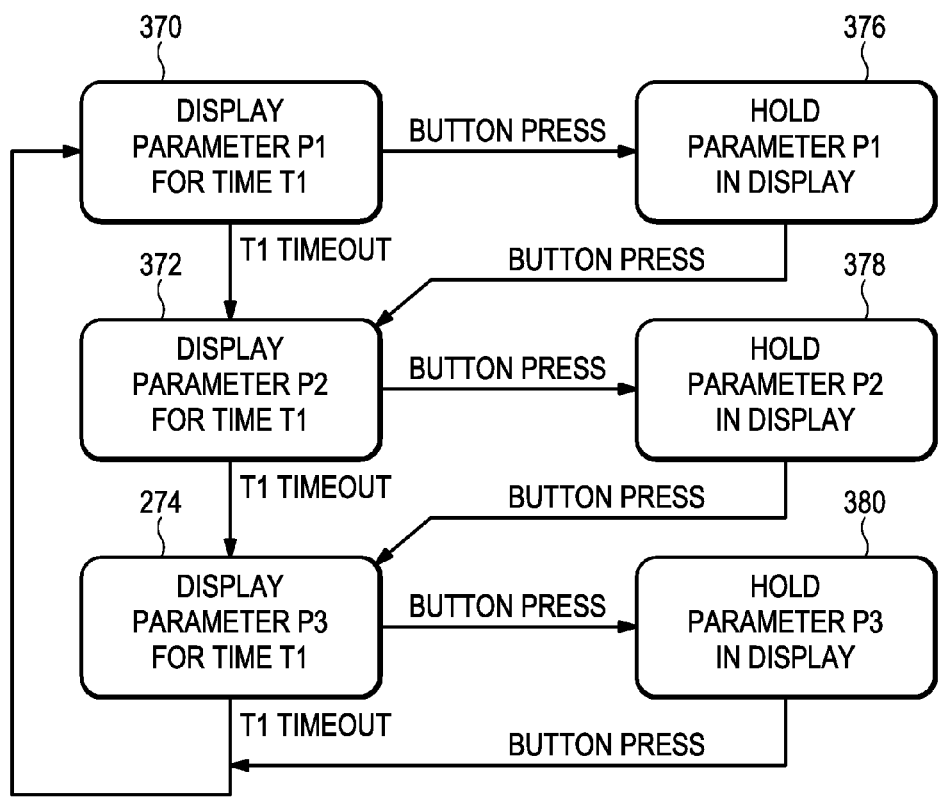
FIG. 54 illustrates an embodiment of a method for displaying parameters according to some inventive principles of this patent disclosure.

FIG. 54 illustrates an embodiment of a method for displaying parameters according to some inventive principles of this patent disclosure. This embodiment may be used, for example, to display EVSE parameters on the embodiments of FIGS. 47, 48, 50 or any other EVSE disclosed herein. Examples of parameters that may be displayed include the time remaining before a vehicle is fully charged, the amount of time a vehicle has been charging (elapsed charging time), the present charging voltage, current, and/or power, the total charge (e.g., kilowatt hours), status of the EVSE, status of a vehicle connected to the EVSE, cost of electricity used for charging so far, etc.

Although described in the context of an EVSE system, the inventive principles are applicable to displaying parameters for any type of electrical equipment including a power distribution unit (PDU), a power conditioning unit (PCU) and the like.

Referring to the state diagram of FIG. 54, in state 370, a first parameter P1 is displayed for a time period $T_1$, which may be for example, a few seconds. If the time period $T_1$ expires before another button press, a second parameter P2 is displayed for a time period $T_1$ in state 372. If the time period $T_1$ expires again expires before another button press, a third parameter P3 is displayed for a time period $T_1$ in state 374. If the time period $T_1$ expires again expires before another button press, the method returns to state 370 continues scrolling through the parameters as long as another button press is not detected.

If a button press is detected before the time period $T_1$ expires while displaying the first parameter P1 in state 370, the method proceeds to state 376 where the first parameter P1 is displayed indefinitely until another button press is detected. A button press in state 376 causes the process to change to state 372 and resume scrolling through all parameters.

Likewise, if a button press is detected before the expiration of $T_1$ while scrolling through any of the other parameters in states 372 and 374, the currently displayed parameter is held indefinitely until another button press returns the system to scrolling.

Figure 55:
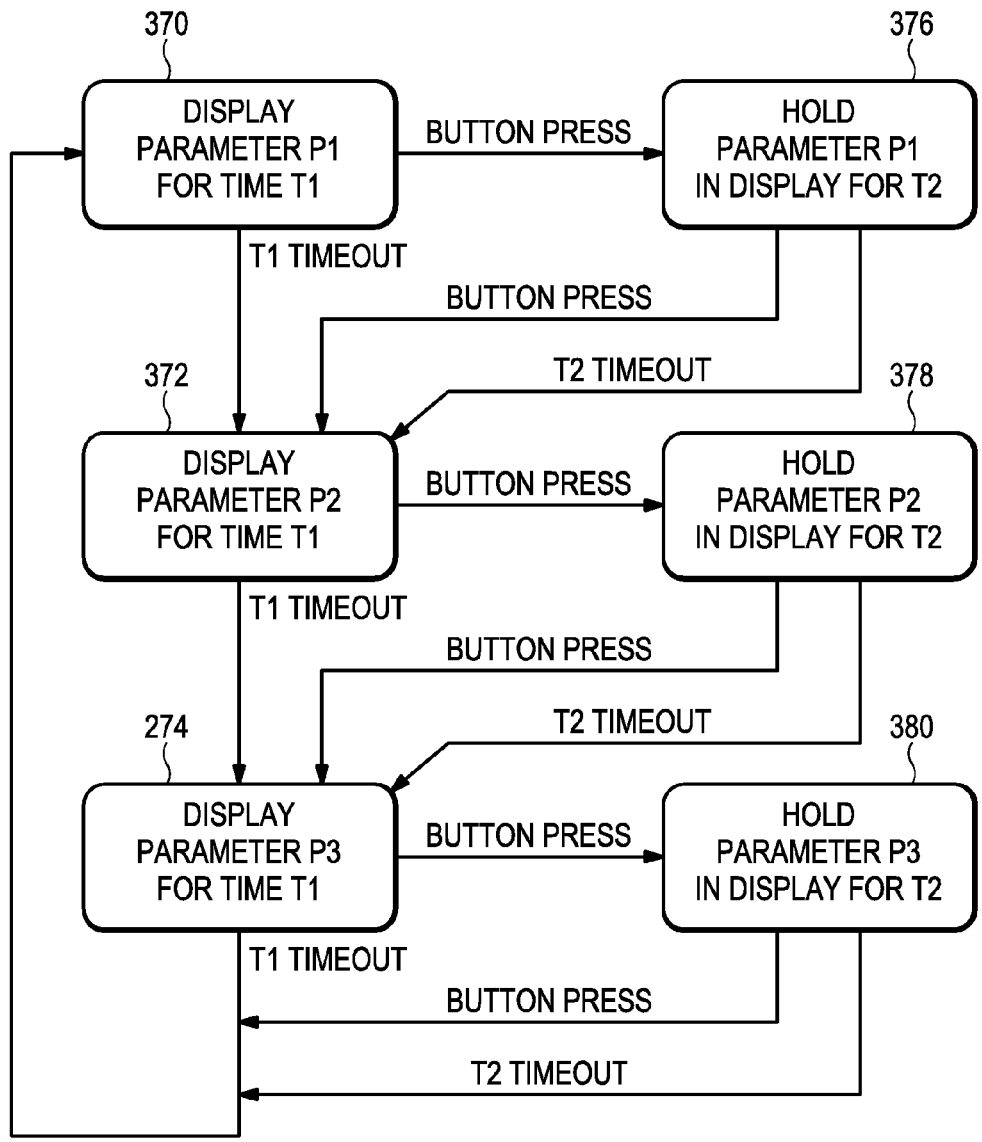
FIG. 55 illustrates another embodiment of a method for displaying parameters according to some inventive principles of this patent disclosure.

FIG. 55 illustrates another embodiment of a method for displaying parameters according to some inventive principles of this patent disclosure. The embodiment of FIG. 55 is similar to the embodiment of FIG. 54 except that the system may change from any of the held states 388, 390 or 392 to one of the scrolling states 382, 384 or 386 based on the expiration of a second time period $T_2$ during which no button press is detected. The time period $T_2$ may be, for example, a few minutes.

In one example EVSE embodiment, the parameters to be displayed may be charge rate, elapsed charging time, and charge time remaining. When a first user begins charging a vehicle, the EVSE may begin scrolling through all three parameters on a display. The first user may be most interested in the charge time remaining, and therefore, the user can press a button to hold the display on the charge time remaining parameter. A second user, who may be more interested in the charge rate may later press the button to begin scrolling, then press the button again when the charge rate is displayed to hold that parameter on the display.

In one example PDU embodiment, the parameters to be displayed may be voltage, current and power. On start up, the display my scroll through all three parameters until a user presses a button to hold a parameter of interest on the display.

In some embodiments, the display may include an indication of the parameter being displayed. In other embodiments, one or more ancillary display devices may be included to indicate the parameter being displayed. For example, in the embodiment of FIG. 48, a parameter may be displayed on the alphanumeric digits, while one of the LED or other indicator lights may indicate which parameter is being displayed.

The inventive principles related to displaying parameters are not limited to the specific details described above. For example, any number of parameters may be displayed for any lengths of time. Different time periods may be used to time out while scrolling between parameters, i.e., more important parameters may be displayed for longer periods of time, or at more frequent intervals than other parameters. The examples have been described above in the context of button presses, but any other inputs may be used to change between states, including remote inputs, wireless inputs, other actions, events, and/or lack of actions, events. For example, the detection of a fault or alarm condition such as an over current condition may cause the display to stop scrolling and display the current or other parameter most relevant to the fault or alarm condition.

Figure 56:
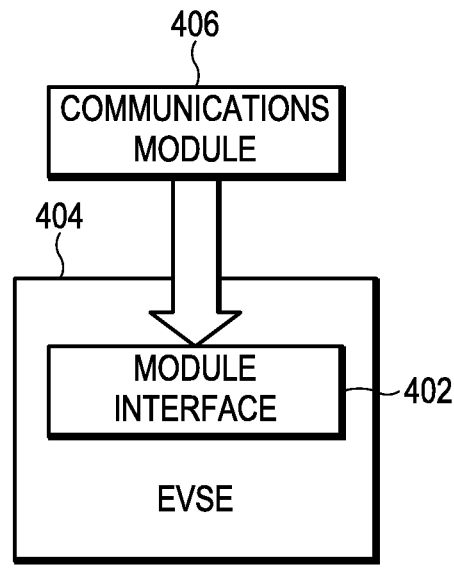
FIG. 56 illustrates an embodiment of an EVSE system having modular communications according to some inventive principles of this patent disclosure.

FIG. 56 illustrates an embodiment of an EVSE system having modular communications according to some inventive principles of this patent disclosure. The EVSE 404 includes a module interface 402 to enable the EVSE to operate with one or more different communication modules 406. A communication module may implement any wired or wireless, standardized, custom and/or proprietary communication platform and/or protocol. Examples include IEEE 802.11 (e.g., WiFi), any implementation of ZigBee Wireless including Smart Energy, Z-Wave, etc.

The interface 402 may include any suitable mechanical interface to accept a communication module including a slot, bay, socket, etc., and any suitable electrical interface to enable the EVSE to communicate through the module including a card-edge connector, plug and receptacle, ribbon cable, etc., to establish serial data connection, parallel data connection, etc. with the module. A module may be realized in any suitable mechanical and/or electrical form to operate with the interface.

Having modular communications may provide a flexible solution that enables the EVSE to adapt to changing market conditions, supply conditions, user preferences and/or needs, etc. For example, a specific type of communication protocol such as Z-Wave may be popular in a particular market where the local utility is promoting a new standard such as ZigBee Smart Energy 2.0. The local utility may require new EVSE to include the new standard, but hardware for the new standard may not be widely available yet, it may be prohibitively expensive, or it may lack user acceptance. By providing a modular interface, an EVSE manufacturer or supply may initially ship a unit with the more common or acceptable Z-Wave module, but still enable the conversion to the new standard when required by the utility or accepted by the user.

Figure 57:
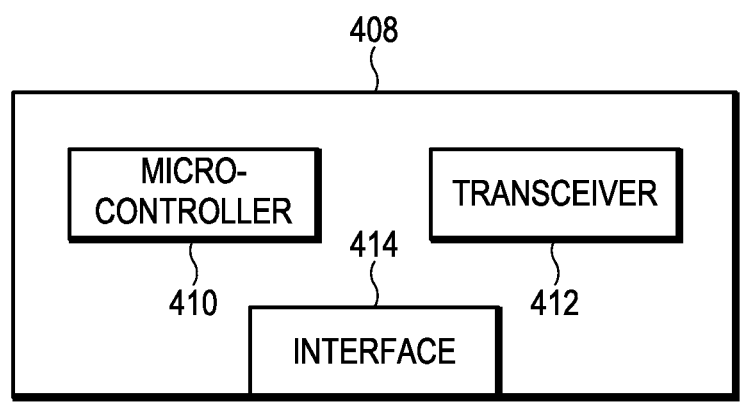
FIG. 57 illustrates an example embodiment of a module having wireless capability according to some inventive principles of this patent disclosure.

FIG. 57 illustrates an example embodiment of a module having WiFi capability according to some inventive principles of this patent disclosure. The module 408 includes a microcontroller 410, and an interface 414 to connecter to the interface 402 on the EVSE. The module may include a single-chip WiFi transceiver 412 such as a ZeroG ZG2100 chip to provide a high level of functionality at low power consumption levels. The transceiver may include power management hardware and/or software to reduce power consumption of both the transceiver and the host microcontroller to meet the needs of a wide variety of applications.

The inventive principles relating to WiFi may be implemented even without a modular interface. Current EVSE products typically have non-WiFi communication such as ZigBee, which is oriented to specialized applications such as automation and control systems and cannot interoperate with WiFi. However, WiFi has become popular with the general public WiFi routers have been installed in homes and businesses on a widespread basis. To promote acceptance of electric vehicles by the general public, it may be advantageous to enable consumers to interact with EVSE through a familiar interface such as WiFi. Thus, some of the inventive principles contemplate an embodiment of an EVSE system with a WiFi interface, which may be modular or built into the EVSE, that enables a user to check, for example, the charge status of an electric vehicle from a WiFi enabled computer or phone, while utilizing existing WiFi infrastructure.

Another embodiment of a communication module according to some of the inventive principles may operate on any version of the ZigBee Smart Energy standard including version 2.0. Such an embodiment may combine wireless and power line carrier (PLC) technology in a modular form that may be utilized for locations or utilities that require a ZigBee interface.

Another embodiment of a communication module according to some inventive principles may provide Z-Wave compatible functionality. A benefit of a Z-Wave compatible module is that it may enable an EVSE to interoperate with a wide range of existing products such as remote controls, serial communication modules, etc., many of which may be consumer oriented products that users may have developed a level of comfort and acceptance with.

Figure 58:
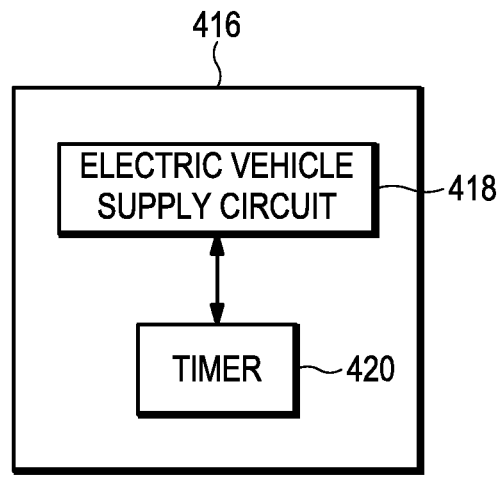
FIG. 58 illustrates an embodiment of an ESVE system having timer functionality according to some additional inventive principles of this patent disclosure.

FIG. 58 illustrates an embodiment of an ESVE system according to some additional inventive principles of this patent disclosure. The system 416 of FIG. 58 includes an electric vehicle supply circuit 418 and a timer 420 that is adapted to automatically control the electric vehicle supply circuit 418. The timer 420 may be configured or programmed to enable or disable the electric vehicle supply circuit 418 at one or more predetermined times. For example, in one embodiment, a user may connect an EV to the electric vehicle supply circuit 418, and then program the timer to enable the supply circuit during the nighttime when reduced electric rates may be available from the local electric utility. The timer may be configured to disable the supply circuit manually, after a predetermined charging time, at a predetermined time of day, or in any other suitable manner.

Figure 59:
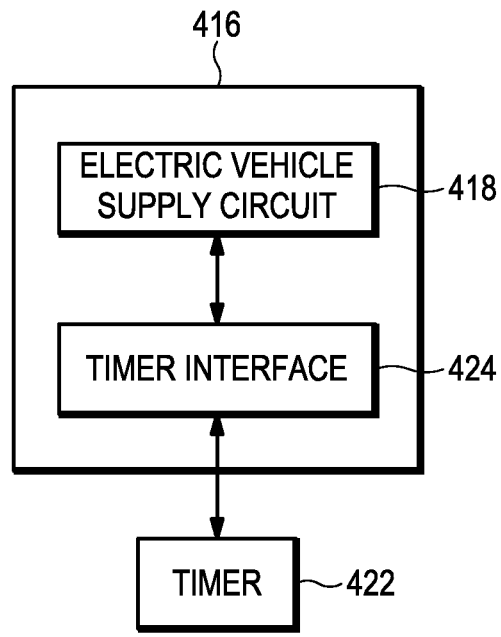
FIG. 59 illustrates an embodiment of an ESVE system having a timer interface according to some additional inventive principles of this patent disclosure.

The components illustrated in FIG. 58 may be implemented in any suitable manner. For example, the system my be implemented using the hardware shown in the embodiments of FIGS. 38 and 39, with the timer being integral with the system and implemented in software or firmware in the microcontroller. The timer may alternatively be a separate component 422 as shown in FIG. 59 and realized with analog and/or digital hardware, software, firmware or any combination thereof. In such an embodiment, a timer interface 424 may be included to couple the timer to the system. The interface may be realized with a wired or wireless connection to the timer 422 and may include any suitable mechanical arrangement such as a mounting slot, docking port, etc., for the timer.

Figure 60:
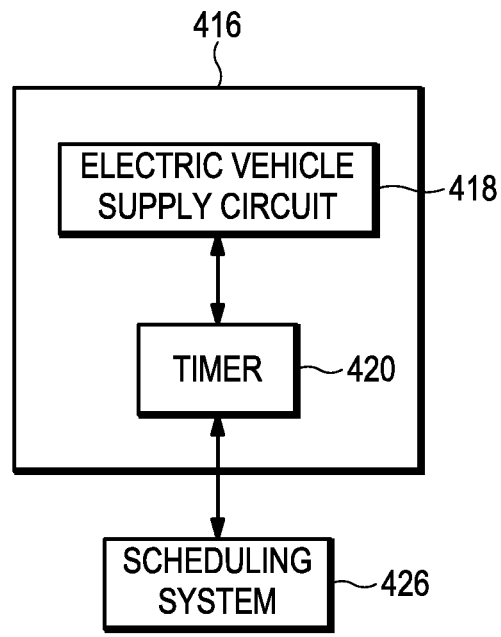
FIG. 60 illustrates an embodiment of an ESVE system having a timer interfaced to a scheduling system according to some additional inventive principles of this patent disclosure.

Referring to the embodiment of FIG. 60, the timer 420 may be adapted to coordinate with a scheduling system 426 such as a calendar utility running on a personal computer, or a portable communication device such as a laptop computer, netbook computer, smart phone, tablet computer, etc. For example, the timer may be programmed by synchronizing with a calendar utility in Microsoft Outlook, Blackberry OS, Google Apps, etc. The timer functionality may implement recurring events which may be especially easy for a user to configure through a scheduling system. For example, a user may use Microsoft Outlook to configure a recurring event in which the timer begins charging an EV every night as soon as reduced off-peak electric rates are available.

Figure 61:
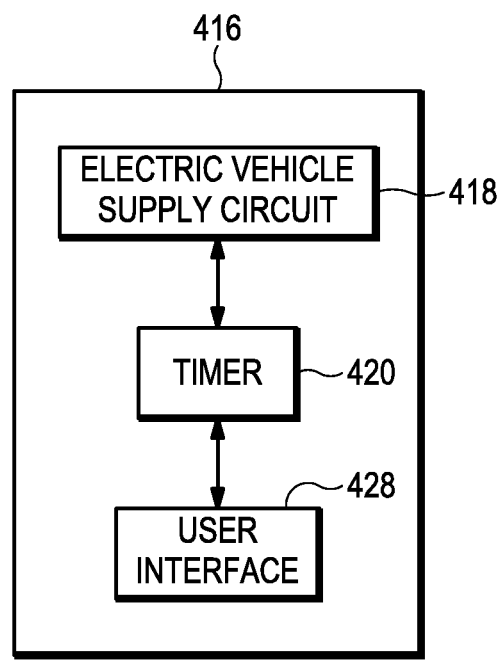
FIG. 61 illustrates an embodiment of an ESVE system having a timer with a user interface according to some additional inventive principles of this patent disclosure.

Any suitable user interface (UI) may be provided for the timer. In an embodiment realized with the hardware shown in FIGS. 38 and 39, the user interface may be provided by the operator inputs 276 and display 278 which also perform functions for other features. In another embodiment, such as that shown in FIG. 61, the user interface 428 may be dedicated to the timer functionality. For example, the user interface may include an embedded server to enable a user to configure, program or otherwise control the timer. The embedded server may be implemented as an embedded web server to enable a user to log into the timer functionality through the Internet or other type of network. The timer UI may be accessed through a dedicated network connection, or through a multi-purpose network interface such as the network interface 282 illustrated in FIG. 39, or through any other suitable communication interface. Alternatively or additionally, a programming utility may be built into the timer or support hardware to provide programming and/or configuration functionality to a user.

The timer functionality may be coordinated with an electric utility to enable various additional features according to the inventive principles of this patent disclosure. For example, in an embodiment having connectivity to a utility as described above, the utility may provide daily, weekly, monthly, etc., rate schedules that may be downloaded to the timer. A user may then configure the timer based on available rate schedules.

Various hierarchical timing event control systems may be implemented according to some inventive principles of this patent disclosure. For example, at a first level, a utility may provide a schedule of rate windows that are fixed or that vary on a daily, weekly, etc. basis. On top of this utility provided schedule, a user may program an individual schedule based on personal preferences. On yet another level, the utility or EVSE system may implement a randomizing feature that provides slight variations in turn-on times between different users to prevent a power surge if multiple users program timers to turn on at the exact time that off-peak rates become available.

According to some inventive principles of this patent disclosure, a system includes: an electrical enclosure; an electric vehicle supply circuit disposed within the electrical enclosure and constructed and arranged to provide power to an electric vehicle from a power source; and a disconnect switch integral with the enclosure and arranged to disconnect the electric vehicle supply circuit from the power source. In some embodiments, the disconnect switch comprises a safety disconnect, the disconnect switch comprises an electro-mechanical switch, and/or, the disconnect switch comprises a rotary actuator.

According to some inventive principles of this patent disclosure, an electric vehicle supply circuit includes: a charge circuit interrupting device having one or more contacts arranged to interrupt power to an electric vehicle; a contact monitor circuit coupled to the charge circuit interrupting device; and a controller coupled to the contact monitor circuit and the charge circuit interrupting device, where the controller is constructed and arranged to control the charge circuit interrupting device in response to the contact monitor circuit; where the contact monitor circuit includes automatic test functionality to enable the controller to test the operation of the contact monitor circuit. In some embodiments, the contact monitor circuit comprises a resistor and a switch coupled in series between two current carrying conductors, where the switch is constructed and arranged to be operated by the controller. The switch may comprise an optically isolated coupling. The grounding monitor circuit may further comprise a monitor device coupled in series with the resistor and switch and arranged to enable the controller to monitor the operation of the contact monitor circuit. The monitor device may comprise an optically isolated coupling.

According to some inventive principles of this patent disclosure, a method includes: displaying a first parameter in a display for an electric apparatus; displaying a second parameter in the display if a user input is not received before the end of a first predetermined time period; and displaying the first parameter for a second time period if a user input is received before the end of the predetermined time period. In some embodiments, the method may further include: displaying a third parameter in the display if a user input is not received before the end of a third predetermined time period; and displaying the second parameter for a fourth time period if a user input is received before the end of the third predetermined time period. Displaying the first parameter for a second time period may comprise: displaying the first parameter until a user input is received; and displaying the second parameter after the user input is received. The second time period may comprise a predetermined time period, and displaying the first parameter for a second time period may comprise displaying the first parameter until a user input is received or until the end of the second time period. The method may further include indicating a type of the first parameter in the display while displaying the first parameter. The method may further include indicating a type of the first parameter with an ancillary display while displaying the first parameter. The electric apparatus may comprise electric vehicle supply equipment and/or a power distribution unit.

According to some inventive principles of this patent disclosure, a system includes: electric vehicle supply equipment; and a modular interface to enable the electric vehicle supply equipment to communicate with one or more communication modules. In some embodiments, the system may further include a communication module adapted to connect to the modular interface. The communication module may comprise wireless functionality. The communication module may comprise: a microcontroller; an interface to couple the communication module to the electric vehicle supply equipment; and a wireless transceiver coupled to the microcontroller.

According to some inventive principles of this patent disclosure a method includes: connecting an electric vehicle to an electric vehicle supply circuit; and automatically controlling the electric vehicle supply circuit in response to a timer. In some embodiments, automatically controlling the electric vehicle supply circuit may include enabling the electric vehicle supply circuit at a predetermined time and/or disabling the electric vehicle supply circuit at a predetermined time. The method may further include programming the predetermined time into the timer. The method may further include coordinating the timer with a scheduling system and/or an electric utility.

According to some inventive principles of this patent disclosure a system includes: an electric vehicle supply circuit; and a timer adapted to control the electric vehicle supply circuit. The timer may be adapted to enable the electric vehicle supply circuit at a predetermined time and/or to disable the electric vehicle supply circuit at a predetermined time. The timer may be integral with the electric vehicle supply circuit and/or adapted to coordinate with a scheduling system. The scheduling system may include a calendar utility and/or a portable communication device. The system may include a user interface for the timer. The user interface may include an embedded server and/or Internet web server. The timer may be adapted to coordinate with an electric utility, to implement recurring events, and or to implement a hierarchy of timing events. The system may include a programming utility adapted to program the timer.

The inventive principles of this patent disclosure have been described above with reference to some specific example embodiments, but these embodiments can be modified in arrangement and detail without departing from the inventive concepts. Thus, any changes and modifications are considered to fall within the scope of the following claims.

The invention claimed is:

1. Electric vehicle supply equipment, comprising:
    an enclosure;
    an electric vehicle supply circuit for providing a flow of current to an electric vehicle from a power source;
    a charge circuit interrupting device located within the enclosure, the charge circuit interrupting device being arranged to interrupt the flow of current to the electric vehicle;
    a grounding monitor circuit located within the enclosure, the grounding monitor circuit coupled to grounding conductors, the grounding monitor circuit having a grounding output signal;
    a ground default detection circuit located within the enclosure, the ground fault detection circuit coupled to current carrying conductors, the ground fault detection circuit having a fault detection output signal;
    a controller located within the enclosure, the controller coupled to the grounding monitor circuit, the ground fault detection circuit and the charge circuit interrupting device, where the controller is constructed and arranged to monitor the charge circuit interrupting device by providing a control signal to the charge circuit interrupting device; and
    logic circuitry arranged to receive results from the charge circuit interrupting device, the grounding output signal and fault detection output signals and the control signal, and assert a close signal based upon the grounding output signal and fault detection signal.

2. The equipment of claim 1, further comprising a contact monitor circuit arranged to determine a state of the charge circuit interrupting device.

3. The equipment of claim 1, wherein the charge circuit interrupting device comprises a contactor circuit.

4. The equipment of claim 1, further comprising a power meter.

5. The equipment of claim 1, wherein the power meter is integral with the controller.

6. The equipment of claim 1, further comprising a network interface.

7. The equipment of claim 1, wherein the logic comprises a separate circuit.

8. The equipment of claim 1, wherein the logic is implemented in the controller.

9. The equipment of claim 1, further comprising a timer adapted to control the electric vehicle supply circuit.

10. The equipment of claim 9, wherein the timer is electrically coupled to the controller, the timer adapted to send a signal to the controller to enable the controller to control the charge circuit interrupting device by enabling or disabling the flow of current from the power source to the electric vehicle in response to the signal.

11. The equipment of claim 10, wherein the timer is adapted to enable and disable the electric vehicle supply circuit at a predetermined time.

12. The equipment of claim 10, wherein the timer is adapted and configured to enable the electric vehicle supply circuit to commence the flow of current to the electric vehicle during nighttime hours or hours with reduced electric rates.

13. The equipment of claim 10, wherein the timer is adapted to coordinate with a scheduling system.

14. The equipment of claim 10, wherein the timer sends an alarm.

15. The equipment of claim 13, wherein the scheduling system is adapted and configured to coordinate with one of a calendar utility and a portable communication device.

16. The equipment of claim 9, where the timer is integral with the electric vehicle supply circuit.

17. The equipment of claim 9, where the timer is implemented in software or firmware of the microcontroller.

18. The equipment of claim 9, further comprising a user interface for the timer.

19. The equipment of claim 18, wherein the user interface comprises an embedded server.

20. The equipment of claim 19, wherein the embedded server comprises an Internet web server.

21. The equipment of claim 9, wherein the timer is adapted to coordinate with an electric utility.

22. The equipment of claim 9, wherein the enclosure includes a timer interface for interacting with the timer.

* * * * *